US009314960B2

(12) United States Patent
Hatakeyama et al.

(10) Patent No.: US 9,314,960 B2
(45) Date of Patent: Apr. 19, 2016

(54) METHOD FOR PRODUCING LONG STRETCHED FILM, AND DEVICE FOR PRODUCING LONG STRETCHED FILM

(75) Inventors: Shimpei Hatakeyama, Kobe (JP); Daisuke Hojo, Kobe (JP); Shinji Inagaki, Tachikawa (JP); Hiroshi Nanbu, Kobe (JP); Daisuke Ueno, Akashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/385,652

(22) PCT Filed: Mar. 22, 2012

(86) PCT No.: PCT/JP2012/001981
§ 371 (c)(1),
(2), (4) Date: Sep. 16, 2014

(87) PCT Pub. No.: WO2013/140453
PCT Pub. Date: Sep. 26, 2013

(65) Prior Publication Data
US 2015/0048540 A1 Feb. 19, 2015

(51) Int. Cl.
*B29C 55/04* (2006.01)
*B29D 7/01* (2006.01)
*B29K 101/12* (2006.01)
*B29L 7/00* (2006.01)
*B29K 1/00* (2006.01)
*B29K 23/00* (2006.01)
(Continued)

(52) U.S. Cl.
CPC ............... *B29C 55/045* (2013.01); *B29D 7/01* (2013.01); *B29K 2001/08* (2013.01); *B29K 2023/38* (2013.01); *B29K 2101/12* (2013.01); *B29L 2007/008* (2013.01)

(58) Field of Classification Search
CPC .. B29C 47/0021; B29C 55/045; B29C 55/08; B29C 55/12; B29C 55/06; B29C 2947/92647; B29C 55/20; B29C 2947/92152; B29C 55/04; B29C 55/065; B29C 55/165; B29C 2947/92628; B29C 55/02; B29D 7/01; C08J 5/18; B29L 2007/008; B29L 2007/00; B29L 2007/002; B29L 2031/3475; B29L 2007/007; B29K 2995/005; B29K 2995/0051; B29K 2995/0053; B29K 2001/08; B29K 2023/38; B29K 2101/12
USPC ............ 264/165, 291, 230, 173.15, 175, 198, 264/208, 209.5, 235.6, 209.4, 210.1, 210.5, 264/210.7, 235.8, 288.4, 290.2, 290.7, 264/1.34; 425/66, 224, 140, 335
See application file for complete search history.

(56) References Cited

U.S. PATENT DOCUMENTS 6,511,756 B1 1/2003 Obuchi
6,778,242 B1 8/2004 Murayama
(Continued)

FOREIGN PATENT DOCUMENTS

EP 0911656 A2 4/1999
JP H05-097978 A 4/1993
(Continued)

OTHER PUBLICATIONS

JP 2007-175974 A (Machine Translation).*

*Primary Examiner* — James Sanders
*Assistant Examiner* — Leith S Shafi
(74) *Attorney, Agent, or Firm* — Lucas & Mercanti, LLP

(57) ABSTRACT

The present invention provides a method for producing a long stretched film, including at least the steps of: forming a long film containing a thermoplastic resin; stretching the long film in an oblique direction; and winding the long film having been subjected to the oblique stretching. The oblique stretching is performed in a heating section including a preheating section, a stretching section, and a thermosetting section, the preheating section and the stretching section are separated from each other by a partition wall. The stretching section and the thermosetting section are separated from each other by a partition wall, each of the partition walls has an opening for permitting the long film to pass, and slide members independently movable on the opposite sides of the opening and in widthwise directions of the long film, the slide members can adjust the width of the opening and the widthwise position of the opening.

5 Claims, 29 Drawing Sheets

(56) References Cited

U.S. PATENT DOCUMENTS

| | | |
|---|---|---|
| 2004/0233363 A1 | 11/2004 | Murayama |
| 2008/0099949 A1* | 5/2008 | Takeuchi et al. .............. 264/150 |
| 2009/0159857 A1 | 6/2009 | Uehira |

FOREIGN PATENT DOCUMENTS

| | | |
|---|---|---|
| JP | H05-310845 A | 11/1993 |
| JP | H10-045804 A | 2/1998 |
| JP | H11-124429 A | 5/1999 |
| JP | 2004-230714 A | 8/2004 |
| JP | 2004-233604 A | 8/2004 |
| JP | 2004-284127 A | 10/2004 |
| JP | 2006-159775 A | 6/2006 |
| JP | 2007-175974 A | 7/2007 |
| JP | 2008-107767 A | 5/2008 |
| JP | 2009-078474 A | 4/2009 |
| JP | 2010-031223 A | 2/2010 |
| JP | 2002-372622 A | 5/2011 |

* cited by examiner

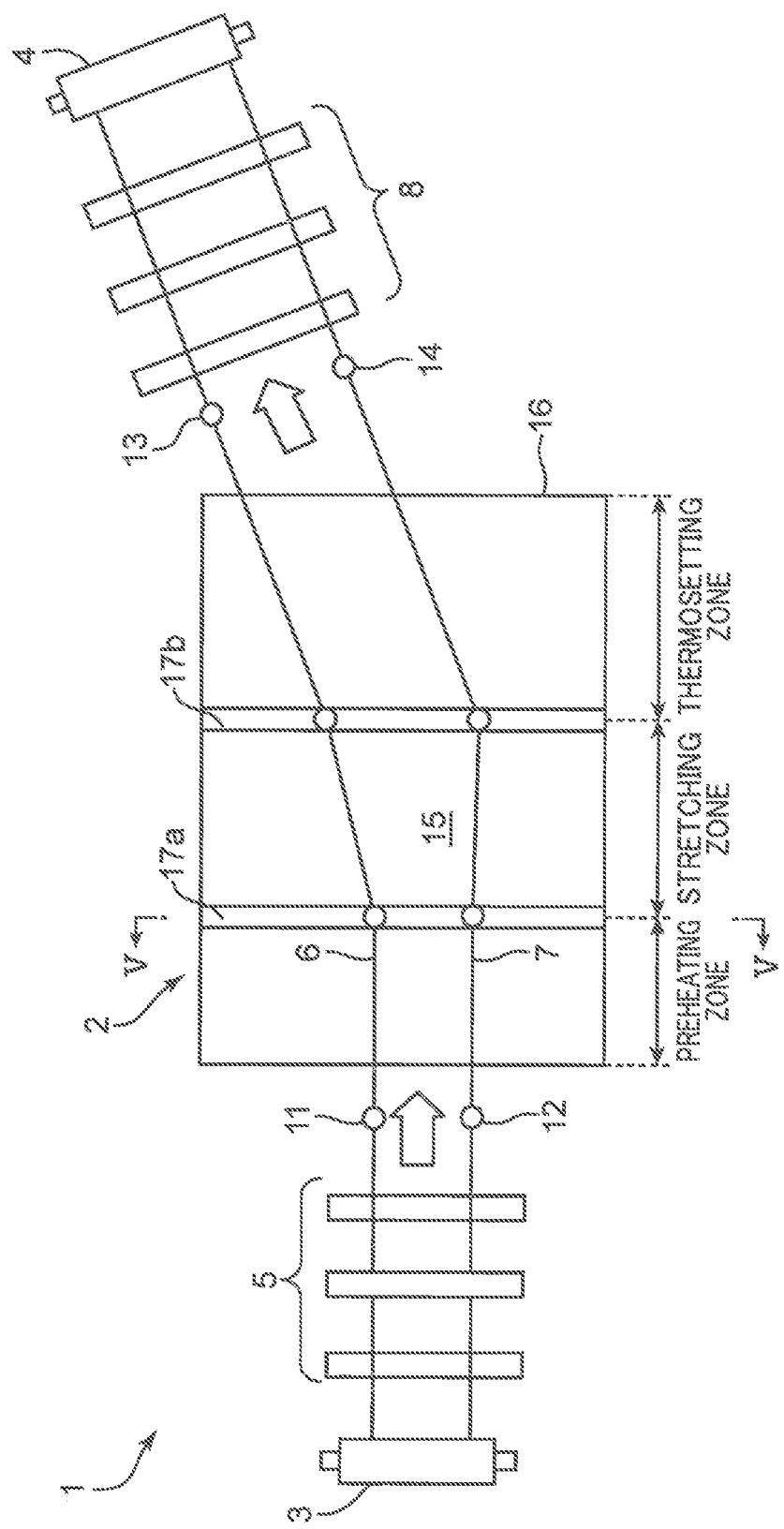

METHOD FOR PRODUCING LONG STRETCHED FILM, AND DEVICE FOR PRODUCING LONG STRETCHED FILM

CROSS REFERENCE TO RELATED APPLICATION

This Application is a 371 of PCT/JP2012/001981 filed on Mar. 22, 2012, application which is incorporated herein by reference.

TECHNICAL FIELD

The present invention relates to a method for producing a long stretched film, and a device for producing the same.

BACKGROUND ART

Stretched films made by stretching a resin are used as optical films in various display devices for serving various optical functions, by taking advantage of optical anisotropies thereof. For example, it is known to use stretched films in a liquid crystal display device as an optical compensation film for optical compensation such as coloring prevention and viewing angle expansion, or as a phase difference film that also performs as a polarizer protection film by having a polarizer laminated to the stretched film.

In recent years, self-luminous display devices such as an organic electroluminescence display device have been gathering attention as a new display device. Self-luminous display devices have more potential for minimizing power consumption as compared to liquid crystal display devices whose backlights are constantly on. Furthermore, self-luminous display devices which light separate light sources for each color as like the organic electroluminescence display device require no color filter that is a cause for the decrease in contrast. As a result, it is possible to further improve the contrast.

Organic electroluminescence display devices are provided with a reflective body such as an aluminum plate on the back side of the display to improve light-extraction efficiency. Unfortunately, light entered from outside into the display and reflected on this reflective body causes degradation in the contrast of the image. For the prevention of the reflection of external light to improve the contrast in brightness, there is known a technique in which the stretched film is laminated to a polarizer and a circular polarizer is used on the front side of the display.

Such a circular polarizer requires to be laminated in a position in such a way that an in-plane slow axis of the stretched film is inclined in a desired angle with respect to the transmission axis of the polarizer.

A general polarizer (polarizing film) however is achieved by stretching the film at a high ratio along a course on which the film runs, whose absorption axis runs in the same direction as the running course of the film, and a currently known phase difference film is produced by lateral or transverse stretching; in principle, the in-plane slow axis extends in a 0° or 90° direction with respect to the longitudinal direction of the film. Therefore, the only way to achieve a desired inclination angle between the absorption axis of the polarizer and the slow axis of the stretched film is to perform batch processing, which is a process cutting out a long polarizing film and/or the stretched film at a specific angle and laminating the cut film strips one piece each. This causes issues such as the decrease in productivity due to the misalignment in the slow axis and the decrease in yield due to the adhering of chips and like matter on the films.

Patent Literature 1 proposes a method for producing a long phase difference film in which a phase difference film is stretched in a desired oblique angle and a slow axis thereof is freely controllable in a direction neither in the 0° nor 90° angles with respect to the longitudinal direction of the film. This method laminates the polarizing film and the stretched film by a roll-to-roll process. As a result, no decrease was found in yield, and thus allowed stable production.

However, the oblique stretching method disclosed in Patent Literature 1 varies in film thickness and optical characteristics, between plural widthwise positions of the film. For example, in a case of producing a film having a large alignment angle, the variation in the widthwise direction of the film markedly appeared. In order to solve such issues, Patent Literature 2 discloses a method of matching an angle between an alignment direction of the stretched film and partition walls separating sections in a heating furnace. Moreover, Patent Literature 3 discloses a production method which produces a film in such a way that angles between the alignment direction of the stretched film and boundaries of the stretching, thermally fixing, and cooling sections are within a constant specific range, and an absolute value of the differences between each of these angles meet within a specific range.

However, in the conventional production methods, a variation occurs in optical alignment on the film ends in a case in which the film is stretched obliquely while the film is run at fast running velocity, thereby causing a large alignment unevenness throughout the entire film. Moreover, if this film with such an alignment unevenness is used as the circular polarizer, partial color irregularity would appear on the circular polarizer, thereby causing a marked drop in the quality of the circular polarizer.

Moreover, Patent Literature 4 proposes a circular polarizer prepared by stacking and laminating a λ/2 phase difference film and a λ/4 phase difference film in such a way that the in-plane slow axes thereof form a preferred angle, so that a circular polarizer is obtained that has a high degree of circular polarization across a broad visible light wavelength range (broadband circular polarizer). In order to prepare such a film by the roll-to-roll process, each of the in-plane slow axis of the films need to be inclined in different angles, with respect to the widthwise direction.

On this account, instead of an oblique stretching device that can only stretch the film in a specific angle, it is preferable to use an oblique stretching device that is capable of stretching the film at any preferred angle by changing a stretching pattern in the single oblique stretching device and preparing a long stretched film having any preferred inclining angle of the in-plane slow axis.

In comparison, the above conventional production method shows significant variation in optical alignment of the film when the stretching pattern is changed. Such a film causes a large color irregularity when used in the circular polarizer. As a result, products could not be produced.

PRIOR ART DOCUMENTS

Patent Literature

Patent Literature 1
Japanese Unexamined Patent Publication No. 2006-159775
Patent Literature 2
Japanese Unexamined Patent Publication No. 2007-175974

Patent Literature 3
Japanese Unexamined Patent Publication No. 2009-78474
Patent Literature 4
Japanese Unexamined Patent Publication No. 2002-372622

SUMMARY OF THE INVENTION

An object of the present invention is to provide a method for producing a long stretched film and a device for producing the same, which reduces misalignment in optical alignment on the film ends and reduces alignment unevenness in the film, each of which occur when obliquely stretching the film, and which prevents the color unevenness from occurring in using the film in a circular polarizer.

As a result of diligent study to achieve the object, the inventors of the present invention found out that a method for producing a long stretched film and a device for producing the same can be obtained by the following configuration, which method obtains a long stretched film having reduced misalignment in optical alignment on the film ends and reduced alignment unevenness in the film, and accomplished the present invention.

In other words, a method according to one aspect of the present invention for producing a long stretched film is a method including at least the steps of: forming a long film containing a thermoplastic resin; stretching the long film in an oblique direction greater than 0° but smaller than 90° with respect to a widthwise direction of the long film by feeding to an oblique stretching device in the specific direction different from a direction along which the long film runs after being stretched, and then allowing the long film to run while widthwise ends of the long film are gripped by gripping tools of a gripping tool running device of an oblique stretching tenter; and winding the long film having been subjected to the oblique stretching, wherein: the oblique stretching is performed in a heating section including a preheating section, a stretching section, and a thermosetting section, the preheating section and the stretching section are separated from each other by a partition wall, and the stretching section and the thermosetting section are separated from each other by a partition wall, each of the partition walls has an opening for permitting the long film to pass, and slide members independently movable on the opposite sides of the opening and in widthwise directions of the long film, the slide members are adapted to adjust the width of the opening and the widthwise position of the opening.

The above and any other objects, features and advantages of the present invention will be better understood with reference to the following detailed descriptions and accompanying drawings.

BRIEF DESCRIPTION OF DRAWINGS

FIG. 2 is a schematic top view showing a configuration of an oblique stretching apparatus according to an embodiment of the present invention.

DESCRIPTION OF EMBODIMENTS

Figure 1A:
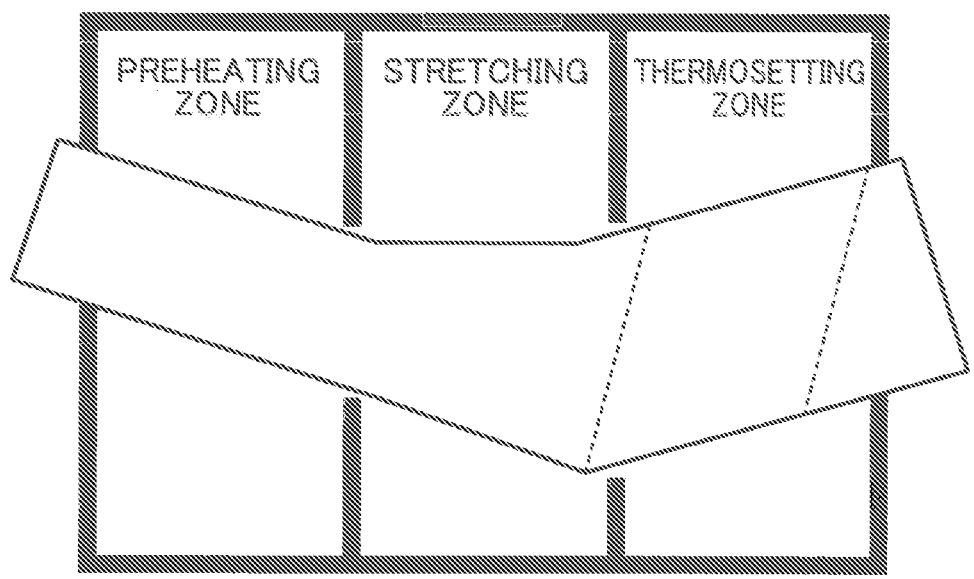
FIG. 1 is a schematic view showing a conventional oblique stretching of a film in a heating section.

The inventors of the present invention found that an optical unevenness of a long stretched film produced by oblique stretching is due to the temperature unevenness of the film that is caused by a flow of air accompanying the film passing through an opening of a partition wall of an oblique stretching tenter, and have made diligent study.

It was particularly found that since the film runs inside the heating section in a curved manner during the oblique stretching, the temperature unevenness tends to be largely affected by the rail configuration that is unique to the oblique stretching.

The heating section includes a preheating section, a stretching section and a thermosetting section, and the sections are separated from each other by partition walls.

Generally, the temperature inside the sections in the heating section are set in such a manner that the preheating section and stretching section are at the same temperatures or that the temperature of the preheating section is higher than that of the stretching section so that the temperature during stretching does not decrease and allows for sufficient heating of the film. The temperature in the thermosetting section is set lower than that of the preheating section and stretching section.

The following describes the problem of the temperature unevenness, with reference to an example in which temperatures are set so that the temperatures in the heating section are to decrease in the order of the preheating section, the stretching section, and the thermosetting section.

When the long film or long stretched film is successively run through the sections in the heating section, a flow of air accompanying the film having been run through the preheating section enters the stretching section that is at a temperature lower than that of the preheating section, via the opening in the partition wall. Thereafter, a flow of air accompanying the film having been run through the stretching section also enters the thermosetting section that is at a temperature lower than that of the stretching section. Accordingly, temperature unevenness readily occurs at the boundary parts in each section, due to the difference in temperatures between the sections. Particularly, in a case in which the film is stretched while the film is run at a fast running velocity, the power of the air accompanying the film tends to strengthen, thereby causing the flow of air entering through the opening to be particularly strong. This thus causes significant temperature unevenness at the boundary parts of the sections.

Partition walls in the conventional oblique stretching techniques described in Patent Literatures 2 and 3 are fixed at their disposed positions. Therefore, if changes are optionally made to directions when obliquely stretching the film, such as the feeding direction of the long film, the running course of the long stretched film having been subjected to the stretching, and the direction in which the long film is stretched, no opening for the film to run through the partition wall can be secured. There is thus the need to provide a large opening width in advance, to allow the film to run through in such cases.

Accordingly, in a case in which oblique stretching is carried out under any desired state, the amount of accompanied air that is flown downstream increases due to the wide opening with respect to the width of the film. As a result, the temperature unevenness at the boundary parts of the sections increases, which also causes large variation in optical alignment.

Next described below is a further problem in the conventional film oblique stretching technique.

FIG. 1(a) is a view showing one example of a film that is obliquely stretched in such a manner that an angle between the direction of alignment of the stretched film and the partition wall between the stretching section and the thermosetting section is of an acute angle (more than 5° but less than 90°), by the technique disclosed in Patent Literature 3. The broken lines illustrated on the film indicate the alignment axis of the film.

In a case in which the film is stretched as shown in FIG. 1(a), the film running from the stretching section to the thermosetting section enters the thermosetting section in such a manner that an inner side of the film with respect to the direction of alignment is entered first into the thermosetting section that is at a lower temperature, and an outer side of the film is entered into the thermosetting section thereafter. Since the obliquely stretched long stretched film is aligned obliquely to the running course of the film, the inner side of the film on the ends of the film having identical alignment directions is cooled first and the outer side is cooled thereafter. As a result, the film has different heat histories between the inner side and the outer side, thereby causing unevenness in optical alignment on opposite ends of the film.

Figure 1B:
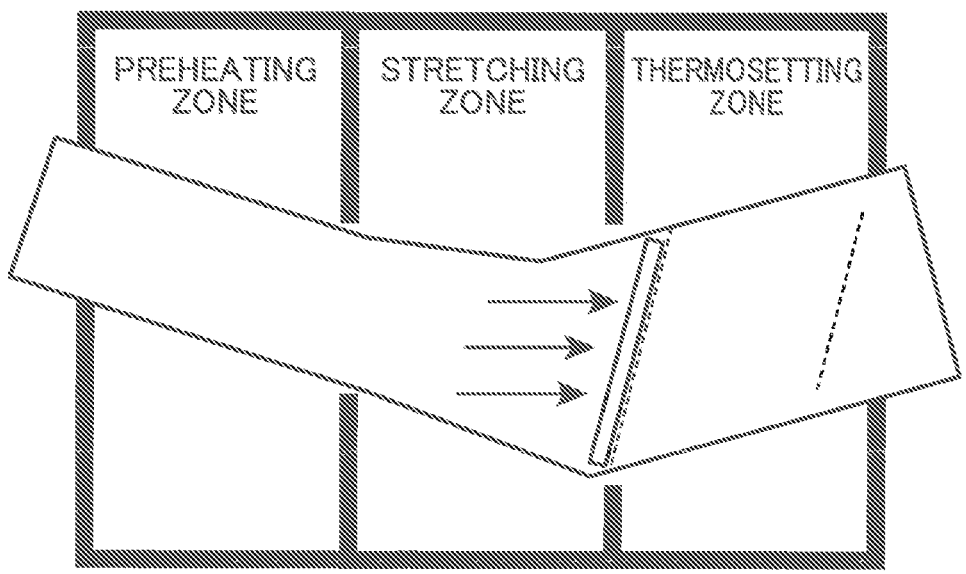

FIG. 1(b) is a view showing a film that is obliquely stretched in such a manner that an angle between the direction of alignment of the stretched film and a borderline between the stretching section and the thermosetting section is of an acute angle (greater than 5° but less than 90°) and that a film vertical divider board having a width within the width of the film is used to adjust the oblique stretching so that the angle of alignment of the vertical divider board and the film are equivalent to each other. The film stretched in the way as shown in FIG. 1(b) would result with a gap opened between the vertical divider board and the partition wall. Therefore, the high temperature air in the stretching section flows into the thermosetting section from the gaps on the inner and outer sides due to the accompanied air flowing in the direction of the arrows shown in FIG. 1(b). As a result, the hot air flowing in from the stretching section causes a difference in temperature on the ends of the film close to the stretching section in the thermosetting section, thereby causing optical unevenness on the opposite sides of the film. As such, temperature distribution of the film largely varies between ends after the film is run through the partition wall, and the heat history differs between the ends of the film, thus causing the optical unevenness.

As described above, in the oblique stretching of prior art, the partition walls that separate the heating section are fixed. Therefore, air flowing into a subsequent section together with the film through a widened opening in the partition walls cannot be controlled, which made it impossible to improve the unevenness in optical alignment of the film. Particularly in a case of obliquely stretching the film under a fast running velocity, the flow of air accompanying the film markedly increases and easily flows into the subsequent section, which made the above issue more readily occurring.

The present invention was accomplished as a result of study for overcoming such problems.

Described below are details of embodiments of the present invention, with no intention of limiting the present invention to those embodiments.

The following describes a method for producing a long stretched film according to the present embodiment.

<Method for Producing Long Stretched Film>

A method for producing a long stretched film of the present invention includes at least the steps of: forming a long film containing a thermoplastic resin; stretching the long film in an oblique direction greater than 0° but smaller than 90° with respect to a widthwise direction of the long film by feeding the long film in the specific direction different from a direction along which the long film runs after being stretched, and then allowing the long film to run while widthwise ends of the long film are gripped by gripping tools of a gripping tool running device of an oblique stretching tenter; and winding the long film having been subjected to the oblique stretching, wherein: the oblique stretching is performed in a heating section including a preheating section, a stretching section, and a thermosetting section, the preheating section and the stretching section are separated from each other by a partition wall, and the stretching section and the thermosetting section are separated from each other by a partition wall, each of the partition walls has an opening for permitting the long film to pass, and slide members independently movable on the opposite sides of the opening and in widthwise directions of the long film, the slide members are adapted to adjust the width of the opening and the widthwise position of the opening.

In an aspect according to the present embodiment, a long film indicates a film that has not been stretched, and a long stretched film indicates a film that has been stretched.

Moreover, the expression "long" is used to describe a length of at least five times or more of the film width, preferably of a length ten times or more, and specifically describes a length that is stored or carried by being wound in a roll shape (film roll).

Moreover, the method for producing the long stretched film of the present invention can be carried out by using an apparatus as described below. That is to say, the apparatus includes: means for forming a long film containing a thermoplastic resin; means for stretching the long film in an oblique direction greater than 0° but smaller than 90° with respect to a widthwise direction of the long film by feeding to an oblique stretching device in the specific direction different from a direction along which the formed long film runs, and then allowing the long film to run while the widthwise ends of the long film are gripped by gripping tools of a gripping tool running device of an oblique stretching tenter; and means for winding the long film having been subjected to the oblique stretching, wherein: the oblique stretching means includes a heating section having a preheating section, a stretching section, and a thermosetting section, the preheating section and the stretching section are separated from each other by a partition wall, and the stretching section and the thermosetting section are separated from each other by a partition wall, each of the partition walls has an opening for permitting the long film to pass, and slide members independently movable on the opposite sides of the opening and in widthwise directions of the long film, the slide members are adapted to adjust the width of the opening and the widthwise position of the opening.

Figure 3:
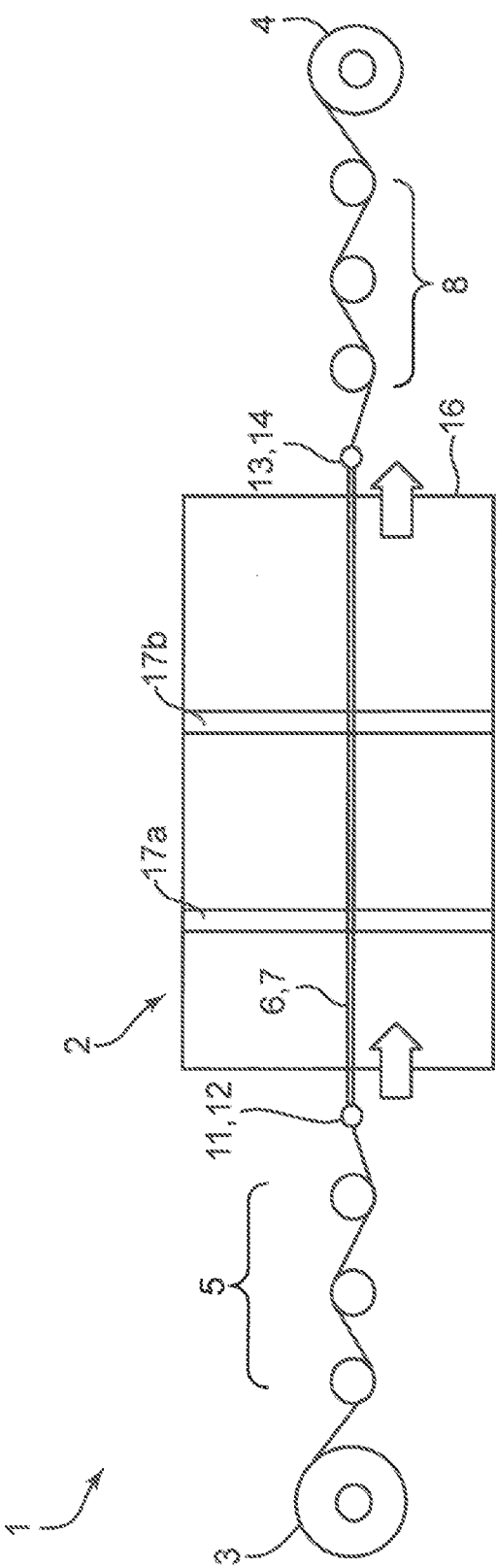
FIG. 3 is a schematic side view showing the configuration of the oblique stretching apparatus according to the embodiment of the present invention.

FIG. 2 and FIG. 3 are views schematically showing a device for producing the long stretched film according to one embodiment of the present invention. This is merely one example, and this is not intended to limit the present invention whatsoever.

The reference signs in FIGS. 2 and 3 represent the following members and devices: 1 oblique stretching device, 2 oblique stretching tenter, 3 film feeding device, 4 film winding device, 5, 8 running roll, 6 inner gripping tool running device, 7 outer gripping tool running device, 11, 12 gripping tool running device start position, 13, 14 gripping tool running device end position, 15 long film (long stretched film), 16 heating section, 17a, 17b partition wall.

Described below are the steps in the production method of the present invention.

[Film Forming Step]

The step of forming a film according to the production method of the present invention is a step of forming a long film containing a thermoplastic resin. The step of forming a film is carried out by various means depending on the kind of thermoplastic resin, and further details are described below.

[Oblique Stretching Step]

The step of obliquely stretching according to the production method of the present invention is a step of stretching the long film by feeding the long film from a film feeding device in the specific direction different from a direction along which the long film runs after it is stretched, and then allowing the long film to run while widthwise ends of the long film are gripped by gripping tools of a gripping tool running device of an oblique stretching tenter, to apply an in-plane slow axis at an angle greater than 0° but smaller than 90° with respect to a widthwise direction of the long film.

The angle with respect to the width direction of the film is an angle within the film plane. The slow axis usually is expressed in a stretching direction or in a direction at right angles to the stretching direction. Accordingly, in the production method according to the present invention, the film is stretched by the angle being set to any desired angle within a range of greater than 0° but smaller than 90° with respect to the direction orthogonal to the running course of the film, to produce a long stretched film having such a slow axis.

(Feeding Device)

As shown in FIG. 2 and FIG. 3, the film feeding device 3 can be slid and swung to feed the film to the oblique stretching tenter inlet at a predetermined angle. The film feeding device 3 is slidable, and preferably uses a running course changing device to feed the film to the oblique stretching tenter inlet. By having the film feeding device 3 and the running course changing device configured as such, it is possible to minutely control the feeding position and angle of the film, thus making it possible to obtain a long stretched film having few variation in the film thickness and optional values of the film. Moreover, by providing the film feeding device 3 and the running course changing device in a movable manner, it is possible to effectively prevent the film from jamming with the gripping tool.

Moreover, the film feeding device 3 may be provided separately from the oblique stretching device 1, or the two may be provided integrally as one. In the former case, the formed long film is once wound around a core before the long film is obliquely stretched, and this wound roll is loaded to the film feeding device 3 to feed the long film from the film feeding device 3. On the other hand, in the latter case, the film feeding device 3 feeds the long film to the oblique stretching tenter 2 without the long film being wound after the formation of the film, before the long film is obliquely stretched.

(Running Rolls)

The running rolls 5 are rolls that send the film fed from the feeding device to the gripping tool running device start positions 11 and 12.

The number of the running rolls 5 is not limited in particular, and a slitter step may be provided between the disposed running rolls to cut off the film ends. Moreover, a static eliminating device can be disposed for eliminating static from the film upstream or downstream of the running rolls, or between a multiple number of the running rolls. A static eliminating device used in the slitting step described later can be used as the static eliminating device.

(Oblique Stretching Tenter)

The production method according to the present invention uses an oblique stretching tenter to apply an oblique alignment to the long film. The oblique stretching tenter used in the present embodiment is a device that heats the long film to a temperature that allows the film to be stretched, and obliquely stretches the film. The oblique stretching tenter includes a heating section, a plurality of gripping tools in which a pair of opposite gripping tools hold opposite ends of the long film, respectively, to allow the film to run, and a gripping tool running device for guiding and supporting the running of the gripping tools.

The opposite sides of the long film that is successively fed through the oblique stretching tenter inlet (gripping start point) are each gripped by respective gripping tools to guide the long film into the heating section, and the gripping tools release the long stretched film at the oblique stretching tenter outlet (gripping release point). The long stretched film released from the gripping tools is wound around a core. The gripping tool running device provided with the gripping tools are of an endless track, and the gripping tools that have released the long stretched film at the outlet of the stretching device sequentially return back to the gripping start point by the gripping tool running device.

The gripping tool running device may be of a form including an endless chain having restricted paths by for example guide rails or gears and provided with the gripping tools, or may be of a form including endless guide rails provided with the gripping tools. That is to say, in the present invention, the gripping tool running device may be for example guide rails with ends but provided with an endless chain, an endless guide rail provided with an endless chain, or an endless guide rail without a chain provided. In the case in which the gripping tool running device does not have a chain, the gripping tools move along the pathways of the gripping tool running device, and in the case in which the gripping tool running device have a chain, the gripping tools move along the pathway of the gripping tool running device via the chain.

Described below is a case in which the gripping tools move along the pathway of the gripping tool running device as an example. However in any case, the gripping tools can move along the pathway of the gripping tool running devices via a chain on which the gripping tools are provided.

The gripping tool running device of the oblique stretching tenter is shaped asymmetrically, and the pathway patterns can be adjusted manually or automatically depending on the alignment angle, stretching ratio and the like to be applied to the produced long stretched film.

With the oblique stretching tenter of the present embodiment, it is preferable to set the pathways of the gripping tool running devices in a free manner and allow optional changes to the pathway pattern of the gripping tool running device.

Figure 4:
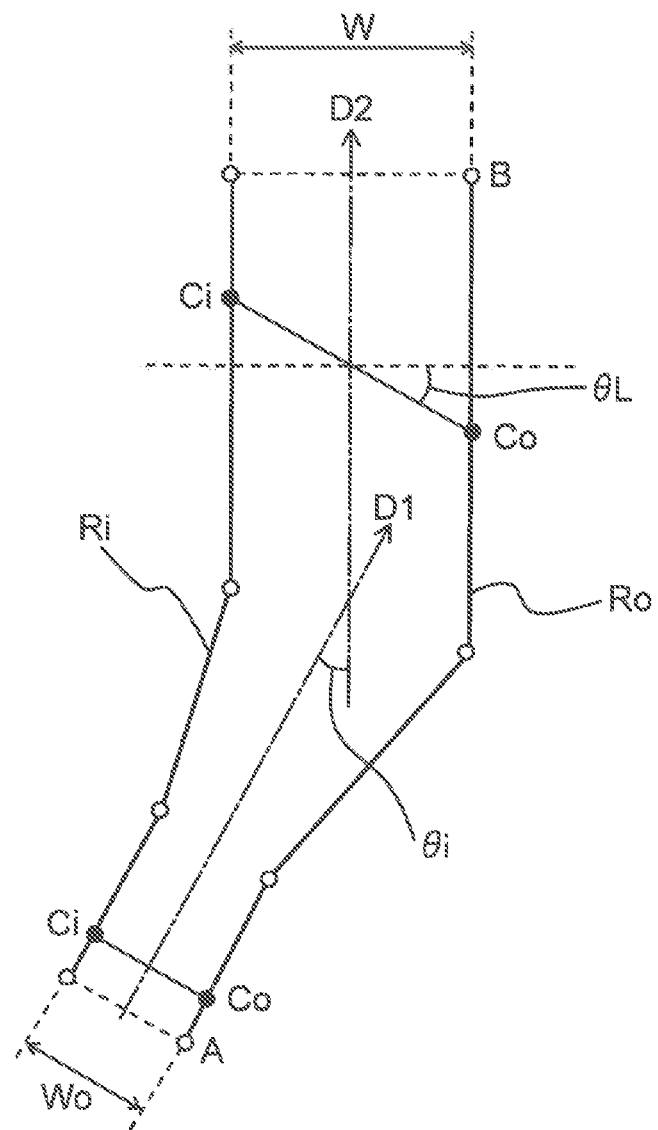
FIG. 4 is a schematic view showing an exemplary oblique stretching tenter used in a method for producing a long stretched film according to an embodiment of the present invention.

FIG. 4 is a schematic view illustrating one example of a rail pattern of an oblique stretching tenter used in the method of producing a long stretched film according to an embodiment of the present invention. This however is merely one example, and the present invention is not limited thereby.

A feeding direction D1 of the long film differs from a winding direction D2 of the long stretched film that has been stretched, and is angled at a feeding angle $\theta i$. The feeding angle $\theta i$ can be set as desired to any angle greater than 0° but smaller than 90°.

The long film is gripped by the gripping tools on the opposite sides of the film at the oblique stretching tenter inlet (at position A in FIG. 4), and is moved together with the movement of the gripping tools. The gripping tools on the opposite sides are gripping tools Ci and Co that face each other in a direction substantially perpendicular to the running course of the film (feeding direction D1) at the oblique stretching tenter inlet (at position A in FIG. 4), and move along corresponding asymmetrical gripping tool running devices Ri and Ro and release the film at a position where the stretching ends (at position B in FIG. 4).

The gripping tools on the opposite sides of the film that were facing each other at the oblique stretching tenter inlet (position A in FIG. 4) changes in positional relationship as they move along the asymmetrical gripping tool running devices Ri and Ro, in such a manner that the gripping tool Ci moving along Ri moves ahead of the gripping tool Co moving along Ro.

That is to say, the gripping tools Ci and Co that were facing each other in a substantially perpendicular direction to the feeding direction D1 of the film at the oblique stretching tenter inlet (gripping start position of the film by the gripping tools) A eventually terminates the stretching of the film at a position B in a state in which a straight line connecting the gripping tools Ci and Co is inclined by angle $\theta L$ with respect to a direction substantially perpendicular to the winding direction D2 of the film.

As a result of the above movements, the long film is obliquely stretched in the $\theta L$ direction. The term substantially perpendicular indicates within a range of 90±1°.

The running velocity of the gripping tools can be selected as appropriate, however is usually 1 m/mins to 150 m/mins. If the stretching is performed having a fast running velocity, the accompanying air flowing through the openings of the partition walls increases, which makes the problem more significant. Accordingly, the effect of the present invention can be better achieved by performing the present invention at a running velocity within a range of 15 m/mins to 150 m/mins, and the effect of the present invention is better achieved even further by performing the present invention at a running velocity within a range of 30 m/mins to 150 m/mins.

Difference in running velocities within the pair of gripping tools is usually not more than 1%, preferably not more than 0.5%, more preferably not more than 0.1% of the running velocity. Any differences in running velocities between the left and right of the film at the outlet of the stretching step cause wrinkles and twists to generate on the film. Therefore, the left and right gripping tools have desirably substantially same velocity. Although a general tenter device has unevenness in velocity by second order or below depending on the periodity of sprocket gear wheels, the frequency of the driving motor and the like for driving the chain, and this unevenness often causes an unevenness of several percent, which do not fall under the differences in velocities in the embodiment of the present invention.

FIGS. 2 and 3 show a configuration of an oblique stretching device according to one embodiment of the present invention, and the oblique stretching tenter 2 includes a heating section 16, and a pair of gripping tool running devices 6 and 7 disposed so as to run through the heating section 16. The film 15 fed by the running rolls 5 is sequentially gripped by a plurality of gripping tools provided on the gripping tool running devices 6 and 7 at the oblique stretching tenter inlet, and runs together with the movement of the gripping tools. The gripping tools opposing each other at the oblique stretching tenter inlet in the direction substantially perpendicular to the running course of the film moves along the asymmetrical gripping tool running devices 6 and 7, respectively, and is run through the preheating section, stretching section, and thermosetting section, to heat and stretch the film 15.

The heating section 16 is a device for heating the film 15 for example. The heating section 16 is separated into the preheating section, the stretching section and the thermosetting section by partition walls 17a and 17b, in this order from the side from which the film 15 is fed, and each section can be controlled to have different temperatures and pressures.

The preheating section is a section in which the gripping tools gripping respective ends of the film 15 move along from the inlet of the heating section in a manner maintaining a constant distance between the gripping tools, and is a section for preheating the film 15 as a preliminary step of stretching the film 15.

The stretching section is a section in which the distance between the gripping tools that hold the respective ends of the film 15 expands in width to a predetermined distance, and is a section for actually performing oblique alignment of the film 15. Oblique stretching is performed here as described above, and the film may be stretched laterally or transversely before or after the oblique stretching if necessary.

The thermosetting section is a section in which the gripping tools on the opposite ends after running through the stretching section are moved in a parallel manner, again having a constant distance therebetween, and is a section for relaxing off excess stress caused by the stretching of the film and for setting the alignment obtained in the stretching section. Moreover, after being passed through the thermosetting section, the film may be passed through a section (cooling section) in which a temperature inside the section is set at a glass transition temperature not more than Tg° C. of the thermoplastic resin of which the long film is made. In this case, the pathway pattern may be provided to narrow the distance between the opposing gripping tools in consideration of any shrinking in the long stretched film caused by the cooling.

Specific heating means that can be used are, for example, means which provide hot air to each of the sections, or means that supply heat by providing a heating source such as a heater over or under the film. The temperatures inside the sections can be controlled by controlling the temperature of the hot air and that of the heating sources. The partition walls 17a and 17b each have an opening to permit the film 15 to pass across the sections.

The set temperatures of the sections are adjusted as appropriate depending on, for example, the material and purpose of stretching the film 15. For example, the temperature in the preheating section is preferably set within a range of Tg° C. to Tg+30° C., where Tg is the glass transition temperature of the thermoplastic resin contained in the film 15. A preheating section temperature of higher than Tg° C.+30° C. causes the film to become soft and readily stretch. As a result, film thickness may become uneven when the film is carried. Meanwhile, a preheating section temperature of lower than Tg may not allow the film to reach the desired temperature at the time of stretching the film. This would cause the stress applied to the film to increase during the stretching, which may result in the tearing of the film or the film being unintentionally released from the gripping tools.

Moreover, it is preferable to set the temperature in the stretching section (stretching temperature) within a range of Tg° C. to Tg+30° C. A stretching section temperature higher than Tg° C.+30° C. would soften the film to the extent that the stress for stretching would become difficult to be applied to the film, which may readily cause optical unevenness. A stretching section temperature lower than the glass transition temperature would increase the stress applied to the film during the stretching, which may result in the tearing of the film or the film being unintentionally released from the gripping tools.

It is preferable that the thermosetting section is set to a temperature within a range of Tg° C. to Tg+20° C. A thermosetting section temperature higher than Tg° C.+20° C. would make it difficult to sufficiently settle the alignment, which may cause optical unevenness to the film. Meanwhile, a thermosetting section temperature of lower than Tg would cause the film to be rapidly cooled after passing through the stretching section. In this case, the film may largely shrink, thereby causing wrinkles and like defects to the film.

Moreover, it is preferable to set the temperature of the preheating section higher than that of the stretching section, and to set the temperature of the stretching section higher than that of the thermosetting section. By setting the temperatures as such, it is possible to further enhance the effect of the present invention.

Moreover, the length of each section in the heating section can be selected as appropriate. The preheating section preferably is of a length of regularly 100% to 150% with respect to the length of the stretching section, and the setting section preferably is of a length of regularly 50% to 100% with respect to the length of the stretching section.

Figure 5A:
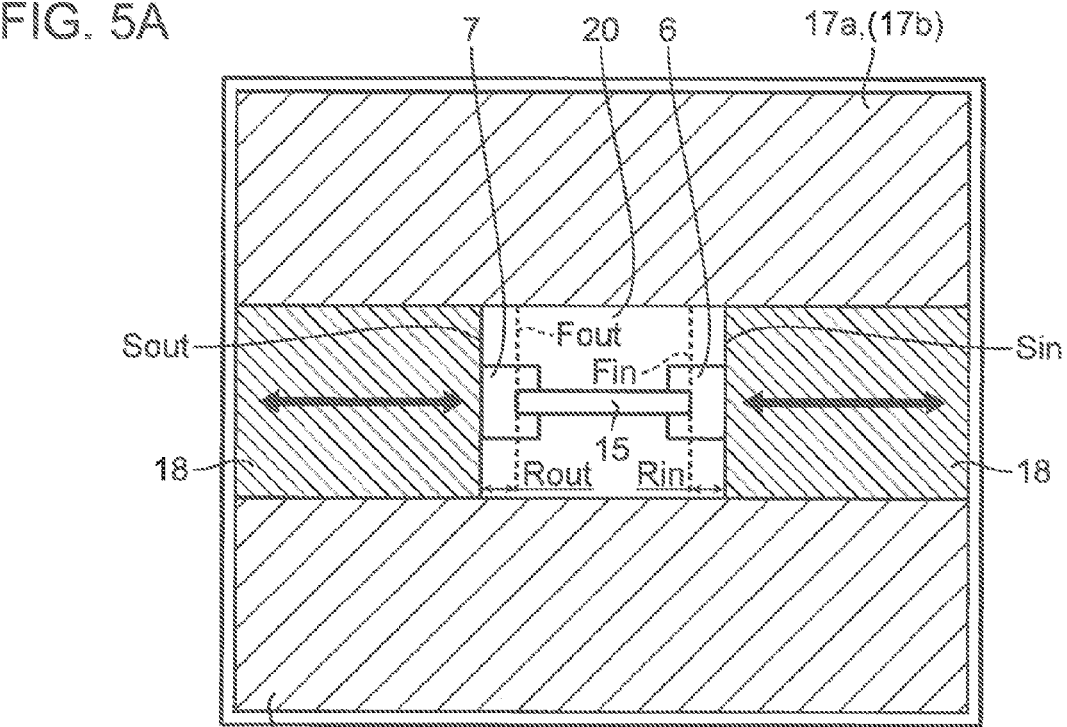
FIG. 5 is a sectional view taken along the line V-V in FIG. 2 viewed from a position downstream of a partition wall 17a (17b).

Next describes the partition wall 17a and the partition wall 17b shown in FIG. 2 and FIG. 3, with reference to FIG. 5(a).

The partition wall 17a separating the preheating section and the stretching section and the partition wall 17b separating the stretching section and the thermosetting section have similar configurations, so therefore descriptions are provided below for just the partition 17a. The same reference signs will be used for any components in the partition wall 17b similar to those in the partition wall 17a, and illustrative descriptions thereof will be omitted.

Figure 5B:
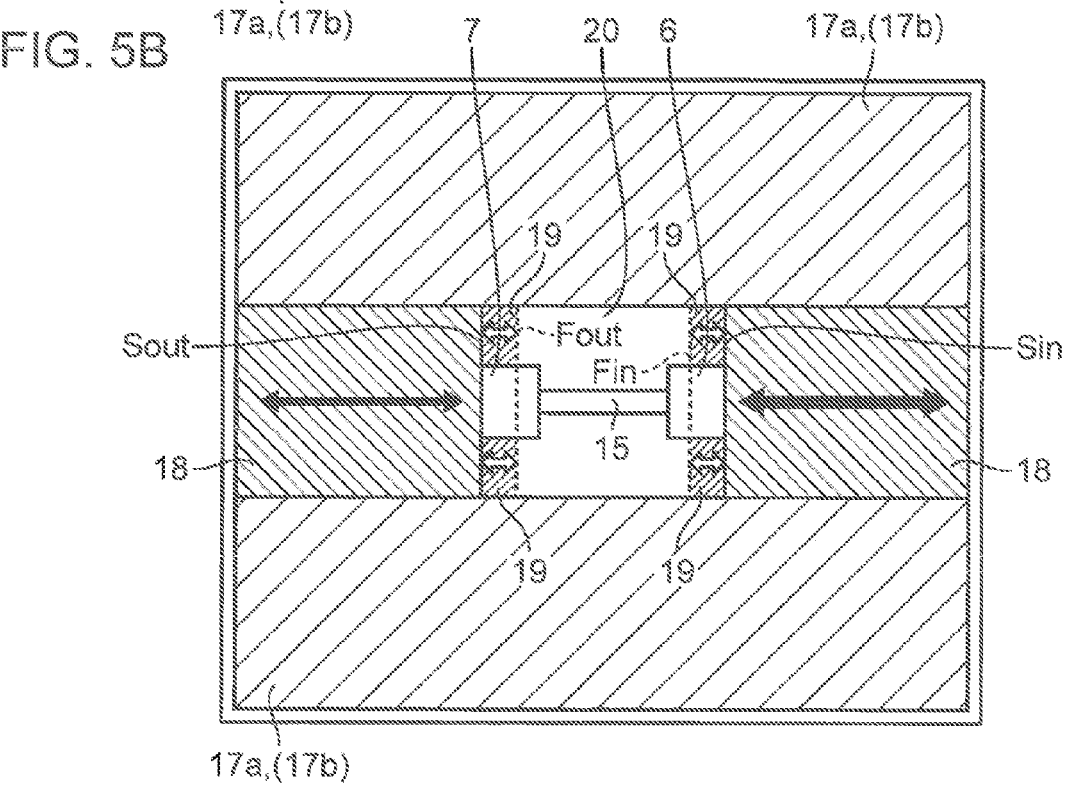

FIG. 5 is a cross sectional view taken along line V-V of FIG. 3 viewing from a position downstream of the partition wall 17a (17b). The partition wall 17a (17b) is disposed substantially perpendicular to the running course of the film.

As shown in FIG. 5(a), the partition wall 17a separating the preheating section and the stretching section has an opening 20 that permits the film 15 to pass along the running course, and a pair of slide members 18 that are independently movable on the opposite sides of the opening 20 and in widthwise directions of the film.

Moreover, as shown in FIG. 5(a), the pair of slide members 18 is to be disposed between the upper half and lower half of the partition wall 17a and on the both ends of the gripping tool running device 6 provided with the gripping tools (not illustrated) for gripping the film, and is a member that allows for independently adjusting the width of the opening 20 in the widthwise direction (black arrows in FIG. 5(a)) of the film.

That is to say, the pair of slide members 18 is a member that allows for adjusting the distances Rin and Rout to a desired value, where Rin is a distance between an inner end Fin of the film 15 and an inner end Sin of the slide member 18, and Rout is a distance between an outer end Fout of the film 15 and an outer end Sout of the slide member 18. The end of the film indicates an edge or a tip of the film, and the end of the slide member indicates an edge or a tip of the slide member on a side closer to the film.

Moreover, although the slide member 18 is not particularly limited as long as it allows the adjustment of the width of the opening provided in the partition wall and the widthwise position of the opening, it is preferable that the slide member 18 can freely move to the desired widthwise position of the opening with respect to the widthwise direction of the film 15.

The width of the opening in the present embodiment means a width of a gap in a widthwise direction of the film, which gap permits the film to pass. Moreover, the widthwise position of the opening means a center position of the film width.

Examples of specific configurations of the slide members 18 include configurations using sliding door members or bellows-shaped members. Configuration examples of the sliding door members include a configuration having grooves provided in a widthwise direction on the inner side of the slide members 18 and having projections that can freely move along the grooves, or having rollers provided above and under slide members 19, which allow free movement along the grooves.

Figure 6A:
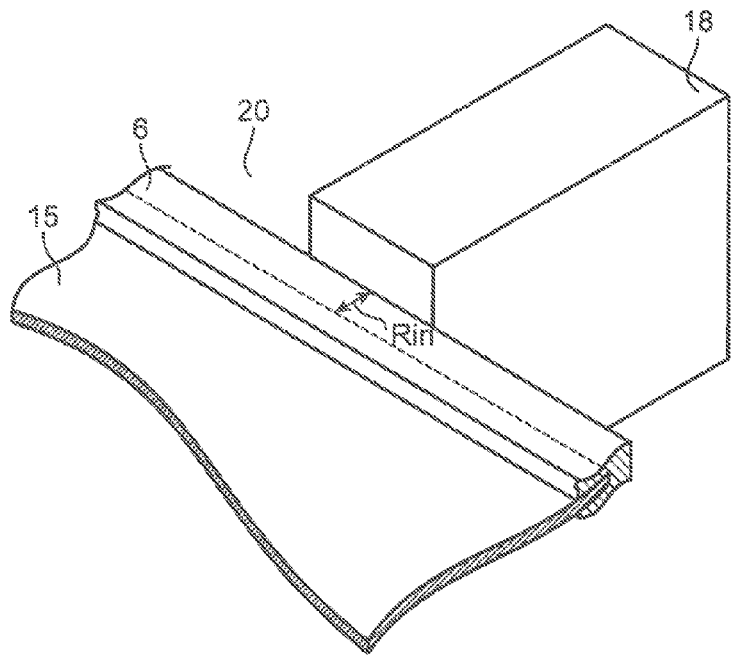
FIG. 6 is an enlarged perspective view showing a portion of a slide member having a sliding door structure from the inside of a partition wall in the embodiment of the present invention.
Figure 6B:
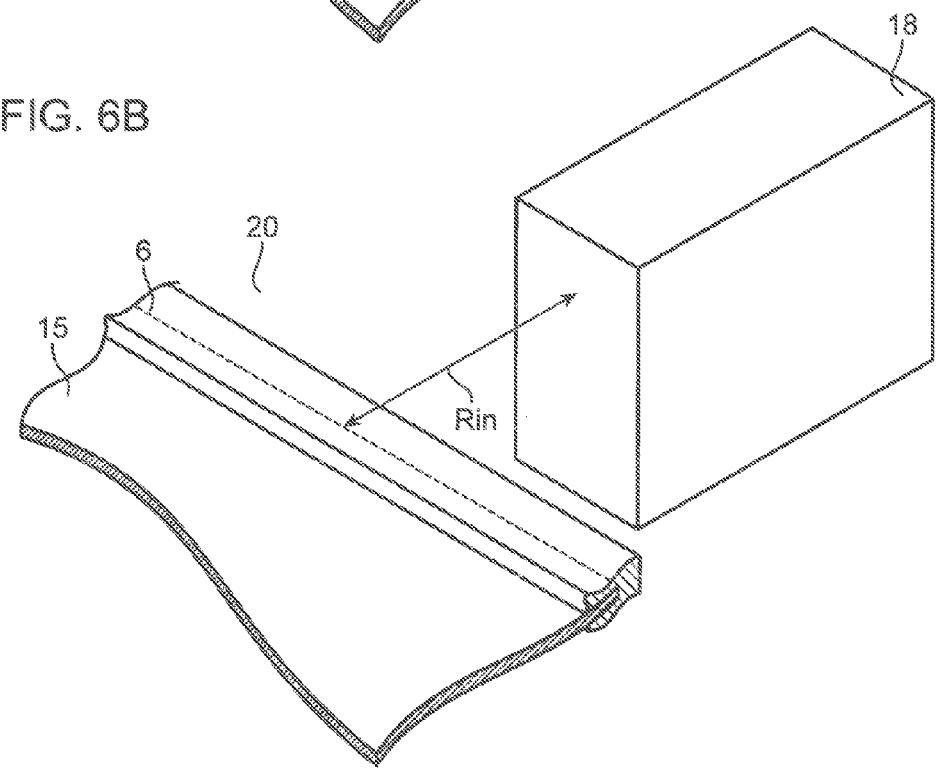
Figure 8A:
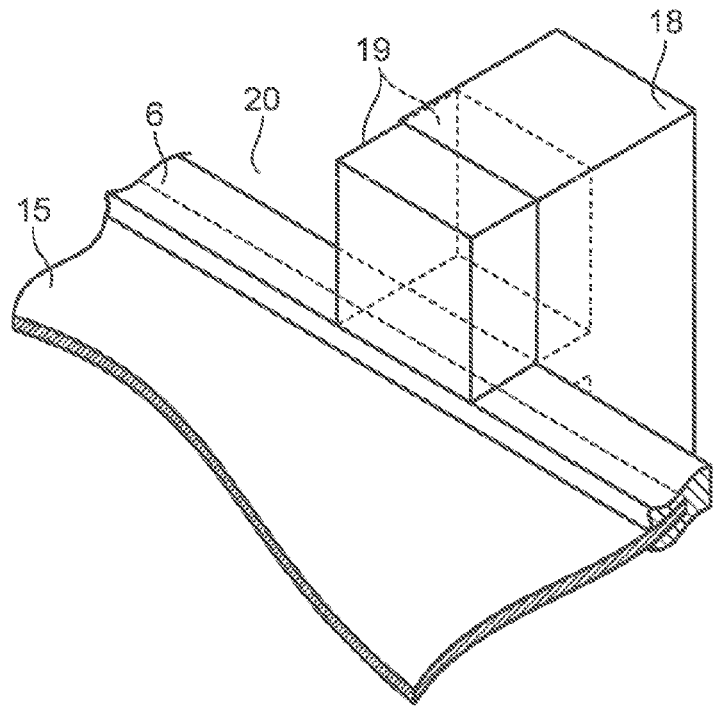
FIG. 8 is an enlarged perspective view showing a portion of slide members above and below a film, the slide member having a sliding door structure, from the inside of a partition wall in the embodiment of the present invention.
Figure 8B:
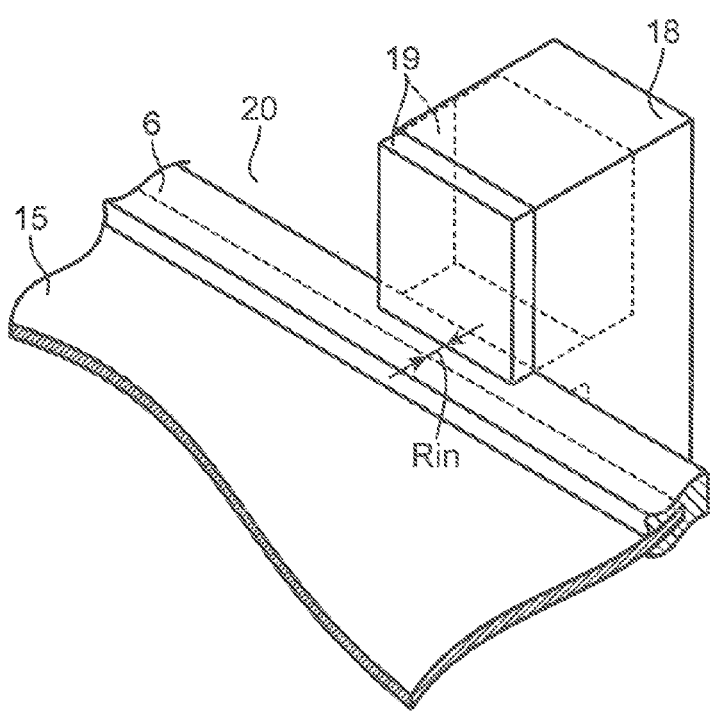
Figure 9A:
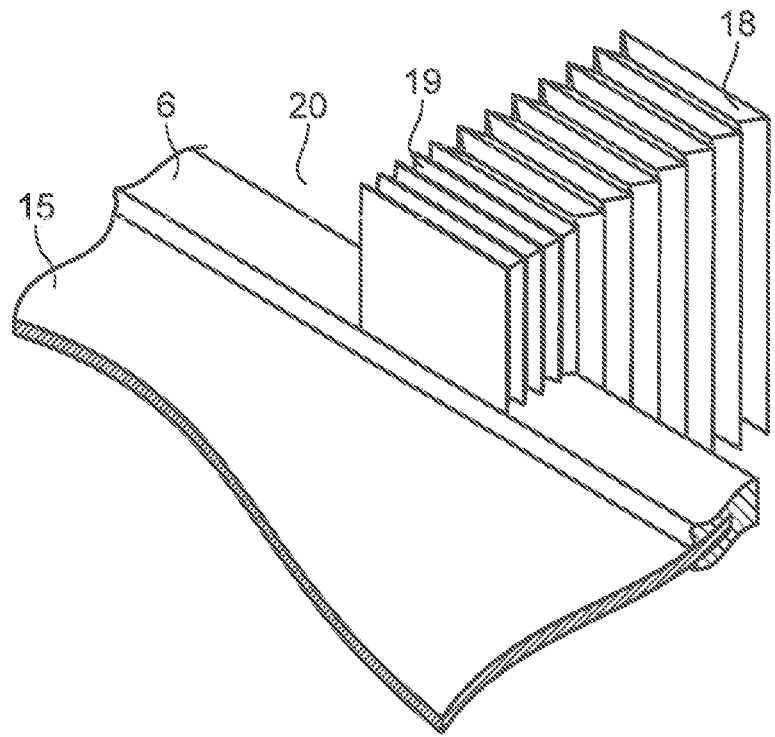
FIG. 9 is an enlarged perspective view showing a portion of slide members above and below a film, the slide member having a bellow structure, from the inside of a partition wall in the embodiment of the present invention.
Figure 9B:
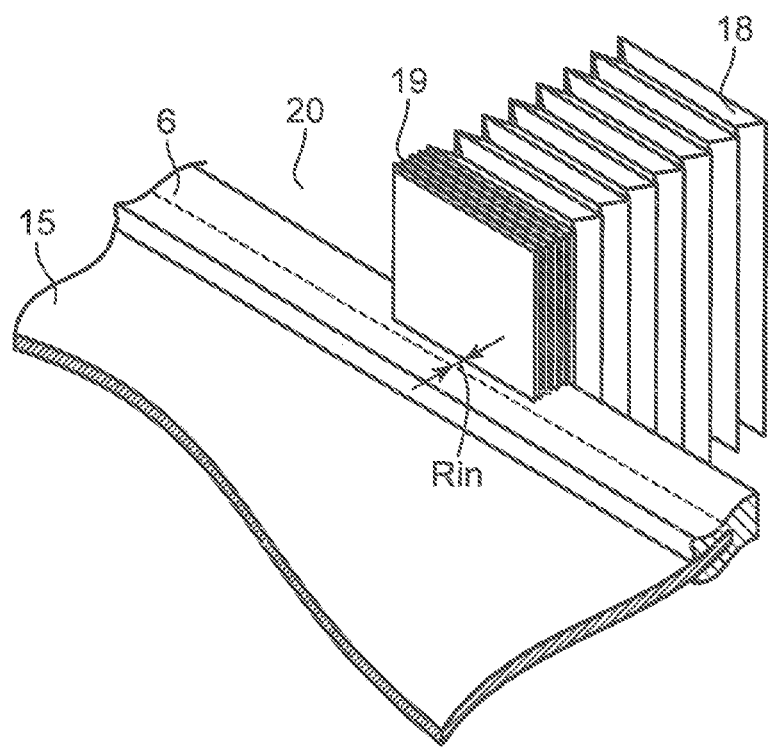

FIG. 6 is a perspective view showing an enlarged portion on an inner side of the partition wall in which the slide members 18 are of the sliding door members configuration, and rollers are provided above and under the slide members 18 as the sliding door members. In FIG. 6, the illustrations of the gripping tools that hold the film have been omitted. Hereinafter, the illustrations of the gripping tools in FIGS. 7 to 9 are similarly omitted.

The slide member 18 can be slid to the position at the end of the gripping tool running device 6, as shown in FIG. 6(*a*). The distance between the inner end of the film 15 and the inner end of the slide member 18 in this case will be the distance shown as Rin in FIG. 6(*a*). Moreover, FIG. 6(*b*) is a view showing a case in which the slide member 18 is moved to a desired position, and the distance between the inner end of the film 15 and the inner end of the slide member 18 in this case will be the distance shown as Rin in FIG. 6(*b*). In a case in which the slide member 18 is moved so as to separate away from the film to broaden the opening as in FIG. 6(*b*), the slide member 18 can cut across the side walls of the heating section.

Figure 7A:
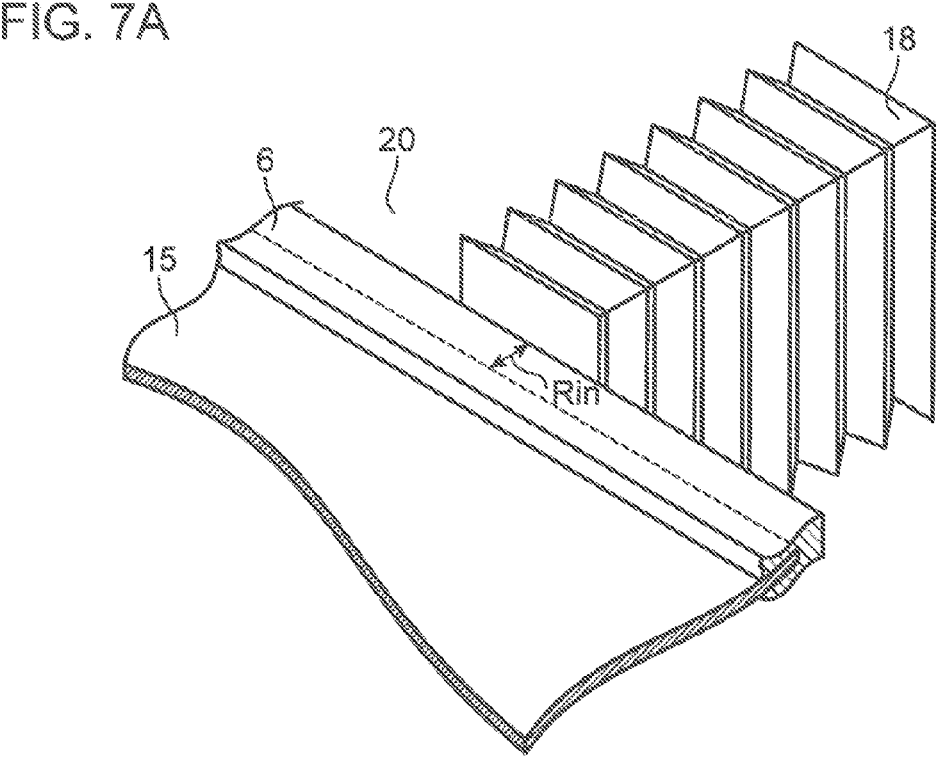
FIG. 7 is an enlarged perspective view showing a portion of a slide member having a bellow structure from the inside of a partition wall in the embodiment of the present invention.
Figure 7B:
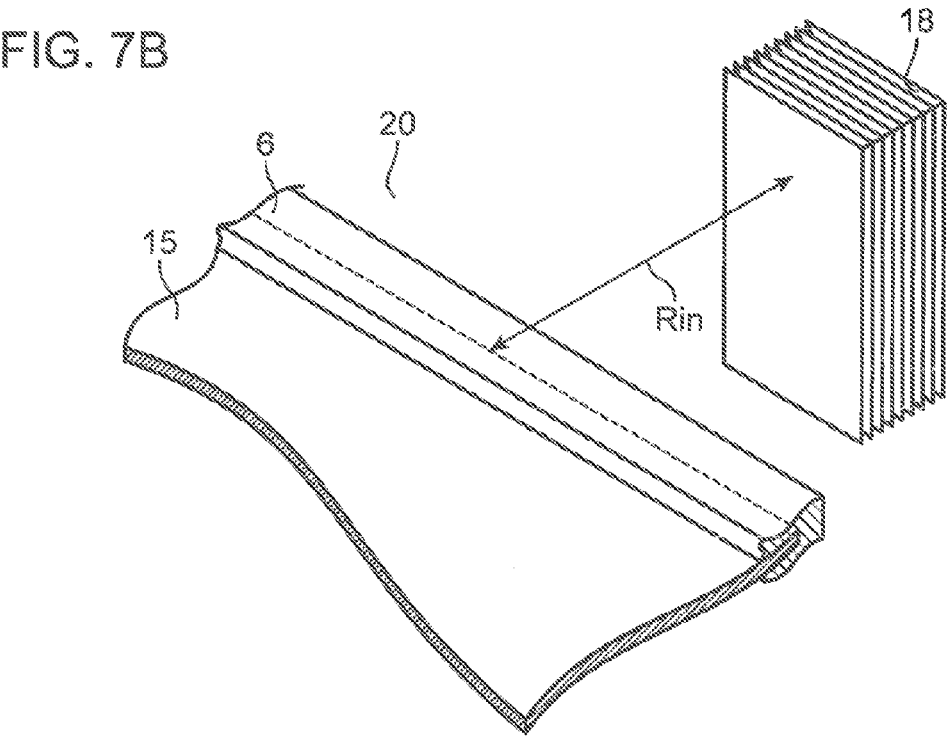

Next, FIG. 7 is an enlarged perspective view of a portion of an inner side of the partition wall in a case in which the slide member 18 is of a bellows-shaped member in an embodiment of the present invention.

As shown in FIG. 7(*a*), the slide member 18 can be extended to an end position of the gripping tool running device 6. The distance between the inner end of the film 15 and the inner end of the slide member 18 in this case will be the distance shown as Rin in FIG. 7(*a*). Moreover, FIG. 7(*b*) is a view showing a case in which the slide member 18 is moved to a position in a state in which the bellows is contracted to its uttermost extent, and in this case the distance Rin between the inner end of the film 15 and the inner end of the slide member 18 becomes the longest possible.

Although the above FIG. 6 and FIG. 7 are each a perspective view for describing a portion of an inner side of the film, the outer sides of the film are of the same configuration having the slide member 18 as in FIGS. 6 and 7, and thus illustrative descriptions of these have been omitted.

The partition wall further preferably has slide members that are independently movable in widthwise directions of the film, at openings above and under the gripping tool running devices.

By providing such slide members, it is possible to adjust, at each ends, the flowing in of air that accompanies the film run from a previous section to a subsequent section.

As shown in FIG. 5(*b*), the slide members 19 are members that allows for further independent adjustment in the widthwise direction of the film (white arrows in FIG. 5(*b*)) provided above and under the gripping tool running devices 6 and 7, and are members that allow for adjusting the width of the opening 20 independently in the widthwise direction of the film.

Specific examples of the slide members 19 provided in the openings above and under the gripping tool running device are, for example, as with the slide members 18, a configuration of the sliding door members or of the bellows-shaped members. As the sliding door members, grooves are formed in the width direction on inner sides of the slide members 18, and projections are provided that can freely move along the groove, or rollers are provided above and under the slide members 19 allowing for free movement along the groove.

Moreover, as another configuration of the slide members 19, a rail can be provided on a side surface of the partition wall either upstream or downstream of the slide members 18, and the slide members 19 are slid along the rail to move in the widthwise direction.

FIG. 8 is an enlarged perspective view of a portion of an inner side of a partition wall in a case in which sliding door members are used as the slide members 18 shown in FIG. 5(*b*), and the sliding door members are used also as the slide members 19 that are extended to an end position of the gripping tool running device 6 and is provided in an opening above and under the gripping tool running device. Moreover, the configuration provides rollers above and under the slide members 18 in FIG. 8, and the slide members 19 have projections that allows free movement along the grooves formed on the slide members 18 (not illustrated).

As shown in FIG. 8(*a*), the slide members 19 can be slid to the inner side of the film more than the position of the end of the film 15. As such, by extending the slide members 19 as much as possible, it is possible to make the distance Rin between the slide members 19 and the end of the film 15 be less than 0 mm. In the case of FIG. 8(*a*), the slide members 19 are positioned further inner of the end of the film 15, so therefore the Rin value will be expressed as a negative value. Moreover, as shown in FIG. 8(*b*), it is possible to precisely adjust the distance Rin between the slide members 19 and the film 15 by sliding the slide members 19 to a desired position.

FIG. 9 is an enlarged perspective view of a portion of an inner side of a partition wall in a configuration in which the slide members 18 shown in FIG. 5(*b*) are of a bellows-shape, and the slide members 19 are extended to the end position of the gripping tool running device 6 and provided in an opening above and under the gripping tool running device.

As shown in FIG. 9(*a*), it is possible to extend the slide members 19 to the inner side of the film further inner of the end position of the film 15 even in a case in which the slide members 19 are of a bellows-shaped configuration. As such, it is possible to make the distance Rin or Rout between the slide members 19 and the end of the film 15 to less than 0 mm by extending the slide members 19 to their longest extent. Moreover, as shown in FIG. 9(*b*), it is possible to more precisely adjust the distance Rin between the slide members 19 and the end of the film 15 by expanding and contracting the slide members 19.

FIGS. 8(*a*) and 9(*b*) and FIGS. 9(*a*) and 9(*b*) are each a perspective view for describing a portion on an inner side of the film, however outer sides of the film have similar configurations of the slide members 18 and slide members 19, as in FIGS. 8 and 9. Thus, the illustrative descriptions thereof have been omitted.

Moreover, the above description of the slide member configuration is not limited in particular, and may be a combination thereof such as using the sliding door member for the slide members 18 and further using bellows-shaped members for the slide members 19 provided in the opening above and under the gripping tool running devices.

As described above, it is possible to more precisely adjust the flowing in of air accompanied with the film that is run from a previous section to a subsequent section by using the slide members 19 in the opening above and under the gripping tool running devices.

Therefore, in a case of using such slide members 18 and 19, it is preferable to adjust the distance between Rin (Lin) and Rout (Lout) within a range of −1500 mm to 700 mm, wherein a width of the stretched film is within a range of 500 mm to 4000 mm. By adjusting within a further preferable range of −700 mm to 200 mm, the flowing in of accompanied air can be further adjusted.

Materials for the partition walls 17a and 17b and the slide members 18 and 19 are preferably materials having high adiabaticity such as metal and ceramics, or foamed material. Use of such materials allows for securing adiabaticity.

Moreover, the partition walls 17a and 17b and the slide members 18 and 19 preferably have a thickness of 1 to 500 mm, and more preferably has a thickness of 100 to 400 mm. The partition walls 17a and 17b and the slide members 18 and 19 having a thickness of less than 1 mm would make it difficult to achieve the adiabatic effect, which results in the occurrence of temperature unevenness in each section. On the other hand, a thickness exceeding 500 mm causes the film to take time in passing through the partition wall, thereby causing the film to cool down during the passage through the partition wall and causing optical unevenness.

Moreover, the slide members 19 preferably have a height between 10 mm to 600 mm, more preferably between 50 mm to 300 mm. The slide members 19 having a height of lower than 10 mm cannot achieve the effect of adjusting the flowing in of air accompanying the film. On the other hand, the slide members 19 having a height exceeding 600 mm would cause the amount of accompanied air flowing in to increase in parts where the flow is not adjusted. As a result, the temperature unevenness increases, thereby causing optical unevenness.

Moreover, it is preferable that when the long film has an alignment in a clockwise direction with respect to the partition wall, the width of the opening is adjusted in such a way that the distance between the end of the long film and the slide member in the inner side of the film running course is longer than that in the outer side of the film running course, and when the long film has an alignment in a counterclockwise direction with respect to the partition wall, the width of the opening is adjusted in such a way that the distance between the end of the long film and the slide member in the outer side of the film running course is longer than that in the inner side of the film running course.

As such, even with the partition wall that separates the stretching section and the thermosetting section, it is possible to adjust the flow of air accompanying the film through the opening of the partition wall from the previous section to the subsequent section by adjusting the width of the opening. This minimizes the occurrence of temperature unevenness on the ends of the stretched film, and minimizes the unevenness in the optical alignment.

The following specifically describes essential parts of the partition wall 17b shown in FIG. 3, with reference to FIG. 10. FIG. 10 shows schematic upper views of the essential parts of the partition wall 17b for each rail pattern.

Figure 10A:
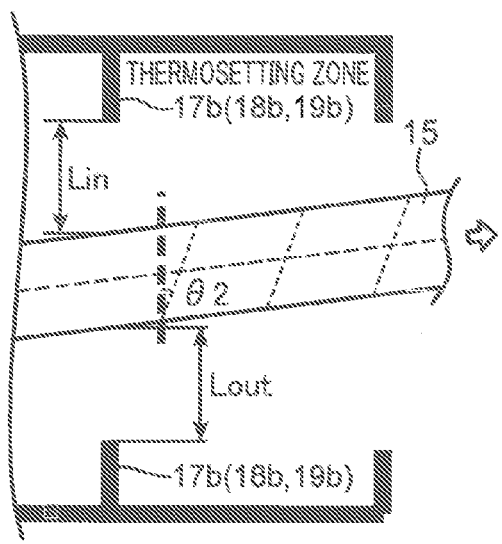
FIG. 10 is a schematic top view showing a main part of the partition wall shown in FIG. 3 for each rail pattern.
Figure 10B:
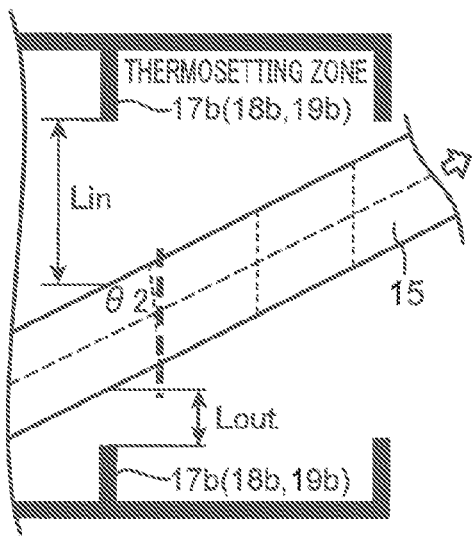
Figure 10C:
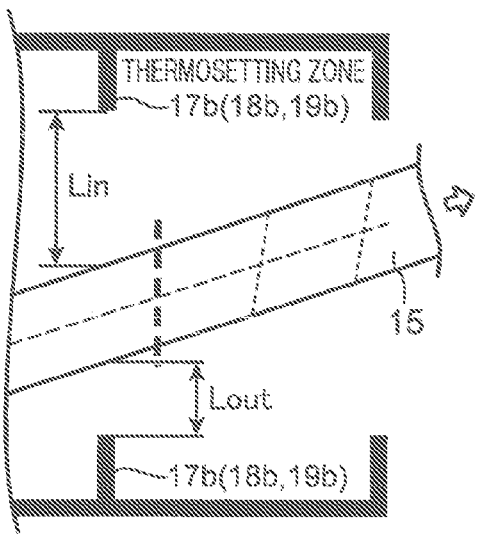

As shown in FIGS. 10(a) to 10(c), a distance between the inner end (upper side in drawing) of the film 15 and the slide member 18b (19b) is represented as Lin, and a distance between the outer end (lower side in drawing) of the film 15 and the slide member 18b (19b) is represented as Lout. When the alignment of the film 15 is of a rail pattern aligned in a clockwise direction with respect to the partition wall 17b (18b, 19b) as shown in FIG. 10(a), Lin is preferably longer than Lout, and when the alignment of the film 15 is of a rail pattern aligned in a counterclockwise direction with respect to the partition wall 17b (18b, 19b) as shown in FIG. 10(b), Lout is preferably longer than Lin.

Moreover, in a case in which the rail pattern is as shown in FIG. 10(c), in other words, an angle between the alignment axis of the film 15 and the partition wall 17b (18b, 19b) is substantially parallel, it is preferable that Lin on the inner side and Lout on the outer side are of substantially same distances. The expression of substantially parallel means that the angle is within the range of −5° to 5°. Moreover, the expression of substantially same distances means that a difference between Lin on the inner side and Lout on the outer side is not more than 50 mm, more preferably not more than 30 mm.

As described above, regarding the film running from the stretching section to the thermosetting section, in which the ends of the film is first cooled with respect to the alignment axis, adjustment of the lengths of Lin and Lout permits the flowing in of air having a high temperature, which air accompanies the film from the stretching section. This allows for reducing the temperature unevenness on the film ends.

More specifically regarding the rail patterns of FIGS. 10(a) to 10(c), the width of the opening 20 is preferably adjusted in the widthwise direction of the film so as to satisfy the following conditions [1] to [3], where θ2 is an angle between the alignment direction of the film 15 and the partition wall that separates the stretching section and the thermosetting section from each other.

A positive θ2 indicates that the film has an alignment in a clockwise direction with respect to the partition wall, and a negative θ2 indicates that the film has an alignment in a counterclockwise direction with respect to the partition wall.

When $-5° \leq θ2 \leq 5°$, $Lin=Lout$ [1]

When $θ2>5°$, $Lin>Lout$ [2]

When $θ2<-5°$, $Lin<Lout$ [3]

By adjusting the width of the opening 20 under such conditions, it is possible to minimize the temperature unevenness in the ends of the stretched film more accurately, and reduce the unevenness in optical alignment.

Next, in the partition separating the preheating section and the stretching section, it is preferable that the width of the opening is adjusted in such a way that the distance between the end of the long film and the slide member in a side having a smaller angle between the film running course and the partition wall is longer than that in a side having a larger angle between the film running course and the partition wall.

By adjusting the width of the opening as such, it is possible to adjust the flow of air that accompanies the film from the previous section to the subsequent section through the opening of the partition wall. This allows for minimizing the temperature unevenness in the film ends during stretching, and reducing the unevenness in optical alignment.

Moreover, the distance between the film end and the slide member represents a distance between the inner end of the film and the inner end of the slide member, or a distance between the outer end of the film and the outer end of the slide member. As described above, the slide members are members that allow for adjusting these distances to a preferred value.

The following specifically describes essential parts of the partition wall 17a shown in FIG. 2, with reference to FIG. 11. FIG. 11 shows schematic upper views of the essential parts of the partition wall 17a for each rail pattern.

Figure 11A:
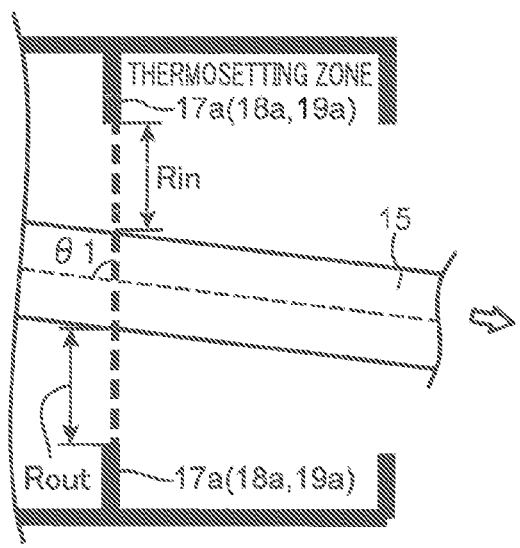
FIG. 11 is a schematic top view showing a main part of the partition wall shown in FIG. 3 for each rail pattern.
Figure 11B:
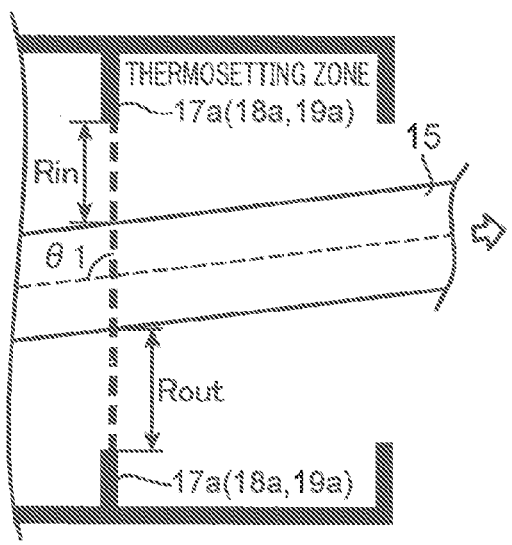
Figure 11C:
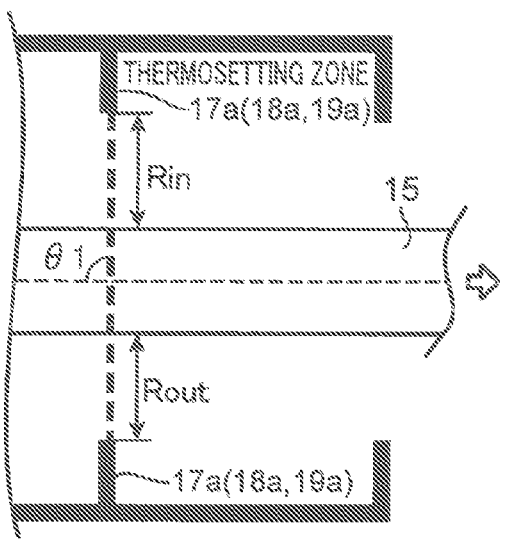

As shown in FIGS. 11(a) to 11(c), the distance between the inner end (upper side in drawing) of the film 15 and the slide member 17a (18a, 19a) is represented as Rin, and the distance between the outer end (lower side in drawing) of the film 15 and the slide member 17a (18a. 19a) is represented as Rout. With a rail pattern as shown in FIG. 11(a), it is preferable to have Rin on the side having a smaller angle (θ1 in FIG. 11(a)) between the running course of the film 15 (direction of arrow in FIG. 11(a)) and the slide members 17a (18a, 19a) be longer than Rout on the side having a greater angle between the running course of the film 15 and the partition wall.

As such, by largely widening Rin, the accompanying air of a high temperature flows in from the preheating section, and the temperature on the inner side of the film increases. This thus allows for minimizing the occurrence of optical unevenness.

Moreover, with a rail pattern as shown in FIG. 11(b), it is preferable to have Rout on the side having a smaller angle between the running course of the film 15 (direction of arrow in FIG. 11(b)) and the slide members 17a (18a, 19a) be larger than Rin on the side having a larger angle between the running course of the film 15 and the partition wall (θ1 in FIG. 11(a)), in contrary to FIG. 11(a).

Furthermore, with a rail pattern as shown in FIG. 11(c), in other words, in a case in which an angle between the running course of the film 15 (direction of arrow in FIG. 11(c)) and the slide members 17a (18a, 19a) is substantially perpendicular, it is preferable for Rin and Rout to have a substantially same distance. The expression substantially perpendicular means that the angle is in a range between 85° to 95°. Moreover, the substantially same distance means that a difference between Rin on the inner side and Rout on the outer side is 50 mm or less, more preferably 30 mm or less.

Regarding the rail patterns of FIGS. 11(a) to 11(c), the width of the opening 20 is preferably adjusted in width in the film widthwise direction so as to satisfy the following conditions [4] to [6], where θ1 is an angle between the running course of the long film and the partition separating the preheating section and the stretching section from each other:

When $85°≤θ1≤95°, Rin=Rout$      [4]

When $θ1<85°, Rin>Rout$      [5]

When $θ1>95°, Rin<Rout$      [6]

By adjusting the width of the opening 20 under such conditions, it is possible to minimize the temperature unevenness in the ends of the stretched film and reduce the unevenness in optical alignment.

Each of the above adjustment of the slide members in the partition wall separating the stretching section and the thermosetting section from each other and the adjustment of the slide members in the partition wall separating the preheating section and the stretching section from each other can be carried out singly, however by carrying out these adjustments simultaneously, the effect of the present invention is further improved and is thus preferred.

In the oblique stretching tenter used in the production method according to the embodiment of the present invention, the gripping tool running device that restricts the track of the gripping tool often require a large bending rate, particularly at places in which the film runs obliquely. In order to avoid interference between the gripping tools caused by steep curves or any local stress focusing, it is desirable for the track of the gripping tool to be cured in a bent part of the gripping tool running device.

A stretching ratio (W/W0) in the oblique stretching step is preferably from 1.3 to 3.0, more preferably from 1.5 to 2.8. A stretching ratio in this range reduces the thickness unevenness in the widthwise direction, and thus is preferred. In the stretching section of the oblique stretching tenter, the thickness unevenness in the widthwise direction can be of a further better level by providing a difference between stretching temperatures in the widthwise direction. W0 represents a width of the film that has not been stretched, and W represents the width of the stretched film.

(Running Rolls)

The number of running rolls 8 is not specified in particular, and a step of laminating a protection sheet for protecting the long stretched film can be provided between the arranged running rolls. Moreover, a step of knurling with an embossed ring and a back roll on both left and right ends of the film may be provided to apply an embossed section (not illustrated) on the film ends before the film is wound.

For example, a thickness meter and an optical value measuring device, each of which can perform measurement online, can be provided between the disposed running rolls.

Moreover, a static eliminating device for eliminating static from the long stretched film can be provided upstream or downstream of the disposed running rolls or in between the plurality of running rolls. The static eliminating device can be adapted to apply a reverse potential from the static eliminating device or a forced charging device when winding the film so that the charged potential in re-feeding the wound wire would be ±2 kV or lower, or alternatively can be adapted to eliminate static by a static eliminator in which the forced charged potential is converted into alternate positive and negative potentials within 1 Hz to 150 Hz.

Moreover, ionizers that generate ionic air or static eliminating bars may also be used instead of the static eliminator. In the embodiment, static elimination by an ionizer is carried out by blowing ionic air against the film that is wound after being run along the running rolls from the emboss processing device. Ionic air is generated from the static eliminator. A publicly known static eliminator can be used without limitation.

Moreover, it is preferable to trim both ends (both sides) of the long stretched film, to cut off any gripping tool marks left on the opposite ends of the long stretched film where the film was gripped by the gripping tool of the tenter, or to achieve a desired width.

The trimming can be performed in one go, or may be performed in several goes.

Moreover, it is also possible to once wind the long stretched film and again feed the long stretched film if necessary to trim both the ends of the long stretched film, and again wind the film to obtain the wound roll of the long stretched film.

(Winding Device)

The winding step according to the production method of the present invention is a step for winding the long stretched film. The following describes the winding device used in the winding step.

As shown in FIG. 2 and FIG. 3, the winding device 4 is provided so that the film can be taken in at a predetermined angle with respect to the outlet of the oblique stretching tenter, to allow minute control of the position and angle at which the film is taken in, which results in obtaining a long stretched film having few unevenness in film thickness and optical value. It is thus possible to effectively prevent the generation of creases on the film and improve the winding properties of the film. As a result, it is possible to wind the film in long lengths.

In the present embodiment, drawing tension T (N/m) of the stretched film is preferably adjusted to be within the range of 100 N/m<T<300 N/m, preferably within the range of 150 N/m<T<250 N/m. A drawing tension of lower than 100 N/m would allow the film to easily form sags and creases, and retardation and profiles in the widthwise direction of the alignment axis would also deteriorate. On the other hand, a drawing tension or 300 N/m or more would worsen the unevenness in alignment angle in the widthwise direction, thereby resulting in a decrease in widthwise yield (widthwise yield efficiency).

Moreover, in the present embodiment, it is preferable to control the variance in the drawing tension T to within ±5%, preferable in an accuracy of within ±3%. A variation in the drawing tension T of ±5% or more would cause an increase in the unevenness in optical characteristics in the widthwise direction and flow direction. Ways to control the variation in the drawing tension T within the foregoing range include measuring the load applied on the first roll at the tenter outlet, in other words measuring the film tension, and then controlling the rotation rate of the drawing roll by a general PID control method so that the film tension value is made constant. One way of measuring the load is to attach a load cell to a bearing of the roll, and measure the load applied to the roll, in other words the tension of the film. A publicly known tension or compression load cell can be used as the load cell.

The stretched film is released from the gripping tools, is discharged from the tenter outlet, and is sequentially wound to the roll core (winding roll) to obtain a roll of the long stretched film.

Moreover, a masking film can be superimposed before the film is wound and can be wound simultaneously in order to prevent the blocking of the film, or alternatively, the long stretched film can be wound while laminating together at least one of the ends of the long stretched film, preferably both edges with a tape or like material. The masking film is not limited in particular as long as it can protect the film, and for example may be a polyethylene terephthalate film, a polyethylene film, or a polypropylene film.

[Thermoplastic Resin and Film Forming Method]

Examples of the thermoplastic resins that can be used in the present embodiment include polycarbonate resins, polyether sulfone resins, polyethylene terephthalate resins, polyimide resins, polymethyl metacrylate resins, polysulfone resins, polyarylate resins, polyethylene resins, polyvinyl chloride resins, olefin polymer resins having an alicyclic structure, and cellulose ester resins.

Among these resins, the polycarbonate resins, the olefin polymer resins having an alicyclic structure or the cellulose ester resins are preferably used in terms of transparency and mechanical strength. Further among these resins, the olefin polymer resins having an alicyclic structure or the cellulose ester resins are preferable since these resins allow easy adjustment in phase differences when made into an optical film.

The following describes the structures of the olefin polymer resins having an alicyclic structure and the cellulose ester resins, and further a method for forming a long film containing these resins.

(Olefin Polymer Resin)

Examples of the alicyclic olefin polymer resins include the cyclic olefin random multi-component copolymer disclosed in Japanese Unexamined Patent Publication No. H05-310845, the hydrogenated polymer disclosed in Japanese Unexamined Patent Publication No. H05-97978, and the thermoplastic dicyclopentadiene ring-opened polymer and hydrogenated products thereof disclosed in Japanese Unexamined Patent Publication No. H11-124429.

The following specifically describes the olefin polymer resins having an alicyclic structure. An alicyclic olefin polymer resin is a polymer including an alicyclic structure, such as a saturated alycyclic hydrocarbon (cycloalkane) structure or an unsaturated alycyclic hydrocarbon (cycloalkene) structure. Although the number of carbon atoms included in the alicyclic structure is not limited in particular, the film is highly balanced in mechanical strength, thermal resistance, and film forming properties and is thus favored in cases in which the number of carbons is usually from 4 to 30, preferably 5 to 20, more preferably 5 to 15.

The proportion of repeating units containing an alicyclic structure inside the alicyclic olefin polymer can be selected as appropriate, however it is preferably not less than 55% by weight, more preferably not less than 70% by weight, and particularly preferably not less than 90% by weight. The proportion of the repeating units having an alicyclic structure in the alicyclic polyolefin resin in this range allows improvement in the transparency and thermal resistance of the optical material of the long stretched film and the like obtained from the stretched film of the present invention, and is thus preferred.

Examples of the olefin polymer resins having an alicyclic structure include norbornene resins, monocyclic cyclic olefin resins, cyclic conjugated diene resins, vinyl alicyclic hydrocarbon resins, and their hydrides. Among these resins, the norbornene resins are suitably used since they have good transparency and formability.

Examples of the norbornene resins include ring-opened polymers of a monomer having a norbornene structure, ring-opened copolymers of a monomer having a norbornene structure and another monomer, hydrides of these ring-opened polymers and copolymers, addition polymers of a monomer having a norbornene structure, addition copolymers of a monomer having a norbornene structure and another monomer, and hydrides of the addition polymers or copolymers. Among these norbornene resins, the ring-opened (co)polymer hydrides of a monomer having the norbornene structure is suitably used in particular in terms of transparency, formability, thermal resistance, low absorbency, dimensional stability, and lightness.

Examples of the monomer having a norbornene structure include bicyclo[2.2.1]hept-2-ene (trivial name: norbornene), tricyclo[4.3.0.1$^{2,5}$]deca-3,7-diene (trivial name: dicyclopentadiene), 7,8-benzotricyclo[4.3.0.1$^{2,5}$]deca-3-ene (trivial name: methano tetrahydrofluorene), tetracyclo[4.4.0.1$^{2,5}$.1$^{7,10}$]dodeca-3-ene (trivial name: tetracyclododecene), and derivatives of these compounds (for example, having a substituent on its ring). Examples of the substituent include an alkyl group, an alkylene group, and a polar group. As the substituent, a plurality of identical or different substituents can bond to the ring. One type of monomer having a norbornene structure can be used singularly or two or more types thereof may be used in combination.

Examples of the types of polar groups include heteroatoms or atomic groups having heteroatoms. Heteroatoms may be, for example, an oxygen atom, a nitrogen atom, a sulfur atom, a silicon atom, or a halogen atom. Specific examples of the polar groups include carboxyl groups, carbonyloxycarbonyl groups, epoxy groups, hydroxyl groups, oxy groups, ester groups, silanol groups, silyl groups, amino groups, nitrile groups, and sulfone groups.

Examples of the another monomer that can be subjected to ring-opening copolymerization with a monomer having a norbornene structure include monocyclic olefins such as cyclohexene, cycloheptene and cyclooctene and their derivatives, and cyclic conjugated dienes such as cyclohexadiene and cycloheptadiene and their derivatives.

The ring-opened polymer of a monomer having a norbornene structure, and a ring-opened copolymer thereof with another monomer capable of copolymerization with the monomer having a norbornene structure, can be obtained by (co)polymerizing the monomer in the presence of a publicly known ring-opened polymerization catalyst.

Examples of the another monomer capable of being subjected to addition copolymerization with a monomer having a norbornene structure include α-olefin having a carbon number of 2 to 20 such as ethylene, propylene, and 1-butene and their derivatives; cycloolefins such as cyclobutene, cyclopentene, and cyclohexene and their derivatives; and non-conjugated dienes such as 1,4-hexadiene, 4-methyl-1,4-hexadiene, and 5-methyl-1,4-hexadiene. These monomers can be used singularly, or two or more types thereof may be used in combination. Among these monomers, α-olefin is preferably used, and ethylene is more preferably used.

The addition polymer of a monomer having a norbornene structure and the addition copolymer thereof with another monomer capable of being subjected to copolymerization can be obtained by polymerizing the monomer in the presence of a publicly known addition polymerization catalyst.

A hydrogenated product of the ring-opened polymer of a monomer having a norbornene structure, a hydrogenated product of a ring-opened copolymer of a monomer having a norbornene structure and another monomer capable of being subjected to ring-opening copolymerization, a hydrogenated product of an addition polymer of a monomer having a norbornene structure, and a hydrogenated product of an addition copolymer of a monomer having a norbornene structure and another monomer capable of being subjected to copolymerization, are obtained by adding a publicly known hydrogenation catalyst containing a transition metal such as nickel or palladium to a solution of these polymers, and hydrogenating a carbon-carbon unsaturated bond by preferably 90% or more.

Among the norbornene resins, it is preferable to use those that have a structure of X: bicyclo[3.3.0]octane-2,4-diyl-ethylene and a structure of Y: tricyclo[4.3.0.12,5]decane-7,9-diyl-ethylene as repeating units and whose content of these repeating units is 90% by weight with respect to the entire content of the repeating units in the norbornene resin, and whose ratio of the content rate of X to the content rate of Y in weight ratio X:Y is 100:0 to 40:60. By using such a resin, it is possible to obtain optical material from the stretched film of the present invention that shows no change in dimension for a long period of time and which has excellent stability in optical characteristics.

The molecular weight used in the norbornene resin is selected as appropriate depending on the aim of use, however is usually from 10,000 to 100,000, preferably from 15,000 to 80,000, more preferably from 20,000 to 50,000 in weight-average molecular weight (Mw) of polyisoprene conversion when measured by gel permeation chromatography using cyclohexane (toluene if the thermoplastic resin does not dissolve) as a solvent (if the solvent is toluene, the Mw is of polystyrene conversion). With the weight-average molecular weight in this range, the mechanical strength and forming processability of the optical material obtained from the stretched film of the present invention is highly balanced, and is thus favorable.

The glass transition temperature of the norbornene resin is selected as appropriate depending on its use, however is preferably not lower than 80° C., more preferably within a range of 100° C. to 250° C. By having the glass transition temperature within this range, the optical material obtained from the stretched film of the present invention would have excellent durability without any deformation or stress applied during its use under high temperature.

The molecular weight distribution (weight-average molecular weight (Mw)/number-average molecular weight (Mn)) of the norbornene resin is not limited in particular, however is usually in the range of 1.0 to 10.0, preferably 1.1 to 4.0, more preferably 1.2 to 3.5.

An absolute value of the photoelastic coefficient C of the norbornene resin is preferably not more than $10 \times 10^{-12}$ $Pa^{-1}$, is more preferably not more than $7 \times 10^{-12}$ $Pa^{-1}$, and is particularly preferably not more than $4 \times 10^{-12}$ $Pa^{-1}$. The photoelastic coefficient C is a value calculated as $C = \Delta n/\sigma$, where $\Delta n$ represents birefringence and $\sigma$ represents stress. By having the photoelastic coefficient of the thermoplastic resin in this range, it is possible to reduce the unevenness in in-plane retardation (Re) later described.

The thermoplastic resin used in the present invention may be a resin containing compounding agents such as colorants for example pigment or dyes, fluorescent brightening agents, dispersants, thermal stabilizers, photostabilizers, ultraviolet absorbers, antistatic agents, antioxidants, lubricants, and solvents, as appropriate.

The content of residual volatile constituents within the stretched film of norbornene resin is not restricted in particular, however is preferably not more than 0.1% by weight, more preferably not more than 0.05% by weight, further preferably not more than 0.02% by weight. By having the content of the volatile constituents within this range, the dimensional stability improves, aging of Re and Rth is reduced, and further deterioration of the optical film, polarizer or organic electroluminescence display device obtained from the stretched film of the present invention is minimized, thereby allowing for a stable display of the display device for a long period of time. The residual volatile constituents are substances having a molecular weight of not more than 200 that is contained in the film by a minute amount, and for example are residual monomers or solvents. The residual volatile constituent content can be determined by analyzing the film by gas chromatography, as a total amount of substances having not more than the molecular weight of 200.

A saturated water absorption of the stretched film of the norbornene resin is preferably not more than 0.03% by weight, further preferably not more than 0.02% by weight, particularly preferably not more than 0.01% by weight. By having the saturated water absorption within this range, the aging of Re and Rth is reduced, and further the deterioration of the optical film, polarizer or organic electroluminescence display device obtained from the stretched film of the present invention is minimized, which thus allows for maintaining a stable display of the display device for a long period of time.

The saturated water absorption is a value obtained by immersing a testing sample of the film in water of a certain temperature for a certain time, and calculating the percentage of the increased mass with respect to the mass of the testing sample before immersion. Normally, the testing sample is measured after immersion in water at a temperature of 23° C. for 24 hours. The saturated water absorption of the stretched film of the present invention can be adjusted in value to the foregoing value by reducing the amount of the polar group contained in the thermoplastic resin, however the resin preferably does not contain a polar group.

(Method of Forming Olefin Polymer Resin Film)

Favorable methods for forming a film by using the norbornene resin are the solution film forming method and melt extrusion method. The melt extrusion method includes an inflation method using dies, and in terms of having excellent productivity and accuracy in thickness, the use of a T-die is preferred.

The extrusion method using the T-die can produce a film with good variation in optical characteristics such as retardation and alignment angles, by maintaining a molten thermoplastic resin in a stable state when made in close contact with a cooling drum, as described in Japanese Unexamined Patent Publication No. 2004-233604.

Specifically, examples of the methods are as follows: 1) a method in which a thermoplastic resin in a sheet form extruded from the dies is made into close contact with a cooling drum in the pressure of not more than 50 kPa and is then drawn, in producing the long film by the melt extrusion method; 2) a method in which a covering member covers from an opening of the dies to a cooling drum that is made in contact with the film in producing the long film by the melt extrusion method, in which a distance from the covering member to the opening of the dies or to the cooling drum is not more than 100 mm; 3) a method in which the temperature of the atmosphere within 10 mm of the thermoplastic resin extruded out from the opening of the dies is heated to a specific temperature, in producing the long film by the melt extrusion method; 4) a method in which a thermoplastic resin in sheet form extruded from the dies so as to satisfy a relationship is made into contact with a cooling drum under a pressure of 50 kPa or less and drawn; and 5) a method in which air is blown to the thermoplastic resin in sheet form extruded from the opening of the dies in producing the long film by the melt extrusion method, which air has a difference of not more than 0.2 m/s in velocity from the drawing velocity of the cooling drum made into contact with the resin first.

The above long film containing the olefin polymer resin may be of a single layer, or may be a stacked film of two layers or more. The stacked film can be obtained by a publicly known method such as the coextrusion method, cocasting method, film lamination method, or application method. Among these methods, the coextrusion method or the cocasting method is preferred.

(Cellulose Ester Resin)

A favorable cellulose ester resin film contains a cellulose acylate satisfying the following formulae (i) and (ii) and further contains a compound represented by the following general formula (A):

$$2.0 \leq Z1 < 3.0 \quad \text{Formula (i)}$$

$$0 \leq X < 3.0 \quad \text{Formula (ii)}$$

(where in Formulae (i) and (ii), Z1 is a total degree of acyl substitution in the cellulose acylate, and X is a sum total of a degree of propionyl substitution and a degree of butylyl substitution, in the cellulose acylate.)

<Compound of General Formula (A)>

The following describes in detail of the general formula (A).

[Chem. 1]

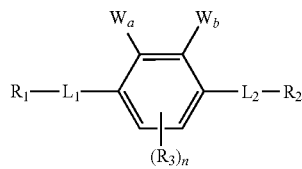

General formula (A)

In general formula (A), $L_1$ and $L_2$ each independently represent a single bond or a bivalent linking group.

Examples of $L_1$ and $L_2$ include the structures represented by the following formulae:

[Chem. 2]

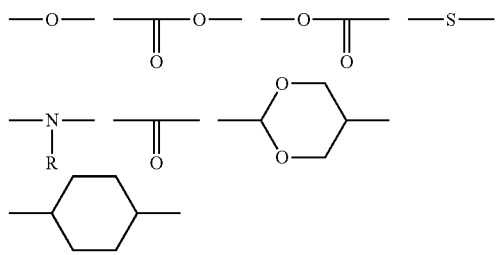

(where R represents a hydrogen atom or a substituent.)

$L_1$ and $L_2$ are preferably —O—, —COO—, or —OCO—.

$R_1$, $R_2$ and $R_3$ each independently represent a substituent. Specific examples of the substituent represented by $R_1$, $R_2$ and $R_3$ include: halogen atoms (e.g. fluorine atom, chlorine atom, bromine atom, iodine atom), alkyl groups (e.g. methyl group, ethyl group, n-propyl group, isopropyl group, tert-butyl group, n-octyl group, 2-ethyl hexyl group), cycloalkyl groups (e.g. cyclohexyl group, cyclopentyl group, 4-n-dodecyl cyclohexyl group), alkenyl groups (e.g. vinyl group, allyl group), cycloalkenyl groups (e.g. 2-cyclopentene-1-yl, 2-cyclohexene-1-yl group), alkynyl groups (e.g. ethynyl group, propargyl group), aryl groups (e.g. phenyl group, p-tolyl group, naphthyl group), heterocyclic groups (e.g. 2-furyl group, 2-thienyl group, 2-pyrimidinyl group, 2-benzothiazolyl group), cyano groups, hydroxyl groups, nitro groups, carboxyl groups, alkoxy groups (e.g. methoxy group, ethoxy group, isopropoxy group, tert-butoxy group, n-octyloxy group, 2-methoxyethoxy group), aryloxy groups (e.g. phenoxy group, 2-methylphenoxy group, 4-tert-butylphenoxy group, 3-nitrophenoxy group, 2-tetradecanoyl aminophenoxy group), acyloxy groups (e.g. formyloxy group, acetyloxy group, pivaloyloxy group, stearoyloxy group, benzoyloxyoxy group, p-methoxyphenyl carbonyloxy group), amino groups (e.g. amino group, methylamino group, dimethylamino group, anilino group, N-methyl-anilino group, diphenylamino group), acylamino groups (e.g. formylamino group, acetylamino group, pivaloylamino group, lauroylamino group, benzoyloxyamino group), alkyl and arylsulfonylamino groups (e.g. methylsulfonylamino group, butylsulfonylamino group, phenylsulfonylamino group, 2,3,5-trichlorophenylsulfonylamino group, p-methylphenylsulfonylamino group), mercapto groups, alkylthio groups (e.g. methylthio group, ethylthio group, n-hexadecylthio group), arylthio groups (e.g. phenylthio group, p-chlorophenylthio group, m-methoxyphenylthio group), sulfamoyl groups (e.g. N-ethylsulfamoyl group, N-(3-dodecyloxypropyl) sulfamoyl group, N,N-dimethylsulfamoyl group, N-acetylsulfamoyl group, N-benzoyloxysulfamoyl group, N—(N'phenylcarbamoyl) sulfamoyl group), sulfo groups, acyl groups (e.g. acetyl group, pivaloylbenzoyloxy group), carbamoyl groups (e.g. carbamoyl group, N-methylcarbamoyl group, N,N-dimethylcarbamoyl group, N,N-di-n-octylcarbamoyl group, N-(methylsulfonyl)carbamoyl group).

$R_1$ and $R_2$ are preferably a substituted or nonsubstituted phenyl group and a substituted or nonsubstituted cyclohexyl group. More preferably, $R_1$ and $R_2$ are a phenyl group having a substituent and a cyclohexyl group having a substituent, and are further preferably a phenyl group having a substituent in the 4-position and a cyclohexyl group having a substituent in the 4-position.

$R_3$ is preferably a hydrogen atom, a halogen atom, an alkyl group, an alkenyl group, an aryl group, a heterocyclic group, a hydroxyl group, a carboxyl group, an alkoxy group, an aryloxy group, an acyloxy group, a cyano group, or an amino group, and is further preferably a hydrogen atom, a halogen atom, an alkyl group, a cyano group, or an alkoxy group.

Wa and Wb represent a hydrogen atom or a substituent, where:

(I) Wa and Wb can bond with each other and form a ring, (II) at least one of Wa and Wb can have a ring structure, or (III) at least one of Wa and Wb may be an alkenyl group or an alkynyl group.

Specific examples of the substituent represented by Wa and Wb include: halogen atoms (e.g. fluorine atom, chlorine atom, bromine atom, iodine atom), alkyl groups (e.g. methyl group, ethyl group, n-propyl group, isopropyl group, tert-butyl group, n-octyl group, 2-ethylhexyl group), cycloalkyl groups (e.g. cyclohexyl group, cyclopentyl group, 4-n-dodecylcyclohexyl group), alkenyl groups (e.g. vinyl group, allyl group), cycloalkenyl groups (e.g. 2-cyclopentene-1-yl, 2-cyclohexene-1-yl group), alkynyl groups (e.g. ethynyl group, propargyl group), aryl groups (e.g. phenyl group, p-tolyl group, naphthyl group), heterocyclic groups (e.g. 2-furyl group, 2-thienyl group, 2-pyrimidinyl group, 2-benzothiazolyl group), cyano groups, hydroxyl groups, nitro groups, carboxyl groups, alkoxy groups (e.g. methoxy group, ethoxy group, isopropoxy group, tert-butoxy group, n-octyloxy group, 2-methoxyethoxy group), aryloxy groups (e.g. phenoxy group, 2-methylphenoxy group, 4-tert-butylphenoxy group, 3-nitrophenoxy group, 2-tetradecanoylaminophenoxy group), acyloxy groups (e.g. formyloxy group, acetyloxy group, pivaloyloxy group, stearoyloxy group, benzoyloxyoxy group, p-methoxyphenylcarbonyloxy group), amino groups (e.g. amino group, methylamino group, dimethylamino group, anilino group, N-methyl-anilino group, diphenylamino group), acylamino groups (e.g. formylamino group, acetylamino group, pivaloylamino group, lauroylamino group, benzoyloxyamino group), alkyl and arylsulfonylamino groups (e.g. methylsulfonylamino group, butylsulfonylamino group, phenylsulfonylamino group, 2,3,5-trichlorophenylsulfonylamino group, p-methylphenylsulfonylamino group), mercapto groups, alkylthio groups (e.g. methylthio group, ethylthio group, n-hexadecylthio group), arylthio groups (e.g. phenylthio group, p-chlorophenylthio group, m-methoxyphenylthio group), sulfamoyl groups (e.g. N-ethylsulfamoyl group, N-(3-dodecyloxypropyl)sulfamoyl group, N,N-dimethylsulfamoyl group, N-acetylsulfamoyl group, N-benzoyloxysulfamoyl group, N—(N'phenylcarbamoyl)sulfamoyl group), sulfo groups, acyl groups (e.g. acetyl group, pivaloylbenzoyloxy group), carbamoyl groups (e.g. carbamoyl group, N-methylcarbamoyl group, N,N-dimethylcarbamoyl group, N,N-di-n-octylcarbamoyl group, N-(methylsulfonyl)carbamoyl group).

The substituents may further be substituted by the above groups.

(1) In a case in which Wa and Wb bond to each other and form a ring, the structure may be as described below.

In the case in which Wa and Wb bond to each other and form a ring, the ring preferably is a nitrogen-containing 5-membered ring or a sulfur-containing 5-membered ring, and is particularly preferably a compound represented by the following general formula (1) or general formula (2).

[Chem. 3]

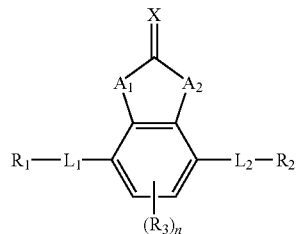

General formula (1)

In general formula (1), $A_1$ and $A_2$ each independently represent —O—, —S—, —NRx- (Rx represents a hydrogen atom or a substituent), or —CO—. Examples of the substituent represented by Rx are the same as the specific examples of the substituents represented by Wa and Wb described above. Rx is preferably a hydrogen atom, an alkyl group, an aryl group, or a heterocyclic group.

In general formula (1), X represents a Group 14 to 16 nonmetal atom.

X is preferably =O, =S, =NRc, or =C(Rd)Re. Rc, Rd, Re each represent a substituent, and examples thereof are the same as the specific examples of the substituents represented by Wa and Wb described above.

$L_1$, $L_2$, $R_1$, $R_2$, $R_3$, and n are defined identically to $L_1$, $L_2$, $R_1$, $R_2$, $R_3$, and n in general formula (A), respectively.

[Chem. 4]

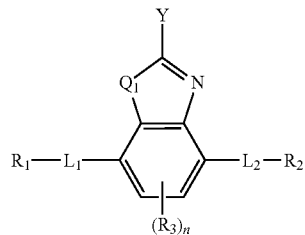

General formula (2)

In general formula (2), $Q_1$ is —O—, —S—, —NRy- (Ry represents a hydrogen atom or a substituent), —CRaRb- (Ra and Rb represent a hydrogen atom or a substituent) or —CO—. Ry, Ra, Rb each represent a substituent, and examples thereof are the same as the specific examples of the substituents represented by Wa and Wb described above.

Y represents a substituent.

Examples of the substituents represented by Y are the same as the specific examples of the substituents represented by Wa and Wb described above.

Y is preferably an aryl group, a heterocyclic group, an alkenyl group, or an alkynyl group.

Examples of the aryl group represented by Y include a phenyl group, a naphthyl group, an anthryl group, a phenanthryl group, and a biphenyl group, and is preferably a phenyl group or a naphthyl group, and is further preferably a phenyl group.

The heterocyclic group includes a heterocyclic group including at least one heteroatom such as a nitrogen atom, an oxygen atom, or a sulfur atom, for example a furyl group, a pyrrolyl group, a thienyl group, a pyridinyl group, a thiazolyl group, or a benzothiazolyl group, and is preferably a furyl group, a pyrrolyl group, a thienyl group, a pyridinyl group, or a thiazolyl group.

These aryl groups or heterocyclic groups may have at least one substituent, and examples of the substituent include a halogen atom, an alkyl group having 1 to 6 carbons, a cyano group, a nitro group, an alkylsulfinyl group having 1 to 6 carbons, an alkylsulfonyl group having 1 to 6 carbons, a carboxyl group, a fluoroalkyl group having 1 to 6 carbons, an alkoxy group having 1 to 6 carbons, an alkylthio group having 1 to 6 carbons, a N-alkylamino group having 1 to 6 carbons, a N,N-dialkylamino group having 2 to 12 carbons, a N-alkylsulfamoyl group having 1 to 6 carbons, and a N,N-dialkylsulfamoyl group having 2 to 12 carbons.

$L_1$, $L_2$, $R_1$, $R_2$, $R_3$, and n are defined identically to $L_1$, $L_2$, $R_1$, $R_2$, $R_3$, and n in general formula (A), respectively.

(2) In general formula (A), a specific example in a case in which at least one of Wa and Wb has a ring structure is preferably the following general formula (3).

[Chem. 5]

General formula (3)

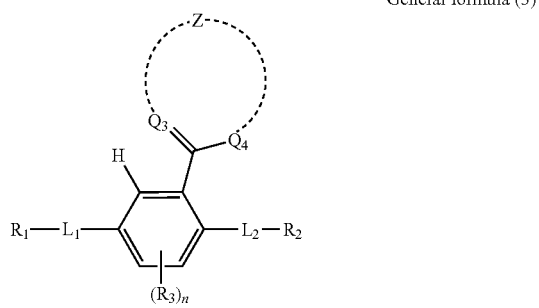

In general formula (3), $Q_3$ represents =N— or =CRz- (Rz is a hydrogen atom or a substituent), and $Q_4$ is a Group 14 to 16 nonmetal atom. Z is a nonmetal atom group forming a ring together with $Q_3$ and $Q_4$.

The ring formed from $Q_3$, $Q_4$ and Z may further be fused with another ring.

The ring formed from $Q_3$, $Q_4$ and Z is preferably a nitrogen-containing 5-membered ring or 6-membered ring fused with a benzene ring.

$L_1$, $L_2$, $R_1$, $R_2$, $R_3$, and n are defined identically to $L_1$, $L_2$, $R_1$, $R_2$, $R_3$, and n of general formula (A), respectively.

(3) In a case in which at least one of Wa and Wb is an alkenyl group or an alkynyl group, this is preferably an ethynyl group or a vinyl group having a substituent.

Among the compounds represented by general formula (1), general formula (2) and general formula (3), the compound represented by general formula (3) is particularly preferred.

The compound represented by general formula (3) excels in thermal resistance and light resistance as compared to a compound represented by general formula (1), and has better solubility in an organic solvent and better compatibility with polymers as compared to the compound represented by general formula (2).

The compound according to the present invention represented by general formula (A) can be contained by adjusting its amount as appropriate for achieving a desirable wavelength dispersiveness and properties for preventing oozing, however it is preferable that its content is 1% to 15% by mass with respect to a cellulose derivative, and in particular, preferably contained by 2% to 10% by mass. By containing within this range, the cellulose derivative of the present invention can have sufficient wavelength dispersiveness and oozing prevention properties.

The compounds represented by general formula (A), general formula (1), general formula (2) and general formula (3) may be prepared with reference to known methods. Specifically, the compounds may be synthesized with reference to the Journal of Chemical Crystallography (1997); 27(9); 512-526), Japanese Unexamined Patent Publication No. 2010-31223, Japanese Unexamined Patent Publication No. 2008-107767, and like documents.

<Cellulose Acylate>

A cellulose acylate film used in the production method of the present invention contains a cellulose acylate as its main component.

The cellulose acylate film preferably contains a cellulose acylate within a range of 60% to 100% by mass with respect to an entire mass of the film of 100% by mass. Moreover, the total degree of acyl group substitution in the cellulose acylate is not less than 2.0 to less than 3.0, and is more preferably from 2.2 to 2.7.

An example of the cellulose acylate is an ester of cellulose with an aliphatic carboxylic acid and/or aromatic caboxylic acid having 2 to 22 carbons, and particularly is preferably an ester of cellulose with a lower fatty acid having not more than 6 carbons.

An acyl group that bonds to a hydroxyl group of the cellulose may be linear or branched, or may form a ring. The acyl group may further be substituted by another substituent. In a case of having the same degree of substitution, since the birefringence decreases with a high number of carbons, it is therefore preferable to select an acyl group having 2 to 6 carbons, and a sum total of the degree of propionyl substitution and butylyl substitution is not less than 0 to less than 3.0. It is preferable that the cellulose acylate has 2 to 4 carbons, and further preferably has 2 to 3 carbons.

Specifically, as the cellulose acylate, a mixed fatty acid ester of cellulose bonded with a propionate group, a butyrate group, or a phthalyl group can be used other than an acetyl group such as cellulose acetate propionate, cellulose acetate butyrate, cellulose acetate propionate butyrate or cellulose acetate phthalate. The butylyl group that forms the butyrate can be linear or branched.

In the present invention, cellulose acetate, cellulose acetate butyrate, or cellulose acetate propionate is particularly preferably used as the cellulose acylate.

Moreover, the cellulose acylate according to the present invention preferably satisfies both the following expressions (iii) and (iv).

$$2.0 \leq X+Y<3.0 \qquad \text{Formula (iii)}$$

$$0 \leq X<3.0 \qquad \text{Formula (iv)}$$

(In Formulae (iii) and (iv), Y represents a degree of substitution of an acetyl group, X represents a degree of substitution of a propionyl group or butylyl group, or a mixture thereof.)

Moreover, in order to obtain optical characteristics that satisfy the object, resins having different degrees of substitution may be mixed. A mixed ratio at this time is preferably 1:99 to 99:1 (mass ratio).

Among the above substances, cellulose acetate propionate is preferably used as the cellulose acylate in particular. Cellulose acetate propionate preferably satisfies the expressions of $0 \leq Y \leq 2.5$ and $0.5 \leq X<3.0$ (where $2.0 \leq X+Y<3.0$), and is more preferably $0.5 \leq Y \leq 2.0$ and $1.0 \leq X \leq 2.0$ (where $2.0 \leq X+Y<3.0$). It should be marked that the degree of substitution of the acyl group is measured based on ASTM-D817-96.

The number-average molecular weight of the cellulose acylate within a range of 60000 to 300000 improves the mechanical strength of the obtained film, and thus is preferable. More preferably, a cellulose acylate having a number-average molecular weight of 70000 to 200000 is used.

The weight-average molecular weight (Mw) and number-average molecular weight (Mn) of the cellulose acylate are measured by gel permeation chromatography (GPC). The measurement conditions are as described below. The present measurement method can be used for measuring other polymers in the present invention.

Solvent: Methylene chloride;
Column: using the following three columns in a connected manner: SHODEX S K806, K805, K803G (SHOWA DENKO K.K.);
Column temperature: 25° C.;
Sample concentration: 0.1% by mass;
Detector: RI MODEL 504 (GL Sciences Inc.);
Pump: L6000 (Hitachi Ltd.);
Flow rate: 1.0 ml/min
Calibration curve: using a calibration curve obtained by 13 samples of standard polystyrene STK standard polystyrene (Tosho Corporation) having a Mw of 1000000 to 500. The 13 samples are used in substantially even intervals.

Residual sulfuric acid content in the cellulose acylate is preferably within a range of 0.1 mass ppm to 45 mass ppm, in sulfur element conversion. It is considered that these residual sulfuric acid are contained in the form of salts. If the residual sulfuric acid content exceeds 45 mass ppm, the film tends to readily rupture while thermally stretching the film and when the film is slit after being subjected to the thermal stretching. The residual sulfuric acid content is more preferably within a range of 1 mass ppm to 30 mass ppm. The residual sulfuric acid content can be measured by a method defined in ASTM D817-96.

Moreover, the free acid content in the cellulose acylate is preferably from 1 mass ppm to 500 mass ppm. By having the content within this range, the film does not readily rupture as with the above, and thus is preferable. The free acid content is preferably within a range of 1 mass ppm to 100 mass ppm, and makes it even more difficult to rupture. In particular, a range of 1 to 70 mass ppm is preferable. The free acid content can be measured by a method defined in ASTM D817-96.

By washing the synthesized cellulose acylate further sufficiently as compared to a case of using this in solvent casting, it is possible to have residual alkali earth metal content, residual sulfuric acid content and residual acid content be within the above range, and is thus preferred.

Moreover, the cellulose acylate is preferably one that has few bright spot inclusion when formed as a film. A bright spot inclusion indicates a point (inclusion) that can be seen in a state in which two polarizers are disposed in a crossed Nicol state and an optical film or the like is disposed between the polarizers, light is flashed from a side of one of the polarizers, and is observed from the other side of the polarizers, which point is observed as a leakage of light. The number of bright spot inclusions within an area having a diameter of not less than 0.01 mm is preferably not more than 200 spots/cm$^2$, more preferably not more than 100 spots/cm$^2$, further preferably not more than 50 spots/cm$^2$, still more preferably 30 spots/cm$^2$, is particularly preferably not more than 10 spots/cm$^2$, and is most preferably none.

Moreover, regarding a bright spot having a diameter of 0.005 to not more than 0.01 mm, it is preferable that the number thereof is 200 spots/cm$^2$, is more preferably not more than 100 spots/cm$^2$ or less, is further preferably not more than 50 spots/cm$^2$ or less, is still more preferably not more than 30 spots/cm$^2$, is particularly preferably not more than 10 spots/cm$^2$, and is most preferably none.

The cellulose as raw material of the cellulose acylate is not limited in particular, and examples include cotton linters, wood pulp and kenaf. The cellulose acylate obtained from these materials are used in a mixed manner at any proportion.

The cellulose acylate can be produced by a publicly known method. Specifically, the cellulose acylate can be synthesized with reference to a method disclosed in Japanese Unexamined Patent Publication No. H10-45804, for example.

Moreover, the cellulose acylate is affected by minute amounts of metal constituents in the cellulose acylate. The minute amounts of metal constituents are considered as related to the water used in the production process; it is preferable that few constituents that may serve as a cause for insolubility is present. In particular, metal ions such as iron, calcium, and magnesium may form insoluble objects by forming a salt with a polymer fragment or like substance that may contain an organic acidic group, and thus is preferably included only by a small amount. Moreover, a calcium (Ca) component readily forms a coordination compound (i.e., complex) with an acidic component such as a carboxylic acid and a sulfonic acid and also with many ligands. Further, the calcium component may also cause formation of scum (insoluble deposit, turbid) originated from many insoluble calcium, and therefore is preferably of a small content.

Specifically, it is preferable that iron (Fe) component content in the cellulose acylate is not more than 1 mass ppm. Moreover, the calcium (Ca) component content in the cellulose acylate is preferably not more than 60 mass ppm, and more preferably from 0 mass ppm to 30 mass ppm. Furthermore, a magnesium (Mg) component causes generation of insoluble objects in the event of excess amount thereof, so the content thereof in the cellulose acylate is preferably 0 to 70 mass ppm, and is particularly preferably 0 mass ppm to 20 mass ppm.

The content of metal components such as the iron (Fe) content, calcium (Ca) component content, and magnesium (Mg) component content can be analyzed by first preprocessing absolutely dried cellulose acylate with a microdigest wet decomposition device (sulfuric and nitric acid decomposition) and alkali fusion, and then analyzing them by using ICP-AES (inductively coupled plasma atomic emission spectrometry).

<Additives>

The long stretched film obtained by the production method according to the embodiment of the present invention can be one in which a polymer component other than the cellulose ester described later is mixed as appropriate. It is preferable to mix a polymer component that has excellent compatibility with a cellulose ester, and to have a transmittance when made into a film of not less than 80%, more preferably not less than 90%, further preferably not less than 92%.

Additives that may be added during doping include plasticizers, ultraviolet absorbers, retardation adjusters, antioxidants, deterioration inhibitors, release assistants, surfactants, dyes, and particles. In the present embodiment, additives other than the particles may be added when preparing a cellulose ester solution, or may be added when preparing a particles dispersion liquid. For a polarizer to be used in liquid crystal image display devices, it is preferable to add additives such as a plasticizer, an antioxidant, and an ultraviolet absorber, to achieve excellent thermal and moisture resistance.

These compounds are preferably contained by an amount of 1% to 30% by mass with respect to the cellulose ester, preferably by 1% to 20% by mass. Moreover, in order to minimize bleeding out during the stretching, drying and like process, it is preferable that the compound has a steam pressure at 200° C. of not more than 1400 Pa.

These compounds may be added together with the cellulose ester and a solvent when preparing the cellulose ester solution, or may be added during the preparation of the solution or after the solution is prepared.

<Retardation Adjuster>

As a compound added for adjusting retardation of the cellulose ester resin film used in the production method of the present invention, an aromatic compound containing two or more aromatic rings can be used, such as one disclosed in the specification of European Patent No. 911,656 A2.

Moreover, two or more types of aromatic compounds may be used together. The aromatic ring of the aromatic compound includes, in addition to the aromatic hydrocarbon ring, an aromatic heterocyclic ring. It is particularly preferably an aromatic heterocyclic ring, generally being an unsaturated heterocyclic ring. Among these, 1,3,5-triazine ring is particularly preferred.

<Polymer or Oligomer>

The cellulose ester resin film used in the production method of the present invention preferably includes a cellulose ester and a polymer or oligomer of a vinyl compound having a substituent selected from a carboxyl group, a hydroxyl group, an amino group, an amide group, and a sulfonic acid group and whose weight-average molecular weight is within a range of 500 to 200,000. The mass ratio of the content of the cellulose ester to the polymer or oligomer is preferably within a range of 95:5 to 50:50.

<Matting Agent>

The cellulose ester resin film used in the production method of the present invention can contain particles in the stretched film as a matting agent. This allows for easily running and winding the film in a case in which the stretched film a long film.

The particle size of the matting agent is preferably primary particles or secondary particles sized within 10 nm to 0.1 μm. A substantially spherical matting agent with an acicularity ratio of the primary particles of not more than 1.1 is preferably used.

Particles containing silicon are preferred as the particles, and in particular silicon dioxide is preferred. The silicon dioxide particles preferable for the present embodiment are, for example, those commercially available under the product names of AEROSIL R972, R972V, R974, R812, 200, 200V, 300, R202, OX50, and TT600 (Nippon Aerosil Co., Ltd.) each produced by Nippon Aerosil Co., Ltd., and preferably AEROSIL 200V, R972, R972V, R974, R202, and R812 are used. Examples of the polymer particles include silicone resin, fluororesin and acrylic resin. The silicone resin is preferred, particularly those having a three-dimensional network structure, and examples thereof include TOSPEARL 103, 105, 108, 120, 145, 3120 and 240 (Toshiba Silicone Co., Ltd.).

The silicon dioxide particles have a primary mean particle size of not more than 20 nm and an apparent specific gravity of 70 g/L or more. The mean diameter of the primary particles is preferably between 5 nm to 16 nm, and is further preferably between 5 nm to 12 nm. A smaller primary particles mean size has a lower haze, and thus is preferred. An apparent specific gravity is preferably 90 g/L to 200 g/L or more, and is more preferably 100 g/L to 200 g/L or more. A greater apparent specific gravity allows for producing a particles dispersion liquid of high concentration; no haze or aggregates are generated and thus is preferred.

The matting agent is preferably added in the present embodiment by an amount of 0.01 g to 1.0 g for each square meter of the long stretched film, more preferably 0.03 g to 0.3 g, further preferably 0.08 g to 0.16 g.

<Other Additives>

Other than the above, thermal stabilizers including inorganic particles such as Kaolin, talc, diatomaceous earth, quartz, calcium carbonate, barium sulfate, titanium oxide, and alumina, and salts of alkali earth metal such as calcium and magnesium may be added. Furthermore, a surfactant, a release accelerating agent, an antistatic agent, a flame retardant, a lubricant, an oil solution and like additive may also be added.

(Film Forming Method of Cellulose Ester Resin)

The cellulose ester resin film used in the production method of the present invention can be formed by any of the solvent casting or the melt flow method.

The following describes the solvent casting and the melt flow method.

<Solvent Casting>

The solvent casting is performed by dissolving resin and additives into an organic solvent to prepare dope, flow casting the dope on a belt or drum metal supporter, drying the flow casted dope as a web, releasing the dried dope from the metal supporter, stretching or keeping its width, drying furthermore, and winding the completed film.

The solvent casting is preferably used since this method excels in preventing the coloring of the film, minimizing any inclusion defects, minimizing optical defects such as die lines, and has excellent film flatness and transparency.

A high concentration of the cellulose acetate in the dope allows for reducing a dry load that is applied after the flow casting onto the metal supporter and is thus preferred, however if the concentration of the cellulose acetate is too high, the load increases during the filtering, which causes the filtering accuracy to deteriorate. A concentration that achieves both effects is preferably 10% to 35% by mass, and is further preferably 15% to 25% by mass. The metal supporter in the flow casting (casting) is preferably one whose surface is mirror finished. As the metal supporter, a drum plated with stainless steel belt or casting is preferably used.

The surface temperature of the metal supporter in the flow casting is set to a temperature from −50° C. to not more than a temperature that causes the solvent to boil and foam. A higher temperature is preferred since the web would dry more quickly, however if the temperature is too high, the web may foam or the flatness may deteriorate.

A preferable temperature of the supporter is determined as appropriate between 0° C. to 100° C., and is further preferably between 5° C. to 30° C. Moreover, another preferable way is to gellate the web by cooling and then releasing the film from the drum in a state containing a lot of residual solvent. The method of controlling the temperature of the metal supporter is not particularly limited, and examples thereof include a method of blowing warm or cold air, and having warm water made in contact with a back side of the metal supporter. Heat is transmitted more effectively by using the warm water, which shortens the time required to raise the temperature of the metal supporter to a constant temperature. Therefore, using the warm water is preferred.

In the method of using warm air, there are cases in which air having a temperature higher than a target temperature is used while preventing foaming, simultaneously to using hot air of a temperature not less than the boiling point of the solvent, in consideration of the decrease in temperature of the web caused by evaporation latent heat of the solvent.

In particular, it is preferable to change the temperature of the supporter from the flow casting to the web release and the temperature of the drying wind, for effective drying.

In order for the cellulose ester resin film to exhibit good flatness, the residual solvent content when releasing the web from the metal supporter is preferably between 10% to 150% by mass, is further preferably between 20% to 40% by mass or 60% to 130% by mass, and is particularly preferably between 20% to 30% by mass or 70% to 120% by mass.

The residual solvent content is defined by the following formula.

Residual solvent content (% by mass)=$\{(M-N)/N\} \times 100$

M is a mass of a sample collected during production the web or film, or at any time after the production, and N is a mass measured after heating M for one hour at 115° C.

Moreover, in the step of drying the cellulose resin film, the web is released from the metal supporter and is further dried so that a residual solvent content is preferably not more than 1% by mass, further preferably not more than 0.1% by mass, and particularly preferably not more than 0% to 0.01% by mass.

The film drying generally employs a roll drying method (method of passing the web alternately through a plurality of rolls disposed above and under the web and drying the web) or a tenter method that dries the web while having the web run.

An organic solvent useful for forming the dope in the case of producing the cellulose ester resin film according to the present invention by solvent casting can be any solvent as long as the solvent is capable of simultaneously dissolving cellulose acetate with other additives.

Examples of the organic solvent that can be used include chlorine-based organic solvents such as methylene chloride and non-chlorine-based organic solvents such as methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, or nitroethane, and methylene chloride, methyl acetate, ethyl acetate, or acetone is preferably used.

The dope preferably contains, other than the organic solvent, a linear or branched chain fatty alcohol having 1 to 4 carbon atoms, by 1% to 40% by mass. The web gellates as the proportion of the alcohol increases in the dope. This facilitates the release of the web from the metal supporter. Moreover, a small proportion of the alcohol promotes the dissolving of cellulose acetate in the non-chlorine-based organic solvent.

In particular, the dope is preferably a dope composition dissolving acrylic resin, cellulose ester resin and acrylic particles, in a solvent that contains methylene chloride and a linear or branched chain fatty alcohol having 1 to 4 carbons, by an amount of at least a total of 15% to 45% by mass.

The linear or branched chain fatty alcohol having 1 to 4 carbons include methanol, ethanol, n-propanol, iso-propanol, n-butanol, sec-butanol, and tert-butanol. Among these alcohols, ethanol is preferably used for its stability within the dope, its relatively low boiling point and its good drying property.

<Melt Flow Method>

The melt film forming method facilitates reduction of retardation Rt in the thickness direction of the film having subjected to the oblique stretching, causes few residual volatile constituent content and excels in dimensional stability of the film, and thus is a preferable film forming method. The melt film forming method heats and melts a composition containing resin and additives such as a plasticizer to a temperature that shows fluidity, and thereafter flow casts the fluid molten object containing cellulose acetate. The method of forming by melt flow casting can be classified into, for example, a melt extrusion method, a press molding method, an inflation method, an injection molding method, a blow molding method, and a stretch molding method. Among these methods, the melt extrusion method is preferable since this method allows for obtaining a film having excellent mechanical strength and surface accuracy.

The plurality of raw materials used in the melt extrusion is usually preferably kneaded and made into pellets in advance.

The formation of pellets can be performed by a publicly known method, and for example may be made by supplying dried cellulose acetate and a plasticizer and/or any other additives to the extruder by a feeder, kneading the mixture by using a single screw or double screw extruder, extruding the mixture from a die in strands, cooling the extruded strands with water or with air, and cutting the cooled strands.

The additives may be mixed together before being supplied to the extruder, or may be supplied by separate feeders.

The additives of a small amount such as particles and antioxidants are preferably mixed in advance, in order to mix them uniformly.

The extruder preferably forms pellets in such a way that the shear force is minimized and deterioration (e.g. decrease in molecular weight, coloring, gel formation) of the resin is prevented, and performs processing at a low temperature. For example, with a double screw extruder, it is preferable to use screws having deep grooves and to rotate them in the same directions. In terms of uniform kneading, a meshing type is preferred.

A film is formed using the pellet obtained as described above. It is of course possible to not pelletize the material and supply the raw material powders directly to the extruder via a feeder and form a film therefrom.

The pellets are filtered to remove inclusions with a filter of a leaf-disc type or the like by using a single-screw or double-screw type extruder and having a melting temperature set at around 200° C. to 300° C. in extrusion, and are flow casted into a film form via a T-die. The film is nipped between a cooling roll and an elastic touch roll, and is set on the cooling roll.

It is preferable for introduction from the supply hopper to the extruder to be performed under vacuum or under reduced pressure, under inert gas atmosphere or the like, to prevent oxidative decomposition.

The extruded amount is preferably made stable for example by adopting a gear pump. Moreover, the filter used in removing the inclusion is preferably a stainless steel fiber sintered filter. The stainless steel fiber sintered filter is an object in which stainless steel fibers are entangled in a complex manner and compressed, and a contact part is sintered to be made into one object. The density of the filter varies depending on the thickness of the fiber and the compressed amount, so therefore the filtering accuracy can be adjusted.

The additive such as the plasticizer and the particles may be mixed with the resin in advance or may be kneaded in while the extruder is in process. In order to evenly add the additives, it is preferable to use a mixer such as a static mixer.

The film temperature of the elastic touch roll when nipping the film with the cooling roll is preferably not less than Tg of the film to not more than Tg+110° C. A publicly known roll can be used as the roll having an elastic surface used for this purpose.

The elastic touch roll is also referred to as a compression rotatable body. A commercially available roll can be used as the elastic touch roll.

It is preferable to prevent the deformation of the film by controlling the tension when releasing the film from the cooling roll.

The long film containing the above cellulose ester resin may be of a single layer or of a stacked film of two or more layers. The stacked film may be obtained by a publicly known method such as the coextrusion method, the cocasting method, the film lamination method, or the application method. Among these methods, the coextrusion method and the cocasting method are preferred.

<Long Stretched Film>

The long stretched film according to the present invention is produced by the aforementioned production method.

The following describes the long film containing a thermoplastic resin.

The long film prior to the oblique stretching has a film thickness of preferably 30 μm to 300 μm, more preferably 40 μm to 150 μm.

In the present invention, a thickness unevenness σm in the running direction of the long film fed to the oblique stretching device requires to be less than 0.30 μm, preferably less than 0.25 μm, further preferably less than 0.20 μm, in terms of maintaining a drawing tension of the film at the inlet of the oblique stretching tenter later described, and for stabilizing optical characteristics such as alignment angles and retardation. If the thickness unevenness σm is 0.30 μm or more in the running direction of the long film prior to the oblique stretching, the unevenness in optical characteristics such as the retardation and alignment angle of the long stretched film markedly worsens. In the embodiment, σm is a value represented by a mean value of a standard deviation u in the running direction, in each widthwise position.

Moreover, a film having a thickness gradient in the widthwise direction may be supplied as the long film prior to the oblique stretching. The gradient in thickness of the long film prior to the oblique stretching can be empirically found by stretching a film that has been experimentally made to have various thickness gradients, to achieve a most uniform film thickness in a position at which the stretching in the subsequent process is completed. The gradient of the thickness of the long film prior to the oblique stretching is adjustable in such a manner that, for example, the thickness of an end having a thicker thickness is thicker than an end having a thinner thickness by around 0.5% to 3%.

The width of the long film having being subjected to oblique stretching is not limited in particular, however can be made to have a width of 500 mm to 4000 mm, preferably a width of 1000 mm to 2000 mm.

A preferable elastic modulus at the stretching temperature during the oblique stretching of the long film is not less than 0.01 Mpa but not more than 5000 Mpa, further preferably not less than 0.1 Mpa but not more than 500 Mpa, indicated by the Young's modulus. If the elastic modulus is too low, the shrinkage rate at the time of stretching and after the stretching becomes low, which causes difficulty in elimination of creases; if the elastic modulus is too high, the tension on the film increases at the time of stretching, thereby causing the need to increase the strength of the parts gripping the film on both ends. This thus causes the load on the tenter to increase in the subsequent processes.

A non-aligned film may be used as the long film prior to the oblique stretching, or a film having an alignment in advance may be fed as the long film prior to the oblique stretching. Moreover, if necessary, a widthwise distribution in the alignment of the long film prior to the oblique stretching may be in a bowing shape. In short, the alignment of the long film prior to the oblique stretching can be adjusted so that the alignment of the film at the position at which the stretching in the subsequent process is completed is obtained as desired.

Moreover, the long stretched film of the present invention has an alignment angle θ inclined with respect to the winding direction within a range greater than 0° but smaller than 90°, is preferably inclined within a range of not smaller than 30° but smaller than 60°, and is further preferably inclined within a range of not smaller than 40° but not greater than 50°. Moreover, the variation in the alignment angle θ of the long stretched film according to the present invention is preferably smaller than 0.6°, more preferably smaller than 0.4°. In a case in which a long stretched film having the variation in the alignment angle θ of smaller than 0.6° is laminated to a polarizer to obtain a circular polarizer, and this circular polarizer is installed into an image display device such as an organic electroluminescence display device, it is possible to obtain good evenness in display quality.

Moreover, a retardation value Ro (550) of the long stretched film of the present invention measured with a wavelength of 550 nm is preferably within a range of not less than 120 nm and not more than 160 nm, and is further preferably within a range of not less than 130 nm to not more than 150 nm. Moreover, a variation in an in-plane retardation Ro of the long stretched film of the present invention is not more than 4 nm, preferably not more than 3 nm. The variation of the in-plane retardation Ro within this range allows for achieving a good uniformity in display quality in a case in which the film is used as a film for an organic electroluminescence display device.

It should be marked that an optimal value of the in-plane retardation Ro of the long stretched film according to the present invention is selected based on the design of the used display device. The Ro is a value multiplying an average thickness of the film d to a difference between a refractive index nx in the in-plane slow axis direction and a refractive index ny in the direction intersecting at right angles to the slow axis in-plane, i.e., (Ro=(nx−ny)×d).

The average thickness of the long stretched film according to the present invention is preferably between 5 μm to 150 μm, further preferably between 10 μm to 80 μm, in terms of aspects such as mechanical strength. However, changes in film temperature caused by the temperature change in atmosphere become significant when producing a thin long stretched film. Therefore, the production method of the present invention is favorably used in particular when producing a thin film having an average thickness of the long stretched film within a range of 15 μm to 35 μm.

Moreover, thickness unevenness in the widthwise direction give influence on the windability of the film, and is preferably not more than 3 μm, more preferably not more than 2 μm.

<Circular Polarizer>

Next described is the circular polarizer that uses the long stretched film according to the present embodiment.

The circular polarizer stacks a polarizer protection film, a polarizer, a λ/4 phase difference film, and an adhesive layer in this order, and an angle between a slow axis of the λ/4 phase difference film and an absorption axis of the polarizer is 45°.

It is preferable that a long polarizer protection film, a long polarizer, and a long λ/4 phase difference film (stretched film) are stacked in this order, each of which uses the long stretched film according to the present embodiment.

The circular polarizer using the long stretched film according to the present embodiment uses stretched polyvinyl alcohol doped with iodine or dichroic dye as the polarizer, and can be produced by lamination that fabricates a λ/4 phase difference film/polarizer structure.

A film thickness of the circular polarizer is 5 μm to 40 μm, preferably 5 μm to 30 μm, and particularly preferably 5 μm to 20 μm.

The circular polarizer can be prepared by a general method. The λ/4 phase difference film subjected to alkali saponification treatment is preferably attached on one side of a polarizer that is prepared by immersing and stretching a polyvinyl alcohol-based film inside an iodine solution, by using a completely saponified polyvinyl alcohol solution.

The circular polarizer can be configured by further attaching a release film on a side on the polarizer opposite of the polarizer protection film. The protection film and the release film are used to protect the polarizer at the time of shipping the polarizer, product inspection, and like occasions.

<Display Device>

By incorporating the circular polarizer prepared by using the long stretched film according to the present embodiment to a display device, it is possible to produce a display device excelling in various visibilities. The display device is preferably an organic EL display.

Figure 12:
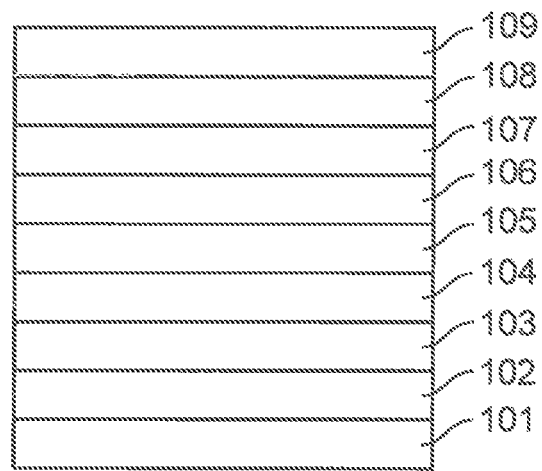
FIG. 12 is a schematic view showing an exemplary configuration of an organic EL image display device.

FIG. 12 shows one example of a configuration of the organic EL image display device. However, an organic EL image display device that uses the long stretched film according to the present embodiment is not limited to this example.

On an organic electroluminescence element in which a metal electrode 102, a light emitting layer 103, a transparent electrode (e.g. ITO) 104, and a sealing layer 105 are stacked in this order on a substrate 101 made of glass, polyimide or like material, a circular polarizer that sandwiches a polarizer 108 between a λ/4 phase difference film 107 and a protection film 109 is provided having an adhesive layer 106 used therebetween, to obtain an organic electroluminescence image display device. The protection film 109 preferably has a hardened layer stacked thereon. The hardened layer not only prevents scratches on the surface of the organic electroluminescence image display device, but also achieves an effect of preventing warp caused by the circular polarizer. Furthermore, an antireflection layer may be provided on the hardened layer. The thickness of the organic electroluminescence element itself is around 1 μm.

In general, organic electroluminescence image display devices form an element serving as a luminous body (organic electroluminescence element) by stacking on a transparent substrate a metal electrode, a light emitting layer and a transparent electrode in this order. The light emitting layer is a laminate of various organic thin films, and configurations including various combinations are known, such as a laminate of a hole injection layer made of triphenylamine derivative or the like with a light emitting layer made of a fluorescent organic solid such as anthracene, or a laminate of such a light emitting layer with an electron injection layer made of a perylene derivative or like material, or alternatively a laminate of these hole injection layer, light emitting layer, and electron injection layer.

The organic electroluminescence image display device emits light by a principle in which application of a voltage to the transparent electrode and the metal electrode causes injection of holes and electrons into the light emitting layer, and energy generated by recombination of the holes and electrons excite fluorescent substances, and when these excited fluorescent substances return back to their ground state, light is emitted. The mechanism of recombination in between is the same as general diodes; assumable from this also, the current and emission intensity show a strong nonlinearity accompanying the rectification with respect to an applied voltage.

In the organic electroluminescence image display device, in order to cause light emission at the light emitting layer, at least one of the electrodes need to be transparent, and usually a transparent electrode made of a transparent conductor such as indium tin oxide (ITO) is used as the anode. On the other hand, it is important to use a substance with a small work function for the cathode to facilitate electron injection and improve luminous efficiency, and usually metal electrodes such as Mg—Ag and Al—Li are used therefor.

In the organic electroluminescence image display device of such configuration, the light emitting layer is formed by an extremely thin film having a thickness of around 10 nm. Therefore, the light emitting layer also transmits light almost completely, as with the transparent electrode. As a result, light entering the surface of the transparent substrate while light is not emitted transmits through the transparent electrode and the light emitting layer and reflects at the metal electrode, and again exits from the surface of the transparent substrate. Accordingly, from an external view, the display surface of the organic electroluminescence image display device looks like a mirror surface.

The circular polarizer for the organic electroluminescence display device including the long stretched film according to the present embodiment is suitable for a display device of an organic electroluminescence mode in which such external light reflection becomes a problem in particular.

Although the present specification discloses features of various aspects, the main features are as summarized below.

A method for producing a long stretched film according to one aspect of the present invention includes at least the steps of: forming a long film containing a thermoplastic resin; stretching the long film in an oblique direction greater than 0° but smaller than 90° with respect to a widthwise direction of the long film by feeding to an oblique stretching device in the specific direction different from a direction along which the long film runs after being stretched, and then allowing the long film to run while widthwise ends of the long film are gripped by gripping tools of a gripping tool running device of an oblique stretching tenter; and winding the long film having been subjected to the oblique stretching, wherein: the oblique stretching is performed in a heating section including a preheating section, a stretching section, and a thermosetting section, the preheating section and the stretching section are separated from each other by a partition wall, and the stretching section and the thermosetting section are separated from each other by a partition wall, each of the partition walls has an opening for permitting the long film to pass, and slide members independently movable on the opposite sides of the opening and in widthwise directions of the long film, the slide members are adapted to adjust the width of the opening and the widthwise position of the opening.

With such a configuration, it is possible to reduce the variation in optical alignment on the film ends and alignment unevenness in the film, each of which is generated when obliquely stretching the film.

Moreover, in the production method of the long stretched film of the present invention, it is favorable for the oblique stretching tenter to have a gripping tool running device on each side of the carried long film, and each of the partition walls to have slide members above and under the gripping tool running device, the slide members being independently movable in widthwise directions of the long film.

With such a configuration, it is possible to enhance the effect of the present invention even further.

Moreover, in the production method of the long stretched film of the present invention, in the partition wall separating the stretching section from the thermosetting section, it is favorable to have, when the long film has an alignment in a clockwise direction with respect to the partition wall, the width of the opening be adjusted in such a way that the distance between the end of the long film and the slide member in the inner side of the film running course is longer than that in the outer side of the film running course, and when the long film has an alignment in a counterclockwise direction with respect to the partition wall, the width of the opening be adjusted in such a way that the distance between the end of the long film and the slide member in the outer side of the film running course is longer than that in the inner side of the film running course.

With such a configuration, it is possible to further reduce the variation in optical alignment on the film ends and alignment unevenness of the film, each of which is generated when obliquely stretching the film.

Moreover, in the production method of the long stretched film of the present invention, in the partition wall separating the preheating section from the stretching section, it is favorable to have the width of the opening be adjusted in such a way that the distance between the end of the long film and the slide member in a side having a smaller angle between the film running course and the partition wall is longer than that in a side having a larger angle between the film running course and the partition wall.

With such a configuration, it is possible to further reduce the variation in optical alignment on the film ends and alignment unevenness of the film, each of which is generated when the film is obliquely stretched.

Moreover, in the production method of the long stretched film of the present invention, in the oblique stretching, it is favorable for the gripping tool to move along the gripping tool running device of the oblique stretching tenter at a velocity of 15 to 150 meters per minute.

With such a configuration, it is possible to further enhance the effect of the present invention.

Moreover, a device for producing a long stretched film according to one aspect of the present invention includes at least: means for forming a long film containing thermoplastic resin; means for stretching the long film in an oblique direction greater than 0° but smaller than 90° with respect to a widthwise direction of the long film by feeding to an oblique stretching device in the specific direction different from a direction along which the long film runs after being stretched, and then allowing the long film to run while the widthwise ends of the long film are gripped by gripping tools of a gripping tool running device of an oblique stretching tenter; and means for winding the long film having been subjected to the oblique stretching, wherein: the oblique stretching means includes a heating section having a preheating section, a stretching section, and a thermosetting section, the preheating section and the stretching section are separated from each other by a partition wall, and the stretching section and the thermosetting section are separated from each other by a partition wall, each of the partition walls has an opening for permitting the long film to pass, and slide members independently movable on the opposite sides of the opening and in widthwise directions of the long film, the slide members are adapted to adjust the width of the opening and the widthwise position of the opening.

With such a configuration, it is possible to produce a long stretched film having reduced variation in optical alignment on the ends and reduced alignment unevenness.

It is favorable for each of the partition walls to further have slide members above and under the gripping tool running device, the slide members being independently movable in widthwise directions of the long film.

With such a configuration, it is possible to produce a long stretched film having reduced variation in optical alignment on the ends and reduced alignment unevenness.

EXAMPLES

Specifically described below are examples of the present invention. The descriptions however do not intend to limit the embodiments of the present invention.

Example 1

Production of Cycloolefin Film

Under a nitrogen atmosphere, 1.2 parts of 1-hexane, 0.15 parts of dibutylether, and 0.30 parts of triisobutyl aluminum were added to 500 parts of dehydrated cyclohexane in a reactor at room temperature, and while maintaining the temperature at 45° C., a norbornene monomer mixture including 20 parts of tricyclo[4.3.0.12,5]deca-3,7-diene (dicyclopentadiene, hereinafter abbreviated as DCP), 140 parts of 1,4-methano-1,4,4a,9a-tetrahydrofluorene (hereinafter abbreviated as MTF) and 40 parts of 8-methyl-tetracyclo[4.4.0.12, 5.17,10]-dodeca-3-ene (hereinafter abbreviated as MTD), and 40 parts of tungsten hexachloride (0.7% toluene solution) were continuously added and polymerized for 2 hours. Into the polymerized solution, 1.06 parts of butyl glycidyl ether and 0.52 parts of isopropyl alcohol were added to inactivate the polymerization catalyst and stop the polymerization reaction.

Next, with respect to 100 parts of the reaction solution containing the obtained ring-opened polymer, 270 parts of cyclohexane were added and further 5 parts of a nickel-alumina catalyst (JGC Ltd.) were added as a hydrogenation catalyst, and pressure was applied to 5 MPa by using hydrogen, and the mixture was heated to a temperature of 200° C. while stirring. Thereafter, the mixture was reacted for 4 hours, to obtain a reaction solution containing 20% of DCP/MTF/MTD ring-opened polymer hydrogenated polymer. After removing the hydrogenation catalyst by filtration, a soft polymer (Kuraray Co., Ltd.; SEPTON 2002) and an antioxidant (CIBA Specialty Chemicals; IRGANOX 1010) were each added to and dissolved in the obtained solution (each additive amount being 0.1 parts per 100 parts of polymer).

Next, the cyclohexane serving as the solvent and any other volatile components were removed from the solution with a cylindrical concentration dryer (Hitachi Co., Ltd.), and the hydrogenated polymer was extruded in strands by the extruder, was cooled, made into pellets and collected. The copolymerization ratio of each norbornene monomer in the polymer was calculated from the composition of residual norbornenes in the solution having been subjected to polymerization (by gas chromatography), which was DCP/MTF/MTD=10/70/20, and was almost equal to the charged composition. The weight-average molecular weight (Mw) of the ring-opened polymer hydrogenated product was 31,000, the molecular weight distribution (Mw/Mn) was 2.5, the hydrogenation ratio was 99.9%, and Tg was 134° C. The pellets of the obtained ring-opened polymer hydrogenated product were dried for 2 hours at 70° C. by using a hot air drier that passes air therethrough, to remove moisture content.

Then, the pellets were melt extruded by using a short screw extruder having a coat hanger type T-die (Mitsubishi Heavy Industries, Ltd.: having a screw diameter of 90 mm, a T-die lip part made of tungsten carbide, and a releasing strength with the molten resin is 44N) and formed a cycloolefin polymer film having a thickness of 100 μm. The extrusion was performed in a clean room of a class of not more than 10,000 under molding conditions of a molten resin temperature at 240° C. and a T-die temperature at 240° C., and obtained a long film raw sheet A having a width of 900 mm and a thickness of 100 µm. The long film raw sheet A was wound on a roll.

(Oblique Stretching Step)

The long film raw sheet A of norbornene resin obtained above was stretched by using the oblique stretching device according to the present invention in a method as described below, to obtain a stretched film. Moreover, endless guide rails without chains were used as the gripping tool running devices, and clips were used as the gripping tools.

First, an angle between the film feeding direction and the winding direction (turning angle) was set as 47°. Next, opposite ends of the long film A fed from the film feeding device were gripped by a first clip (inner side of guide rails) and a second clip (outer side of guide rails), respectively.

In gripping the long film, clip levers of the first and second clips are moved by a clip closer to hold the long film. Moreover, when gripping with the clip, the opposite ends of the long film were held at the same time with the first and second clips, and were held so that a line connecting the held positions on the opposite ends is parallel to an axis parallel to a widthwise direction of the film.

Next, the held non-stretched film was heated by being passed through the preheating section, the stretching section and the thermosetting section in the heating section with the first and second clips, and was stretched widthwise to obtain a stretched film. Temperature conditions in the heating section during this film passage were adjusted so that the preheating section was 145° C., the stretching section was 144° C., and the thermosetting section was 140° C. for the production.

Figure 14:
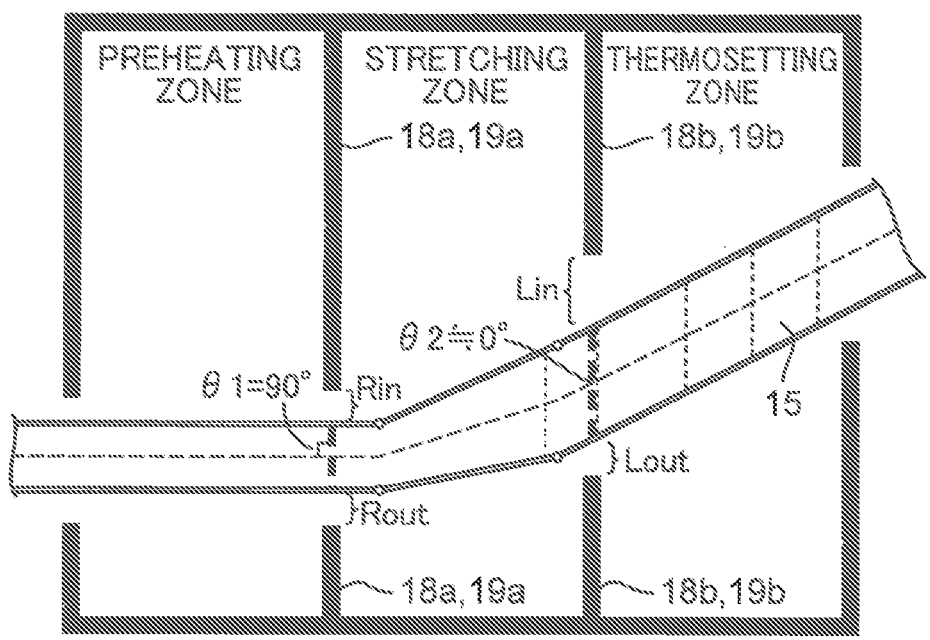
FIG. 14 is a schematic view showing a rotating pattern of an oblique stretching tenter used in Examples 1 and 2.

FIG. 14 shows a rotating pattern 1 of the oblique stretching tenter used in Example 1. In the rotating pattern 1, an angle between the running course of the film 15 before being stretched and the partition wall 17a (18a, 19a) was 90°, and an angle θ2 between the alignment axis of the film 15 and the partition wall 17b (18b, 19b) was substantially 0°, being substantially parallel to each other.

FIG. 14 to FIG. 29, each showing a rotating pattern of Examples, are conceptual views showing the partition wall width and intervals, rotating angles and the like in an emphasized manner, for easy understanding of the configuration of the present invention.

Distances Rin and Rout were both set as 0 mm by using the slide members (18a, 19a), where Rin represents a distance between the inner side of the film 15 and the slide member 18a (19a) and Rout represents a distance between the outer side of the film 15 and the slide member 18a (19a).

Moreover, distances Lin and Lout were both set as 0 mm by using the slide members (18b, 19b), where Lin represents a distance between the slide member 18b (19b) and the film 15 and Lout represents a distance between the slide member 18b (19b) and the film 15.

The film running velocity during the heating and stretching was 20 m/min.

Moreover, a stretching ratio of the film compared before and after the stretching was set as two-fold, and the thickness of the film having been stretched was set as 50 µm.

The long stretched film made of cycloolefin obtained by the above steps was evaluated by the following evaluation methods.

(Quantative Evaluation)

Each long stretched film was cut in even widthwise intervals to obtain 20 samples thereof. The slow axis angle (alignment angle) θ of these samples were measured by an automatic birefringence measuring device (KOBRA-21ADH of Oji Scientific Instruments). The measurement in the widthwise direction was performed three times along the running course. As a result, the mean value of the above entire data and its variation (difference between the maximum value and the minimum value of the measured film alignment angle) was calculated and evaluated based on the following criteria.

A: Variation in alignment angle is smaller than 0.4°.

B: Variation in alignment angle is not smaller than 0.4° but smaller than 0.6°.

C: Variation in alignment angle is not smaller than 0.6° but smaller than 1.0°.

D: Variation in alignment angle is not smaller than 1.0° but smaller than 1.5°.

E: Variation in alignment angle is not smaller than 1.5°.

(Function Evaluation)

An organic EL image display device described above was produced by using the long stretched film, and color unevenness on the entire display surface during black display was evaluated by visual evaluation based on the following criteria.

Organic EL image display devices described above were produced by using the long stretched films produced in Examples 1 to 12 and Comparative Examples 1 to 8, and color unevenness on the entire display surface during black display was evaluated by visual evaluation based on the following criteria.

A: No difference in color could be found in portions throughout the display surface.

B: Some portions on the edges of the screen exhibited a slight difference in color throughout the display surface, however was of a level not causing any problems.

C: Some portions on the edges of the screen exhibited color difference throughout the display surface, which was of a level that does not allow use thereof as a product.

D: Large color differences appeared per portion of attached sample pieces, which was of a level that does not allow use thereof as a product.

Example 2

In Example 2, the long stretched film made of cycloolefin was produced in a similar manner to Example 1 except that the film was obliquely stretched at a different running velocity. The produced film was evaluated based on the above evaluation methods.

Comparative Examples 1 and 2

Comparative Example 1 used a heating section that is separated in sections by using partition walls not provided with the slide members. The long stretched films made of cycloolefin were produced in a similar manner to Example 1 except that the distances between the film ends and the slide members were made to be in the conditions as shown in Table 1 below.

Comparative Example 2 was produced in a similar manner to Comparative Example 1 except that the film was obliquely stretched at a running velocity different from Comparative Example 1.

Figure 15:
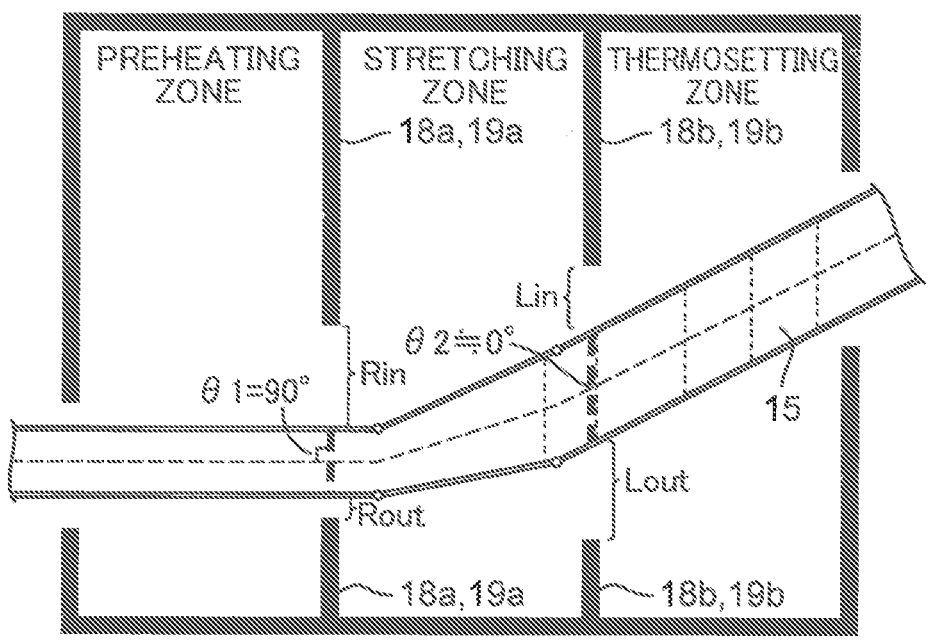
FIG. 15 is a schematic view showing a rotating pattern of an oblique stretching tenter used in Comparative Examples 1 and 2.

FIG. 15 shows a schematic view of the rotating pattern 1 and the partition walls in the heating sections, each of which is used in Comparative Examples 1 and 2. The evaluation results are as shown in Table 1 below. The stretching conditions were set as follows.

Rotating angle (°): An angle between the feeding direction of the film and the winding direction of the film.

Running velocity (m/min): A running velocity of the gripping tools running along asymmetry guide rails of the oblique stretching tenter.

Table 2. The long stretched film made of cycloolefin was produced in a similar manner to Example 3 except that the distances between the film ends and the slide members were

TABLE 1

| | Opening adjustment in partitions | Swing Pattern | Angle (°) $\theta_1$ | Angle (°) $\theta_2$ | Swinging angle (°) | Running velocity (m/mins) | Film Type | Distance between film and slide member (mm) Rin | Rout | Lin | Lout | Evaluation Results Quantative Evaluation | Function Evaluation |
|---|---|---|---|---|---|---|---|---|---|---|---|---|---|
| Example 1 | ○ | 1 | 90 | 0 | 47 | 20 | cycloolefin | 0 | 0 | 0 | 0 | A | A |
| Example 2 | ○ | 1 | 90 | 0 | 46 | 50 | cycloolefin | 0 | 0 | 0 | 0 | A | A |
| Comparative Example 1 | x | 1 | 90 | 0 | 47 | 20 | cycloolefin | 2200 | 400 | 1100 | 1600 | C | C |
| Comparative Example 2 | x | 1 | 90 | 0 | 46 | 50 | cycloolefin | 2200 | 400 | 1100 | 1600 | D | D |

Examples 1 and 2 that adjusted the openings of the partition walls with the slide members were able to produce a film with no alignment unevenness since no air flowed into the subsequent section. In comparison, in both of Comparative Examples 1 and 2, the width of the opening was widely open in the partition walls on the inner and outer sides. This readily caused air to flow into the subsequent section together with the film, which caused unevenness in temperature. Due to this temperature unevenness, the stretched film exhibited alignment unevenness, thereby resulting with a poor functional evaluation.

Examples 3 to 5

Figure 16:
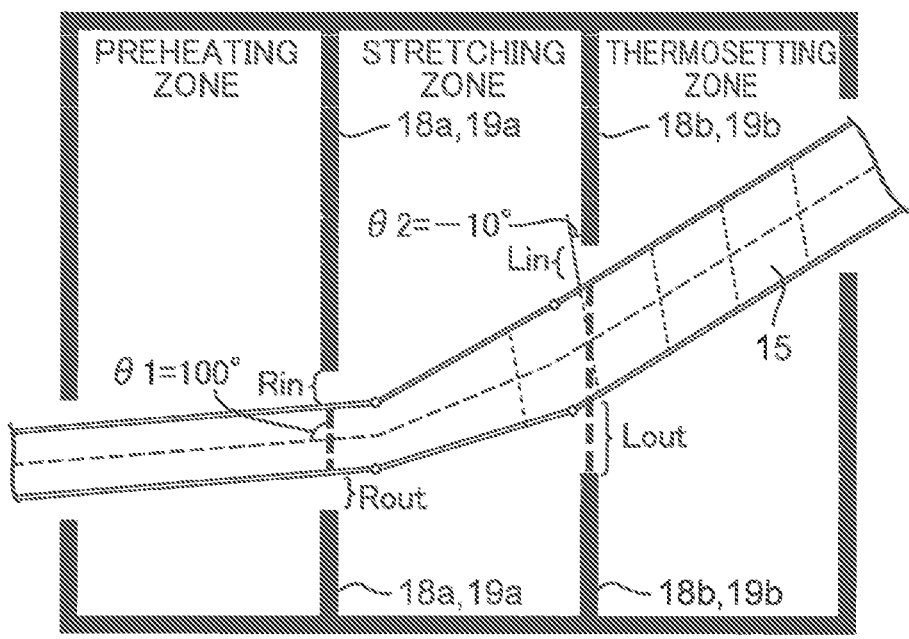
FIG. 16 is a schematic view showing a rotating pattern of an oblique stretching tenter used in Examples 3 to 5.

Examples 3 and 4 used a rotating pattern 2 of the oblique stretching tenter as shown in FIG. 16. The long stretched films made of cycloolefin were produced in a similar manner to Example 1 except that the rotating angle and running velocity were changed to those as shown in Table 2. The produced films were evaluated based on the evaluation methods described above.

Moreover, in Example 5 the long stretched film made of cycloolefin was produced in a similar manner to Example 4 except that the slide members were adjusted so that the distances of Rin and Lin shown in Table 2 were made shorter than those of Rout and Lout, respectively. The produced film was evaluated based on the evaluation methods described above.

Comparative Examples 3 and 4

In Comparative Example 3, the film was stretched in a heating section that is separated into sections by using partition walls not provided with the slide members, as shown in made to be in the conditions as shown in Table 2. The produced film was evaluated based on the evaluation methods described above.

The long stretched film made of cycloolefin in Comparative Example 4 was produced in a similar manner to Comparative Example 3 except that the film was obliquely stretched in a different rotating angle and at a different running velocity from Comparative Example 3. The produced film was evaluated based on the evaluation methods described above.

Figure 17:
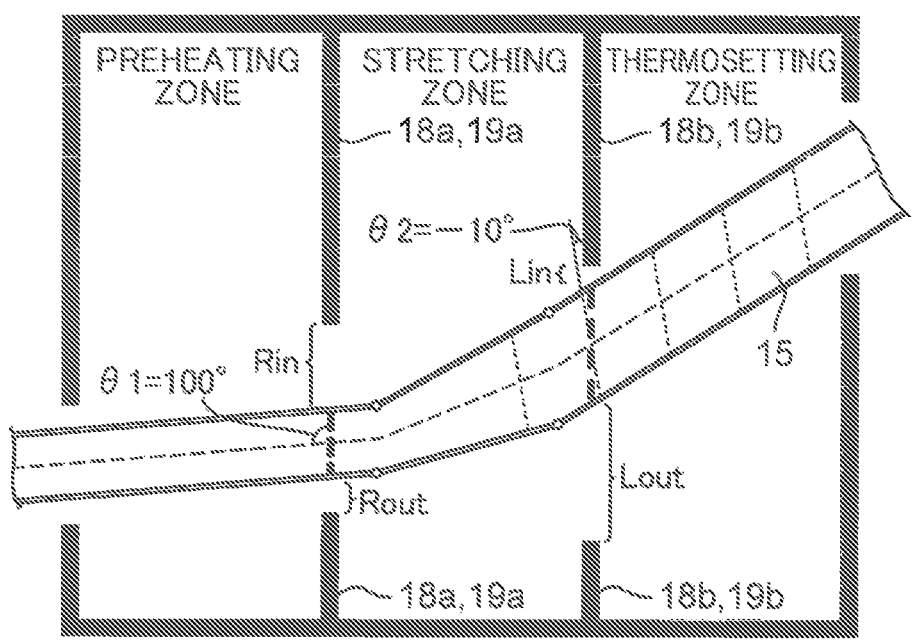
FIG. 17 is a schematic view showing a rotating pattern of an oblique stretching tenter used in Comparative Examples 3 and 4.

FIG. 17 shows a schematic view of the rotating pattern 2 and the partition walls in the heating section, used in Comparative Examples 3 and 4. The evaluation results are as shown in Table 2.

TABLE 2

| | Opening adjustment in partitions | Swing Pattern | Angle (°) $\theta_1$ | Angle (°) $\theta_2$ | Swinging angle (°) | Running velocity (m/mins) | Film Type | Distance between film and slide member (mm) Rin | Rout | Lin | Lout | Evaluation Results Quantative Evaluation | Function Evaluation |
|---|---|---|---|---|---|---|---|---|---|---|---|---|---|
| Example 3 | ○ | 2 | 100 | −10 | 47 | 20 | cycloolefin | 0 | 0 | 0 | 0 | A | A |
| Example 4 | ○ | 2 | 100 | −10 | 46 | 50 | cycloolefin | 0 | 0 | 0 | 0 | B | B |
| Example 5 | ○ | 2 | 100 | −10 | 46 | 50 | cycloolefin | −100 | 100 | −100 | 100 | A | A |
| Comparative Example 3 | x | 2 | 100 | −10 | 47 | 20 | cycloolefin | 2500 | 0 | 0 | 2300 | C | C |
| Comparative Example 4 | x | 2 | 100 | −10 | 46 | 50 | cycloolefin | 2500 | 0 | 0 | 2300 | D | D |

Examples 3 and 4 that adjusted the openings of the partition walls with the slide members were able to produce a film with no alignment unevenness since no air flowed in to the subsequent section. Moreover, in Example 5 the opening of the partition wall separating the preheating section and the stretching section was widened more on the outer side than on the inner side; this minimized the difference in temperature caused by the outer end of the film entering the stretching section quicker than the inner end thereof. Furthermore, in the partition wall separating the stretching section and the thermosetting section, the opening on the outer side was widened more than on the inner side; this minimized the difference in temperature caused by the outer end of the film entering the thermosetting section quicker than the inner end thereof. Accordingly, it was possible to produce a film having uniform optical characteristics in a widthwise direction.

In comparison, in Comparative Examples 3 and 4, the opening on the inner side of the partition wall that separates the preheating section and the stretching section and the opening in the outer side of the partition wall that separates the stretching section and the thermosetting section were widely open. This caused the air to readily flow into the subsequent section together with the film, which caused the unevenness in temperature. Caused by this temperature unevenness, alignment unevenness occurred to the stretched film, which resulted in having poor function evaluation results. Moreover, Comparative Example 4 produced the film at a running velocity faster than that of Comparative Example 3, and thus the flow of air accompanying the film into the subsequent section was significant. Accordingly, Comparative Example 4 resulted in having a greater optical unevenness than Comparative Example 3.

Examples 6 to 8

Figure 18:
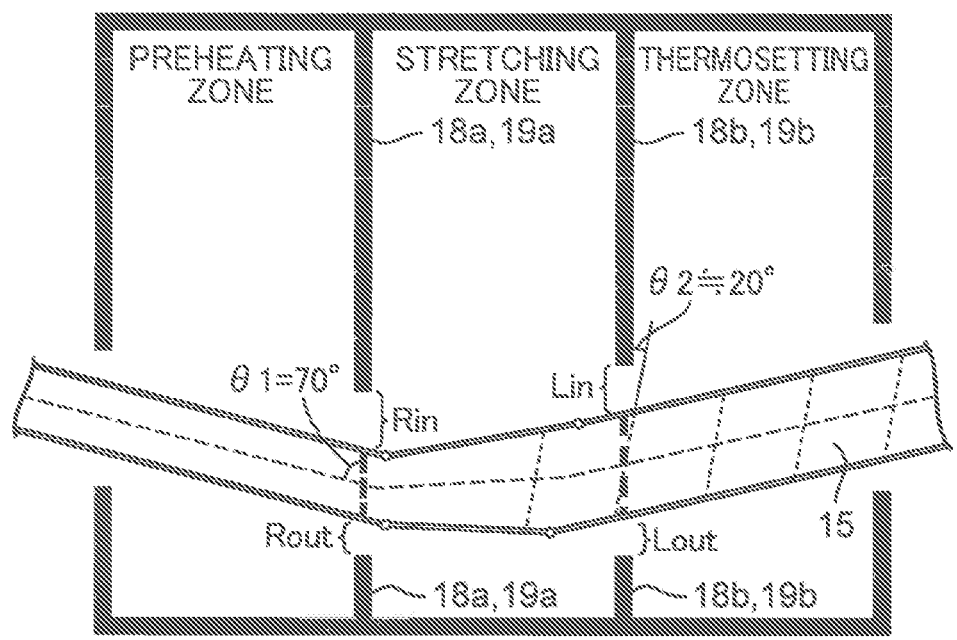
FIG. 18 is a schematic view showing a rotating pattern of an oblique stretching tenter used in Examples 6 to 8.

In Examples 6 and 7, the long stretched film made of cycloolefin was produced in a similar manner to Example 1 except that the oblique stretching tenter used a rotating pattern 3 as shown in FIG. 18 and the rotating angle and running velocity were changed to those as shown in Table 3. The produced film was evaluated based on the evaluation methods described above.

Moreover, in Example 8, the long stretched film made of cycloolefin was produced in a similar manner to Example 4 except that the distances of Rout and Lout were made smaller than Rin and Lin, respectively, as shown in Table 3. The produced film was evaluated based on the evaluation methods described above.

Comparative Examples 5 and 6

In Comparative Example 5, the film was stretched in a heating section that is separated in sections by using partition walls not provided with the slide members, as shown in Table 3. The long stretched film made of cycloolefin was produced in a similar manner to Example 6 except that the distance between the film ends and the slide members were made to be under the conditions shown in Table 3 below. The produced film was evaluated based on the evaluation methods described above.

In Comparative Example 6, the long stretched film made of cycloolefin was produced in a similar manner to Comparative Example 5 except that the film was obliquely stretched at a running velocity different from Comparative Example 5.

Figure 19:
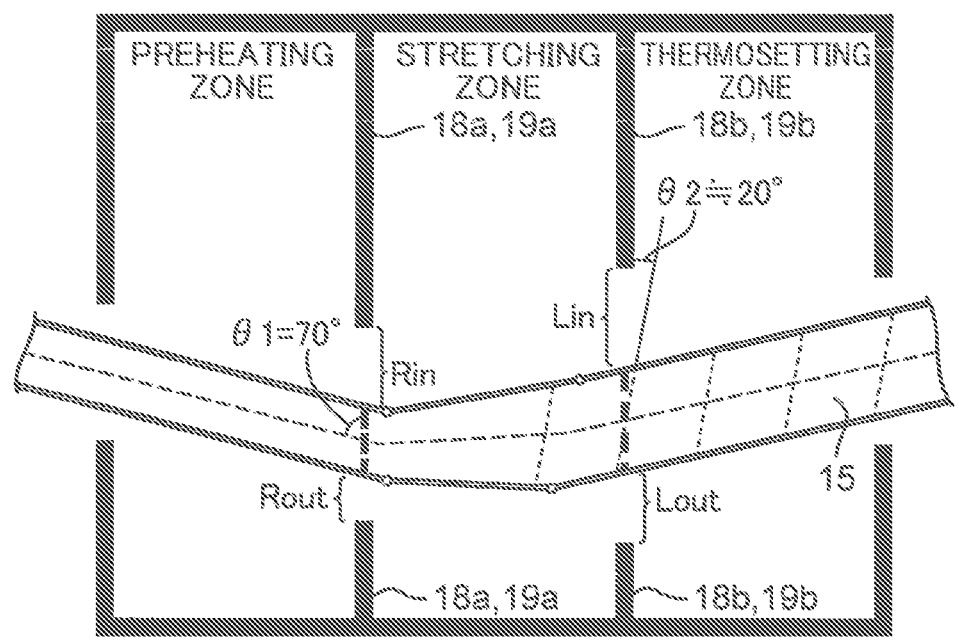
FIG. 19 is a schematic view showing a rotating pattern of an oblique stretching tenter used in Comparative Examples 5 and 6.

FIG. 19 shows a schematic view of the rotating pattern 3 and the partition walls in the heating section, each used in Comparative Examples 5 and 6. The evaluation results are as shown in Table 3 below.

no alignment evenness since no air flowed into the subsequent section. Moreover, in Example 8 the opening of the partition wall separating the preheating section and the stretching section was widened more on the inner side than on the outer side; this minimized the difference in temperature caused by the inner end of the film entering the stretching section quicker than the outer end thereof. Moreover, in the partition wall separating the stretching section and the thermosetting section, the opening on the inner side was widened more than on the outer side; this minimized the difference in temperature caused by the inner end of the film entering the thermosetting section quicker than the outer end thereof. Accordingly, it was possible to produce a film having uniform optical characteristics in a widthwise direction.

In comparison, in both of Comparative Examples 5 and 6, the openings on the partition walls were widely opened on the inner side and on the outer side. This caused the air to readily flow into the subsequent section together with the film, which caused the unevenness in temperature. Caused by this temperature unevenness, alignment unevenness occurred to the stretched film, which resulted in having poor function evaluation results. Moreover, Comparative Example 6 produced the film under a condition quicker in the running velocity than that of Comparative Example 5, and thus the flow of air accompanying the film into the subsequent section was more significant. Therefore, it was made clear that a greater optical unevenness was easily exhibited in Comparative Example 6 as compared to Comparative Example 5.

Examples 9 to 11

Figure 20:
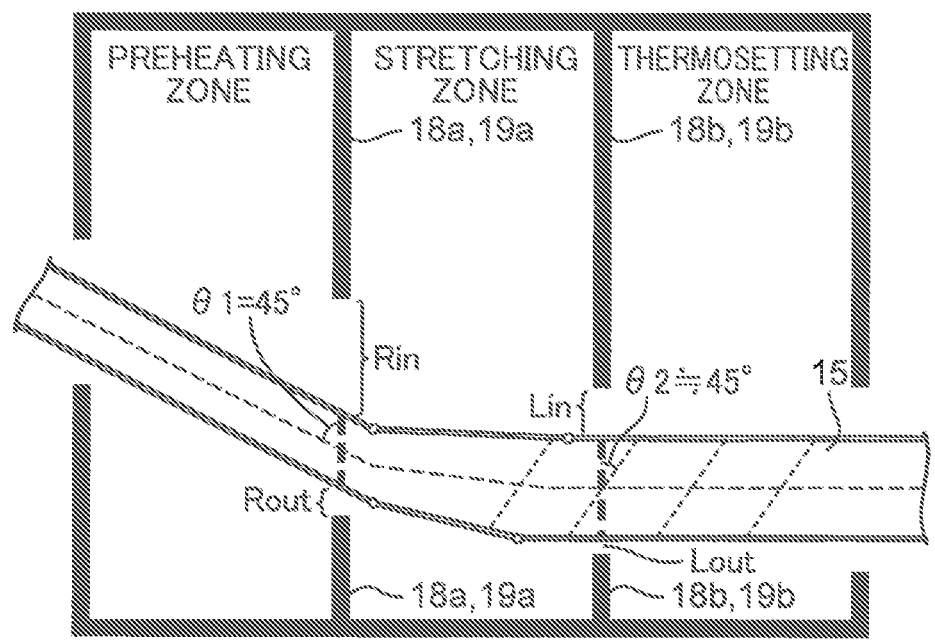
FIG. 20 is a schematic view showing a rotating pattern of an oblique stretching tenter used in Examples 9 to 12.

In Examples 9 and 10, the long stretched films made of cycloolefin were produced in a similar manner to Example 1 except that the oblique stretching tenter used a rotating pattern 4 as shown in FIG. 20 and the rotating angle and running velocity were changed to those as shown in Table 4. The produced film was evaluated based on the evaluation methods described above.

Moreover, in Example 11, the long stretched film made of cycloolefin was produced in a similar manner to Example 10 except that the distances of Rout and Lout were made smaller than Rin and Lin, respectively, as shown in Table 4. The produced film was evaluated based on the evaluation methods described above.

Comparative Examples 7 and 8

In Comparative Example 7, the film was stretched in a heating section that is separated in sections by using partition walls not provided with the slide members, as shown in Table

TABLE 3

| | Opening adjustment in partitions | Swing Pattern | Angle (°) θ1 | θ2 | Swinging angle (°) | Running velocity (m/mins) | Film Type | Distance between film and slide member (mm) | | | | Evaluation Results | |
| | | | | | | | | Rin | Rout | Lin | Lout | Quantative Evaluation | Function Evaluation |
|---|---|---|---|---|---|---|---|---|---|---|---|---|---|
| Example 6 | o | 3 | 70 | 20 | 47 | 20 | cycloolefin | 0 | 0 | 0 | 0 | A | A |
| Example 7 | o | 3 | 70 | 20 | 46 | 50 | cycloolefin | 0 | 0 | 0 | 0 | B | B |
| Example 8 | o | 3 | 70 | 20 | 46 | 50 | cycloolefin | 50 | −150 | 50 | −150 | A | A |
| Comparative Example 5 | x | 3 | 70 | 20 | 47 | 20 | cycloolefin | 1300 | 1100 | 3000 | 200 | C | C |
| Comparative Example 6 | x | 3 | 70 | 20 | 46 | 50 | cycloolefin | 1300 | 1100 | 3000 | 200 | D | D |

Examples 6 and 7 adjusted in the openings of the partition walls with the slide members were able to produce a film with 4. The long stretched film made of cycloolefin was produced in a similar manner to Example 9 except that the distances between the film ends and the slide members were made to be under the conditions as shown in Table 4 below. The produced film was evaluated based on the evaluation methods described above.

In Comparative Example 8, the long stretched film made of cycloolefin was produced in a similar manner to Comparative Example 7 except that the film was obliquely stretched at a running velocity different from Comparative Example 7.

Figure 21:
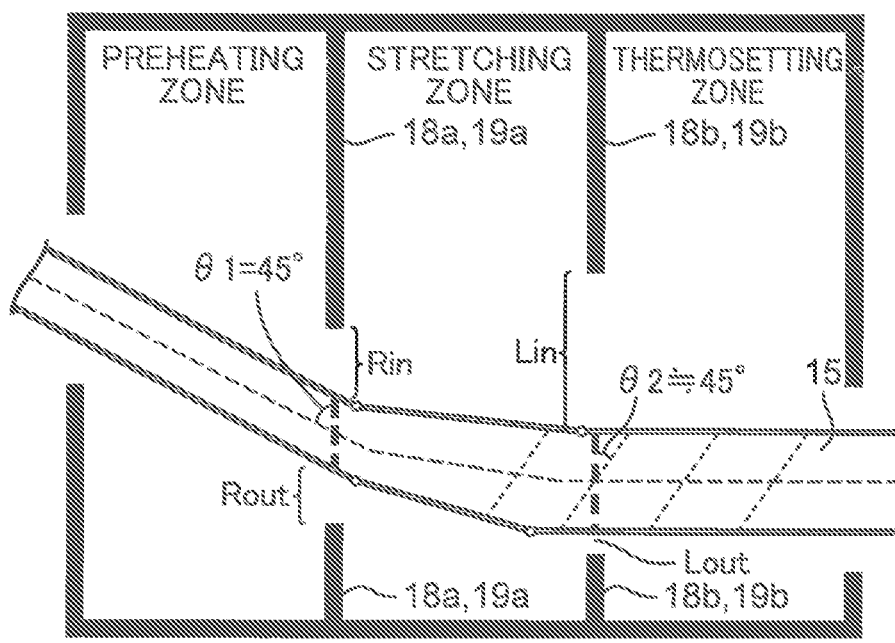
FIG. 21 is a schematic view showing a rotating pattern of an oblique stretching tenter used in Comparative Examples 7 and 8.

FIG. 21 shows a schematic view of the rotating pattern 4 and the partition walls in the heating section, each used in Comparative Examples 7 and 8. The evaluation results are as shown in Table 4 below.

TABLE 4

| | Opening adjustment in partitions | Swing Pattern | Angle (°) θ1 | θ2 | Swinging angle (°) | Running velocity (m/mins) | Film Type | Distance between film and slide member (mm) Rin | Rout | Lin | Lout | Evaluation Results Quantative Evaluation | Function Evaluation |
|---|---|---|---|---|---|---|---|---|---|---|---|---|---|
| Example 9 | o | 4 | 45 | 45 | 47 | 20 | cycloolefin | 0 | 0 | 0 | 0 | B | B |
| Example 10 | o | 4 | 45 | 45 | 46 | 50 | cycloolefin | 0 | 0 | 0 | 0 | B | B |
| Example 11 | o | 4 | 45 | 45 | 46 | 50 | cycloolefin | 100 | −150 | 100 | −150 | A | B |
| Example 12 | o | 4 | 45 | 45 | 47 | 50 | cellulose ester | 100 | −150 | 100 | −150 | A | A |
| Comparative Example 7 | x | 4 | 45 | 45 | 47 | 20 | cycloolefin | 0 | 2300 | 3400 | 0 | D | D |
| Comparative Example 8 | x | 4 | 45 | 45 | 46 | 50 | cycloolefin | 0 | 2300 | 3400 | 0 | E | E |

Examples 9 and 10 adjusted in the opening of the partition walls using the slide members were reduced in flowing in of air into the subsequent section, and could produce a film with no alignment unevenness. Moreover, Example 11 widened the opening on the inner side than the outer side in the partition wall separating the preheating section and the stretching section, which minimized the difference in temperature caused by the film inner ends entering the stretching section quicker than the outer ends. Moreover, the partition walls separating the stretching section and the thermosetting section have an opening wider on the inner side than the outer side, thereby allowing for minimizing the difference in temperature caused by the film inner ends entering the thermosetting section quicker than the outer ends. This allows for producing a film having uniform optical characteristics in a widthwise direction.

On the other hand, in Comparative Examples 7 and 8, the openings of the partition walls are widely opened in the inner side of the partition wall separating the preheating section and the stretching section and in the outer side of the partition wall separating the stretching section and the thermosetting section. This causes air accompanying the film to readily flow into the subsequent section, thereby causing temperature unevenness. This temperature unevenness causes alignment unevenness in the stretched film, resulting in achieving a poor function evaluation result. Moreover, in Comparative Example 8, the film is produced at a faster running velocity than Comparative Example 7, which causes a significant flow of accompanied air into the subsequent section. Therefore, it was clarified that Comparative Example 8 readily has optical unevenness as compared to Comparative Example 7.

Example 12

Production of Cellulose Ester Film

<<Synthesis of Sugar Ester Compound 1>>

Figure 13:
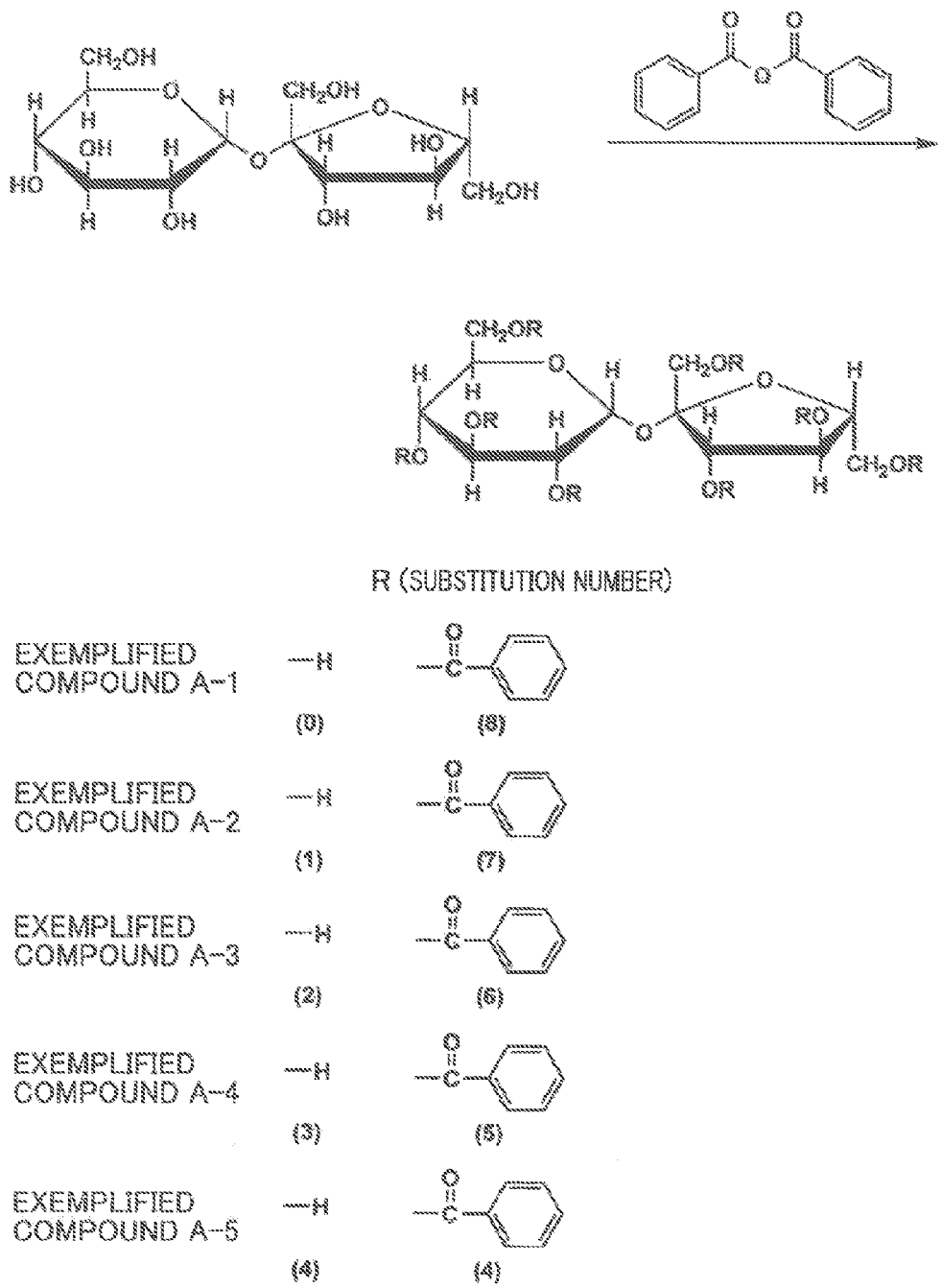
FIG. 13 is a view showing a synthesis of a sugar ester compound.

Into a four-necked flask provided with a stirring device, a reflux condenser, a thermometer and a nitrogen gas introducing pipe, 34.2 g (0.1 mol) of sucrose, 180.8 g (0.6 mol) of benzoic anhydride, 379.7 g (4.8 mol) of pyridine were prepared, and nitrogen gas was bubbled into the mixture through the nitrogen gas introducing pipe while stirring to heat the mixture, to perform esterification at 70° C. for 5 hours. Next, pressure inside the flask was reduced to not more than $4\times10^2$ Pa, and after the temperature decreased to 60° C., excess pyridine was distilled, pressure inside the flask was further reduced to not more than $1.3\times10$ Pa and the temperature was raised to 120° C. to distill the benzoic anhydride and most part of the generated benzoic acid. Finally, 100 g of water was added to an isolated toluene layer, this was washed for 30 minutes with water and then the toluene layer was isolated. Toluene was distilled therefrom at 60° C. under reduced pressure (not more than $4\times10^2$ Pa), to obtain a mixture of compounds A-1, A-2, A-3, A-4 and A-5, as shown in FIG. 13.

The obtained mixture were analyzed by HPLC and LC-MASS, which obtained a result showing that A-1 was 1.3% by mass, A-2 was 13.4% by mass, A-3 was 13.1% by mass, A-4 was 31.7% by mass, and A-5 was 40.5% by mass. An average degree of substitution was 5.5.

The measurement conditions of HPLC-MASS were as shown below.

1) LC Section

Device: Column oven (JASCO CO-965), Detector (JASCO UV-970-240 nm), Pump (JASCO PU-980), Degasser (JASCO DG-980-50), each of JASCO Corporation Column: INERTSIL ODS-3; particle size of 5 µm, 4.6×250 mm (GL Sciences Inc.)

Column temperature: 40° C.

Flow velocity: 1 ml/min

Mobile phase: THF (1% acetic acid): $H_2O$ (50:50)

Injection rate: 3 µl

2) MS Section

Device: LCQ DECA (Thermo Quest)

Ionization method: Electrospray ionization (ESI) method

Spray Voltage: 5 kV

Capillary temperature: 180° C.

Vaporizer temperature: 450° C.

<<Synthesis of Ester Compound 1>>

Into a 2 L four-necked flask provided with a thermometer, a stirrer, and a regulator cooling pipe, 251 g of 1,2-propylene glycol, 278 g of phthalic anhydride, 91 g of adipic acid, 610 g of benzoic acid, and 0.191 g of tetraisopropyl titanate as an esterification catalyst were prepared and were gradually heated while stirring until the mixture reached 230° C. in a nitrogen gas stream. The mixture was subjected to dehydrative condensation reaction for 15 hours, and after the reaction, non-reacted 1,2-propylene glycol was distilled under reduced pressure at 200° C., to obtain an ester compound 1. The ester compound 1 has an ester of benzoic acid on an end of a polyester chain formed by condensing 1,2-propylene glycol, phthalic anhydride and adipic acid. The acid value of the ester compound 1 was 0.10, and a number-average molecular weight thereof was 450.

<<Preparation of Particles Additive Liquid 1>>

With a dissolver, 11 parts by mass of particles (AEROSIL R972V, Nippon Aerosil Co., Ltd.) and 89 parts by mass of ethanol were stirred and mixed together for 50 minutes, and thereafter this mixture was dispersed by using Manton-Gaulin to prepare a particles additive liquid 1.

<<Preparation of Main Dope>>

A dope solution was poured into an airtight container so that methylene chloride, ethanol, cellulose acetate propionate, a compound (C) represented by the following chemical formula 6, and the sugar ester compound 1, ester compound 1, particles additive liquid 1 described above were contained as in the following composition, and were dissolved while stirring to prepare the dope solution.

| | |
|---|---|
| Methylene chloride | 340 parts by mass |
| Ethano | 64 parts by mass |
| Cellulose acetate propionate (degree of substitution of acetyl group: 1.39, degree of substitution of propionyl group: 0.50, total degree of substitution: 1.89) | 100 parts by mass |
| Compound (C) | 5.0 parts by mass |
| Sugar ester compound 1 | 5.0 parts by mass |
| Ester compound 1 | 2.5 parts by mass |
| Particles additive liquid 1 | 1 parts by mass |

[Chem. 6]

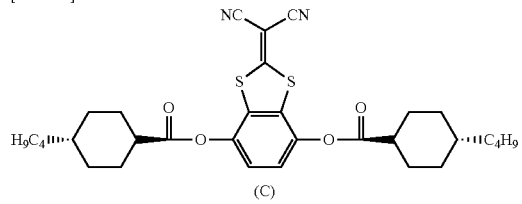

(C)

Next, an endless belt flow casting device was used to uniformly flow cast the dope solution onto a stainless steel belt supporter. The solvent was evaporated so that residual solvent content in the flow casted film (cast) became 75% on the stainless steel belt supporter, and released the flow casted film from the stainless steel belt support.

In Example 12, the released cellulose ester film was stretched under similar stretching conditions to Example 11 as shown in Table 4 shown above. The film was produced under temperature conditions of the transverse stretching tenter oven at this time so that the preheating section was 180° C., the stretching section was 177° C., and the thermosetting section was 158° C.

Example 12 that is a cellulose ester film produced under the same conditions as Example 11 could obtain evaluation results excelling in optical characteristics than that of the cycloolefin-based film.

As described above, the slide members according to the embodiment of the present invention can accommodate to various rotating patterns. It was thus clarified that it is possible to provide a film that excels in optical uniformity.

Next described are Examples in which the rotating angles are different under the same conditions of θ1 and θ2, as production means different from those of Examples 1 to 12 and Comparative Examples 1 to 8.

Examples 13 and 14

Figure 22:
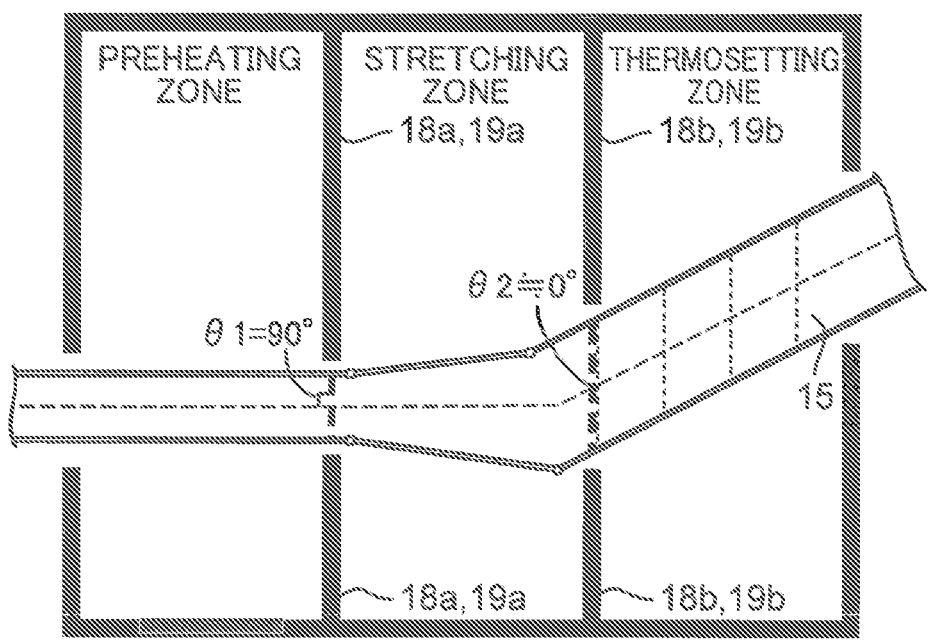
FIG. 22 is a schematic view showing a rotating pattern of an oblique stretching tenter used in Example 13.
Figure 23:
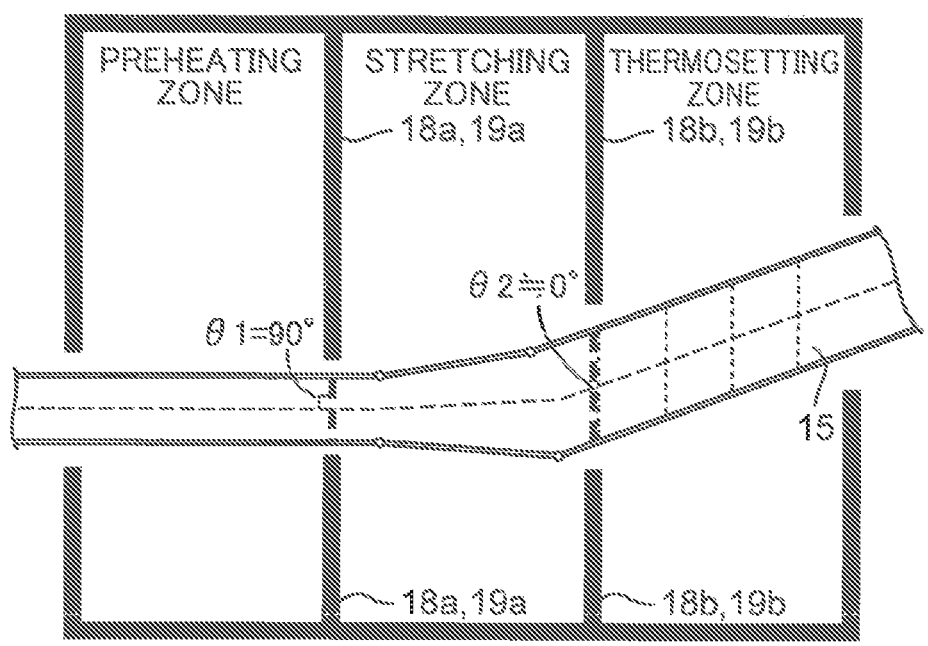
FIG. 23 is a schematic view showing a rotating pattern of an oblique stretching tenter used in Example 14.

In Examples 13 and 14, the oblique stretching tenter used rotating angles of rotating patterns 5 and 6 as shown in FIG. 22 and FIG. 23, respectively, and the cycloolefin long stretched film was produced in a similar manner to Example 1 except that the running velocity was changed to that shown in Table 5. The produced film was evaluated based on the quantative method described above.

Comparative Examples 9 and 10

Figure 24:
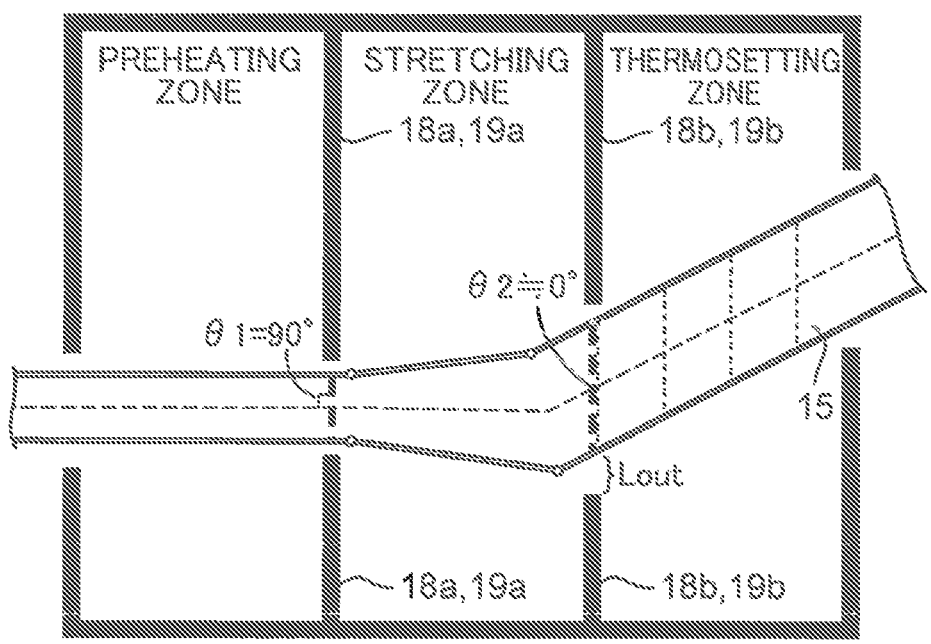
FIG. 24 is a schematic view showing a rotating pattern of an oblique stretching tenter used in Comparative Example 9.
Figure 25:
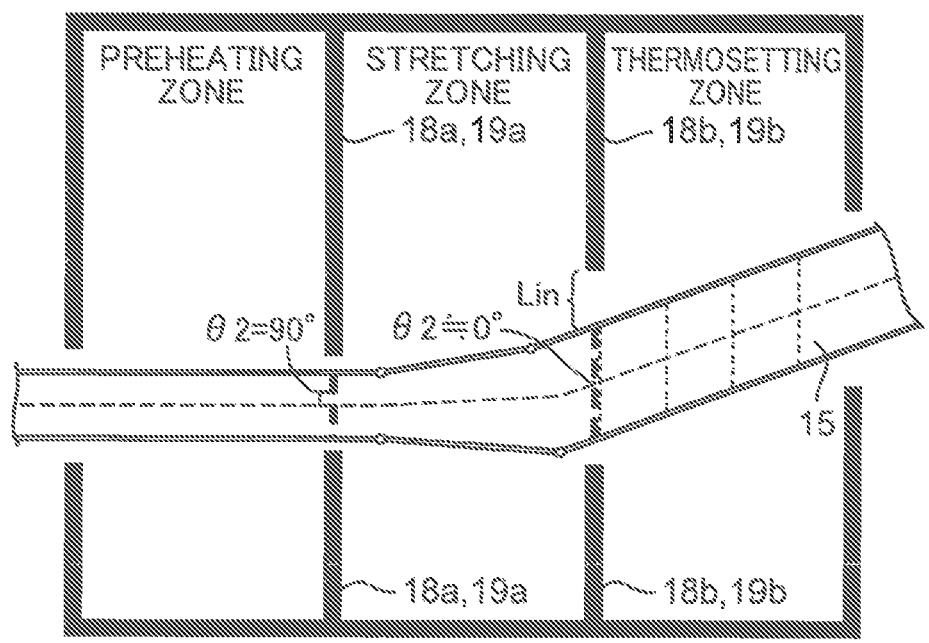
FIG. 25 is a schematic view showing a rotating pattern of an oblique stretching tenter used in Comparative Example 10.

In Comparative Examples 9 and 10, the oblique stretching tenter used rotating angles of rotating patterns 7 and 8 as shown in FIG. 24 and FIG. 25, respectively, and the film was stretched in a heating section that is separated in sections by using partition walls not provided with the slide members. The long stretched film made of cycloolefin was produced in a similar manner to Examples 13 and 14 except that the distance between the film ends and the slide members were made to be as shown in Table 5. The produced films were evaluated based on the quantative method described above.

TABLE 5

| | Opening adjustment in partitions | Swing Pattern | Angle (°) θ1 | Angle (°) θ2 | Swinging angle (°) | Running velocity (m/mins) | Film Type | Distance between film and slide member (mm) Rin | Rout | Lin | Lout | Evaluation Results Quantative Evaluation |
|---|---|---|---|---|---|---|---|---|---|---|---|---|
| Example 13 | o | 5 | 90 | 0 | 46 | 50 | cycloolefin | 0 | 0 | 0 | 0 | A |
| Example 14 | o | 6 | 90 | 0 | 23 | 50 | cycloolefin | 0 | 0 | 0 | 0 | A |
| Comparative Example 9 | x | 7 | 90 | 0 | 46 | 50 | cycloolefin | 0 | 0 | 0 | 1600 | D |
| Comparative Example 10 | x | 8 | 90 | 0 | 23 | 50 | cycloolefin | 0 | 0 | 1800 | 0 | D |

Examples 15 and 16

Figure 26:
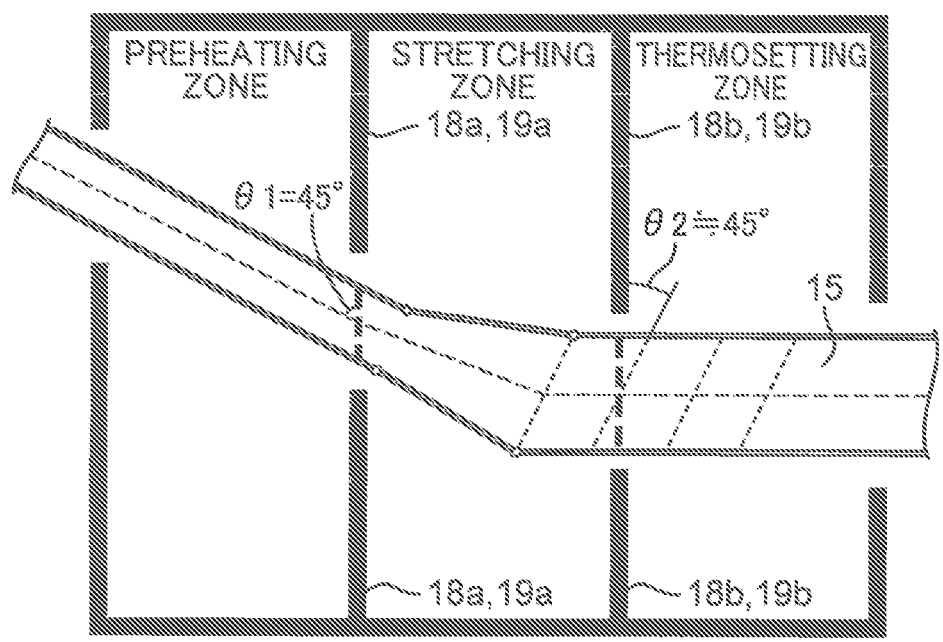
FIG. 26 is a schematic view showing a rotating pattern of an oblique stretching tenter used in Example 15.
Figure 27:
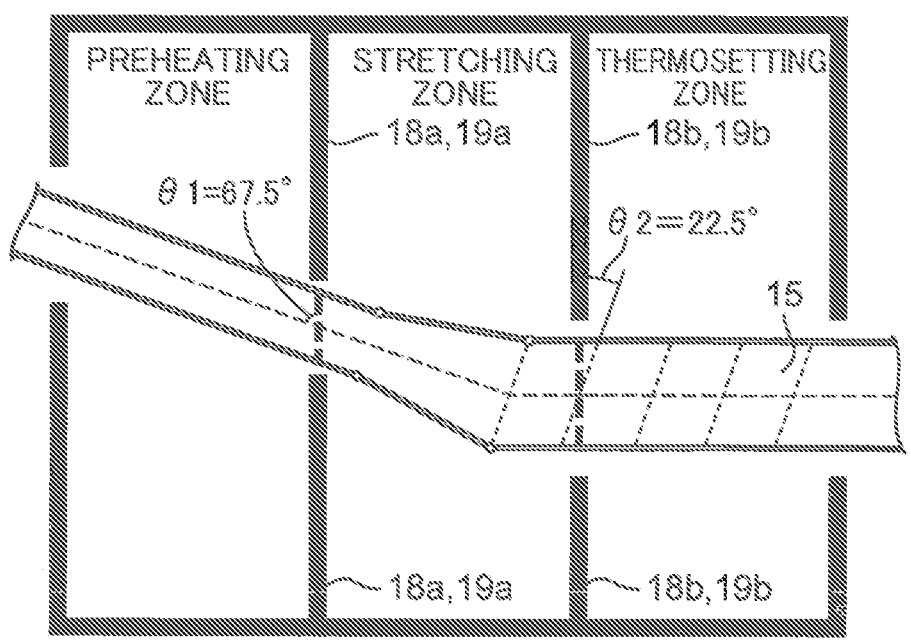
FIG. 27 is a schematic view showing a rotating pattern of an oblique stretching tenter used in Example 16.

In Examples 15 and 16, the cycloolefin long stretched film was produced in a similar manner to Example 1 except that the oblique stretching tenter used the rotating angles as in rotating patterns 9 and 10 as shown in FIG. 26 and FIG. 27, respectively, and the running velocity was changed to those as shown in Table 6. The produced film was evaluated based on the quantative method described above.

Comparative Examples 11 and 12

Figure 28:
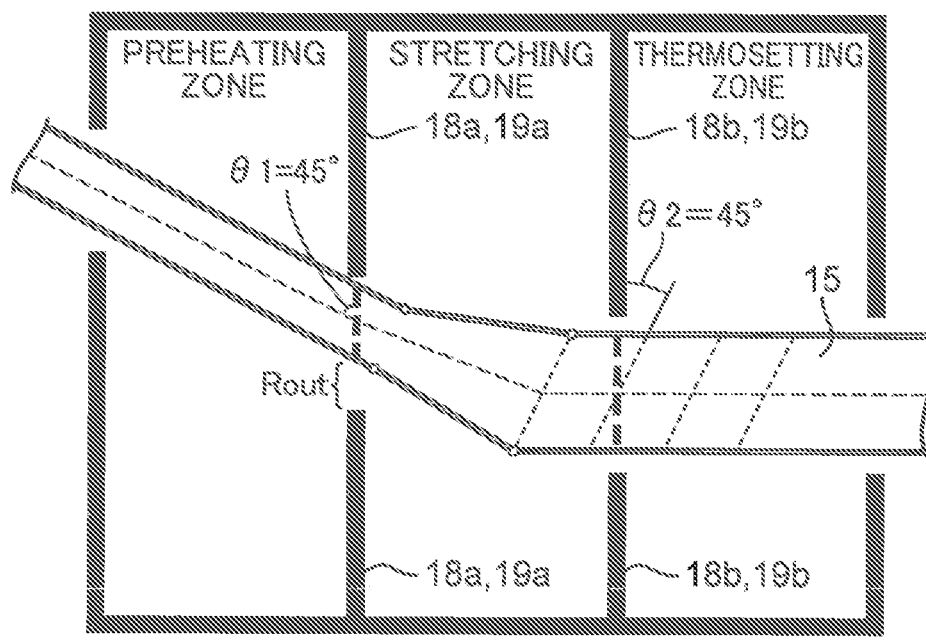
FIG. 28 is a schematic view showing a rotating pattern of an oblique stretching tenter used in Comparative Example 11.
Figure 29:
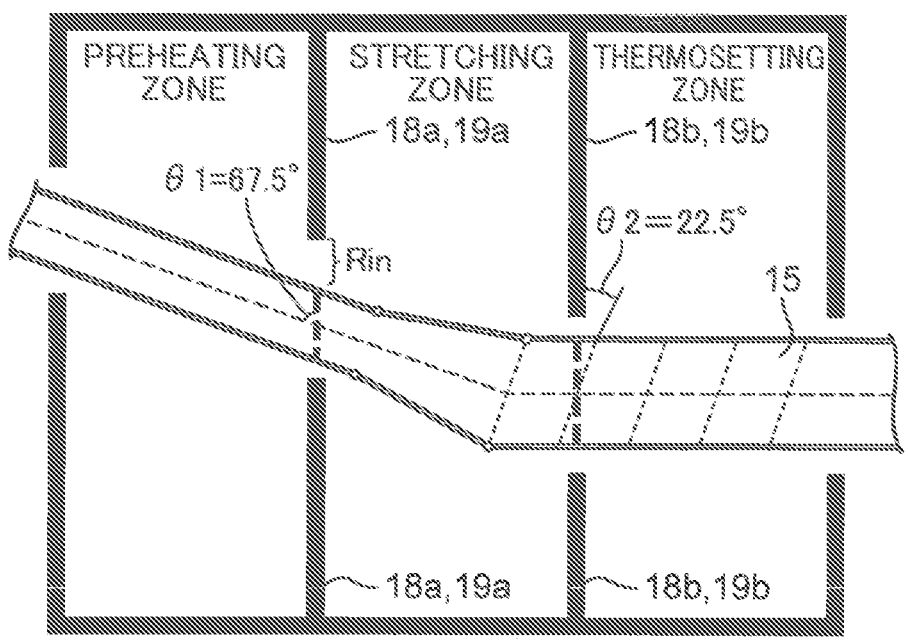
FIG. 29 is a schematic view showing a rotating pattern of an oblique stretching tenter used in Comparative Example 12.

In Comparative Examples 11 and 12, the oblique stretching tenter used rotating angles as in rotating patterns 11 and 12 as shown in FIG. 28 and FIG. 29, respectively, and the film was stretched in the heating section that is separated in sections by using partition walls not provided with the slide members. The cycloolefin long stretched film was produced in a similar manner to Examples 15 and 16 except that the distances between the film ends and the slide members were made to be those as shown in Table 6, and the produced film was evaluated based on the quantative method described above.

TABLE 6

| | Opening adjustment in partitions | Swing Pattern | Angle (°) θ1 | Angle (°) θ2 | Swinging angle (°) | Running velocity (m/mins) | Film Type | Distance between film and slide member (mm) | | | | Evaluation Results Quantative Evaluation |
|---|---|---|---|---|---|---|---|---|---|---|---|---|
| | | | | | | | | Rin | Rout | Lin | Lout | |
| Example 15 | o | 9 | 45 | 45 | 46 | 50 | cycloolefin | 50 | −150 | 50 | −150 | A |
| Example 16 | o | 10 | 67.5 | 22.5 | 23 | 50 | cycloolefin | 0 | −150 | 0 | −150 | A |
| Comparative Example 11 | x | 11 | 45 | 45 | 46 | 50 | cycloolefin | 0 | 1100 | 0 | 0 | D |
| Comparative Example 12 | x | 12 | 67.5 | 22.5 | 23 | 50 | cycloolefin | 1500 | 0 | 0 | 0 | D |

As apparent from the results in Tables 5 and 6, in Examples 13 to 16, it was possible to produce a long stretched film having no alignment unevenness, since the amount of air that flows into the subsequent section was reduced by adjusting the openings of the partition walls by using the slide members, even under the conditions of having different rotating angles in the same rotating patterns.

On the other hand, in Comparative Examples 9 to 12, the openings of the partition walls were widely open on the inner sides and outer sides thereof, which made the air accompanying the film readily flow into the subsequent section. This caused temperature unevenness, which resulted in generation of alignment unevenness on the long stretched film.

The above description explains the present invention appropriately and sufficiently through the embodiments with reference to drawings, however a person skilled in the art would easily be capable of varying and/or modifying the embodiments described above. Therefore, unless the person skilled in the art intends to make changes and modifications to the embodiments of a level exceeding the scope of the claims, any changes and modifications shall be understood as included within the scope of the claims.

The invention claimed is:

1. A method for producing a long stretched film, comprising at least the steps of:

forming a long film containing a thermoplastic resin;

stretching the long film in an oblique direction greater than 0° but smaller than 90° with respect to a widthwise direction of the long film by feeding to an oblique stretching apparatus having an oblique stretching tenter, in a specific direction different from a direction along which the long film runs after being stretched, and then allowing the long film to run while widthwise ends of the long film are gripped by gripping tools of a gripping tool running device of the oblique stretching tenter; and winding the long film having been subjected to the oblique stretching, wherein:

the oblique stretching is performed in a heating section including a preheating section, a stretching section, and a thermosetting section, the preheating section and the stretching section are separated from each other by a first partition wall, and the stretching section and the thermosetting section are separated from each other by a second partition wall, each of the partition walls has an opening for permitting the long film to pass, and first slide members independently movable on the opposite sides of the opening and in widthwise directions of the long film, the first slide members adjust a width of the opening and the widthwise position of the opening to adjust a flowing in of air that accompanies a run of the long film from a previous section of the preheating section, the stretching section, and the thermosetting section to a subsequent section of the preheating section, the stretching section, and the thermosetting section.

2. The method according to claim 1, wherein each of the partition walls further has second slide members above and under the gripping tool running device, the second slide members being independently movable in widthwise directions of the long film to adjust the flowing in of air that accompanies the run of the long film from the previous section to the subsequent section.

3. The method according to claim 1, wherein in the second partition wall separating the stretching section from the thermosetting section, when the long film has an alignment in a clockwise direction with respect to the second partition wall, the width of the opening is adjusted such that the distance between the end of the long film and the slide member in the inner side of the film running direction is greater than that in the outer side of the film running direction, and when the long film has an alignment in a counterclockwise direction with respect to the second partition wall, the width of the opening is adjusted such that the distance between the end of the long film and the slide member in the outer side of the film running direction is greater than that in the inner side of the film running direction.

4. The method according to claim 1, wherein in the first partition wall separating the preheating section from the stretching section, the width of the opening is adjusted such that the distance between the end of the long film and the slide member in a side having a smaller angle between the film running direction and the first partition wall is greater than that in a side having a larger angle between the film running direction and the first partition wall.

5. The method according to claim 1, wherein in the oblique stretching, the gripping tool moves along the gripping tool running device of the oblique stretching tenter at a velocity of 15 to 150 meters per minute.

* * * * *